(12) United States Patent
Myslinski

(10) Patent No.: US 9,087,048 B2
(45) Date of Patent: Jul. 21, 2015

(54) METHOD OF AND SYSTEM FOR VALIDATING A FACT CHECKING SYSTEM

(71) Applicant: LinkedIn Corporation, Mountain View, CA (US)

(72) Inventor: Lucas J. Myslinski, Sunnyvale, CA (US)

(73) Assignee: LinkedIn Corporation, Mountain View, CA (US)

( * ) Notice: Subject to any disclaimer, the term of this patent is extended or adjusted under 35 U.S.C. 154(b) by 215 days.

(21) Appl. No.: 13/763,831

(22) Filed: Feb. 11, 2013

(65) Prior Publication Data

US 2013/0158984 A1 Jun. 20, 2013

Related U.S. Application Data

(63) Continuation-in-part of application No. 13/565,013, filed on Aug. 2, 2012, which is a continuation-in-part of application No. 13/528,563, filed on Jun. 20, 2012, now Pat. No. 8,321,295, which is a continuation of application No. 13/448,991, filed on Apr. 17, 2012, now Pat. No. 8,229,795, which is a continuation of application No. 13/287,804, filed on Nov. 2, 2011, now Pat. No. 8,185,448.

(60) Provisional application No. 61/495,776, filed on Jun. 10, 2011, provisional application No. 61/736,181, filed on Dec. 12, 2012.

(51) Int. Cl.
| | |
|---|---|
| *G06F 17/28* | (2006.01) |
| *G06Q 10/10* | (2012.01) |
| *G06Q 30/02* | (2012.01) |
| *G06Q 50/00* | (2012.01) |

(52) U.S. Cl.
CPC ............... *G06F 17/28* (2013.01); *G06Q 10/10* (2013.01); *G06Q 30/02* (2013.01); *G06Q 50/01* (2013.01)

(58) Field of Classification Search
USPC ................... 704/9; 707/102, 1, 100; 715/505
See application file for complete search history.

(56) References Cited

U.S. PATENT DOCUMENTS

| | | | |
|---|---|---|---|
| 5,960,411 A | 9/1999 | Hartman et al. | |
| 6,161,090 A | 12/2000 | Kanevsky et al. | |
| 6,256,734 B1 | 7/2001 | Blaze et al. | |

(Continued)

FOREIGN PATENT DOCUMENTS

| | | |
|---|---|---|
| GB | 2428529 A | 1/2007 |
| WO | 0177906 A2 | 10/2001 |

(Continued)

OTHER PUBLICATIONS

U.S. Appl. No. 13/798,836, filed Mar. 13, 2013, Office Action, Jul. 15, 2014.

(Continued)

*Primary Examiner* — Charlotte M Baker
(74) *Attorney, Agent, or Firm* — Hickman Palermo Becker Bingham LLP

(57) ABSTRACT

A fact checking system is able to verify the correctness of information and/or characterize information by comparing the information with one or more sources. The fact checking system automatically monitors, processes, fact checks information and indicates a status of the information. Fact checking results are able to be validated by re-fact checking the fact check results.

24 Claims, 24 Drawing Sheets

(56) References Cited

U.S. PATENT DOCUMENTS

| | | | |
|---|---|---|---|
| 6,266,664 B1 | 7/2001 | Russell-Falla et al. |
| 6,782,510 B1 | 8/2004 | Gross et al. |
| 7,249,058 B2 | 7/2007 | Kim et al. |
| 7,337,462 B2 | 2/2008 | Dudkiewicz et al. |
| 7,478,078 B2 | 1/2009 | Lunt et al. |
| 7,644,088 B2 | 1/2010 | Fawcett et al. |
| 7,657,424 B2 | 2/2010 | Bennett |
| 7,765,574 B1 | 7/2010 | Maybury et al. |
| 8,560,300 B2 | 10/2013 | Ferrucci et al. |
| 2002/0083468 A1 | 6/2002 | Dudkiewicz |
| 2003/0158872 A1 | 8/2003 | Adams |
| 2003/0210249 A1 | 11/2003 | Simske |
| 2004/0103032 A1 | 5/2004 | Maggio |
| 2004/0122846 A1* | 6/2004 | Chess et al. ............ 707/102 |
| 2004/0139077 A1 | 7/2004 | Banker |
| 2004/0210824 A1 | 10/2004 | Shoff et al. |
| 2005/0022252 A1 | 1/2005 | Shen |
| 2005/0060312 A1 | 3/2005 | Curtiss et al. |
| 2005/0120391 A1 | 6/2005 | Haynie et al. |
| 2005/0132420 A1 | 6/2005 | Howard et al. |
| 2005/0235199 A1 | 10/2005 | Adams |
| 2006/0015904 A1 | 1/2006 | Marcus |
| 2006/0064633 A1 | 3/2006 | Adams |
| 2006/0166737 A1 | 7/2006 | Bentley |
| 2006/0206912 A1 | 9/2006 | Klarfeld et al. |
| 2006/0212904 A1 | 9/2006 | Klarfeld et al. |
| 2006/0248076 A1 | 11/2006 | Troy et al. |
| 2006/0287970 A1* | 12/2006 | Chess et al. ............ 707/1 |
| 2007/0011710 A1 | 1/2007 | Chiu |
| 2007/0043766 A1 | 2/2007 | Nicholas et al. |
| 2007/0070066 A1 | 3/2007 | Bakhash |
| 2007/0136781 A1 | 6/2007 | Kawai |
| 2007/0136782 A1 | 6/2007 | Ramaswamy et al. |
| 2007/0168354 A1 | 7/2007 | Ramer et al. |
| 2007/0288978 A1 | 12/2007 | Pizzurro et al. |
| 2008/0109780 A1 | 5/2008 | Stern et al. |
| 2008/0319744 A1 | 12/2008 | Goldberg |
| 2009/0170604 A1 | 7/2009 | Mueller et al. |
| 2009/0201420 A1 | 8/2009 | Brown et al. |
| 2009/0210395 A1 | 8/2009 | Sedam |
| 2009/0265304 A1 | 10/2009 | Ait-Mokhtar et al. |
| 2010/0121638 A1 | 5/2010 | Pinson et al. |
| 2010/0121973 A1 | 5/2010 | Lobacheva et al. |
| 2010/0235313 A1 | 9/2010 | Rea et al. |
| 2011/0043652 A1 | 2/2011 | King et al. |
| 2011/0066587 A1 | 3/2011 | Ferrucci et al. |
| 2011/0067065 A1 | 3/2011 | Karaoguz et al. |
| 2011/0087639 A1 | 4/2011 | Gurney |
| 2011/0093258 A1 | 4/2011 | Xu et al. |
| 2011/0106615 A1 | 5/2011 | Churchill et al. |
| 2011/0136542 A1 | 6/2011 | Sathish |
| 2011/0145164 A1 | 6/2011 | Lavoie et al. |
| 2011/0166860 A1 | 7/2011 | Tran |
| 2011/0313757 A1 | 12/2011 | Hoover et al. |
| 2012/0005221 A1 | 1/2012 | Ickman et al. |
| 2012/0102405 A1 | 4/2012 | Zuckerman et al. |
| 2012/0105453 A1 | 5/2012 | Cardno et al. |
| 2012/0144419 A1 | 6/2012 | Gu et al. |
| 2012/0191757 A1 | 7/2012 | Gross et al. |
| 2012/0284758 A1 | 11/2012 | Adjesson |
| 2012/0310750 A1 | 12/2012 | Schutzbank et al. |
| 2013/0091436 A1 | 4/2013 | Rose et al. |
| 2013/0099925 A1 | 4/2013 | Pederson |
| 2013/0218788 A1 | 8/2013 | Teheggen |
| 2014/0040249 A1 | 2/2014 | Ploesser et al. |
| 2014/0074751 A1 | 3/2014 | Rocklitz et al. |
| 2014/0164994 A1 | 6/2014 | Myslinski |
| 2014/0188461 A1 | 7/2014 | Myslinski |
| 2014/0315647 A1 | 10/2014 | Myslinski |
| 2014/0316769 A1 | 10/2014 | Myslinski |

FOREIGN PATENT DOCUMENTS

| | | |
|---|---|---|
| WO | 0177907 A2 | 10/2001 |
| WO | 03014949 A1 | 2/2003 |
| WO | 2004034755 A2 | 4/2004 |
| WO | 2006036853 A2 | 6/2006 |
| WO | 2007115224 A2 | 10/2007 |
| WO | 2009006542 A2 | 1/2009 |
| WO | 2009089116 | 7/2009 |
| WO | 2010093510 A1 | 8/2010 |
| WO | 2010105245 A2 | 9/2010 |
| WO | 2011088264 A1 | 7/2011 |

OTHER PUBLICATIONS

U.S. Appl. No. 13/669,589, filed Nov. 6, 2012, Office Action, Jul. 15, 2014.

U.S. Appl. No. 14/320,282, filed Jun. 30, 2014, Restriction Requirement, Sep. 29, 2014

U.S. Appl. No. 14/320,282, filed Jun. 30, 2014, Office Action, Oct. 15, 2014.

U.S. Appl. No. 14/320,228, filed Jun. 30, 2014, Office Action, Sep. 2, 2014.

Wendell Cochran; Journalists aren't frauds; the business has fine lines; Ethics classes would help them stay on right side; The Sun. Baltimore, Md.: Jul. 19, 1998. p. 6.C; http://proquest.umi.com/pqdweb?did=32341381&sid=3&Fmt=3&clientId=19649&RQT=309&VName=PQD.

http://en.wikipedia.org/wiki/Fantasy_football_(American), Nov. 28, 2014.

Ulken, A Question of Balance: Are Google News search results politically biased? May 5, 2005, <http://ulken.com/thesis/googlenews-bias-study.pdf>.

<http://en.wikipedia.org/wiki/SpinSpotter>, Jan. 9, 2013.

U.S. Appl. No. 13/763,847, filed Feb. 11, 2013, Notice of Allowance, Dec. 21, 2014.

U.S. Appl. No. 13/763,831, filed Feb. 11, 2013, Office Action, Dec. 2, 2014.

U.S. Appl. No. 13/565,013, filed Aug. 2, 2012, Office Action, Dec. 17, 2014.

http://jayrosen.posterous.com/my-simple-fix-for-the-messes-up-sunday-shows, dated Dec. 27, 2009, My Simple Fix for the Messed up Sunday Shows, 12 pages.

Accelerated Examination Support Document from U.S. Appl. No. 13/287,804, dated Nov. 2, 2011, 43 pages.

Preexam Search Document from U.S. Appl. No. 13/287,804, dated Nov. 2, 2011, 9 pages.

PoltiFact.org, archived pages accessed Sep. 2008, "The Latest Statements Were Reviewed", 31 pages.

Doddington et al. "Automatic Content Extraction (ACE) Program—Tasks, Data, and Evalutation", LREC 2004: 4th International Conference on Language Resources and Evaluation, dated May 24-30, 2004, 6 pgs.

US App No. 14/320, Filed Jun. 30, 2014, Final Office Action.

U.S. Appl. No. 13/946,209, filed Jul. 19, 2013, Notice of Allowance.

U.S. Appl. No. 13/798,836 filed Mar. 13, 2013, Final Office Action.

U.S. Appl. No. 13/763,860, filed Feb. 11, 2013, Final Office Action.

U.S. Appl. No. 13/763,856, filed Feb. 11, 2013, Office Action.

U.S. Appl. No. 13/763,837, filed Feb. 11, 2013, Office Action.

U.S. Appl. No. 13/669,589, filed Nov. 6, 2012, Final Office Action.

* cited by examiner

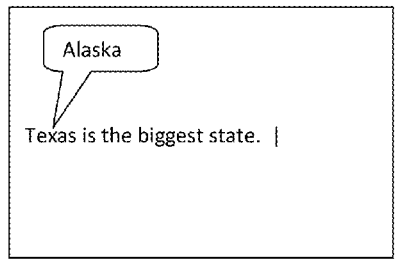
300
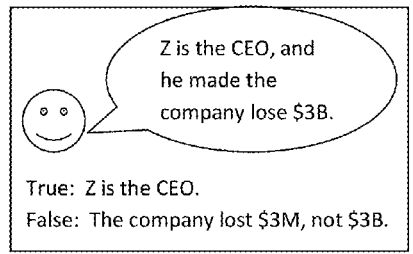
302
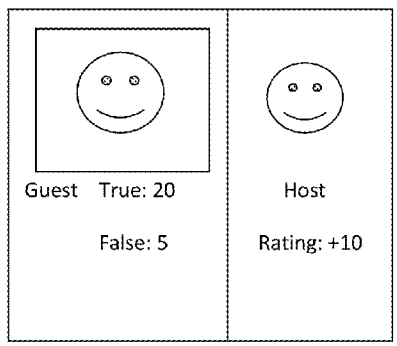
304
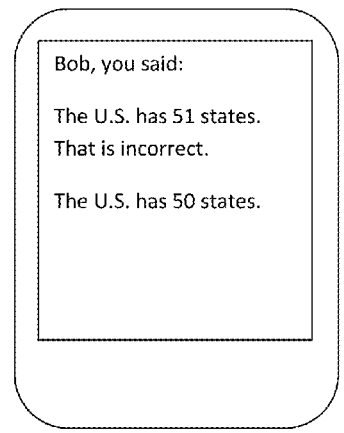
306
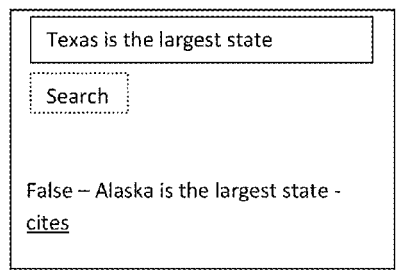
308
Figure 3

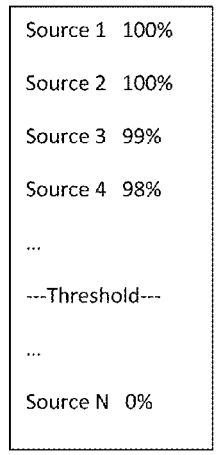
Figure 7
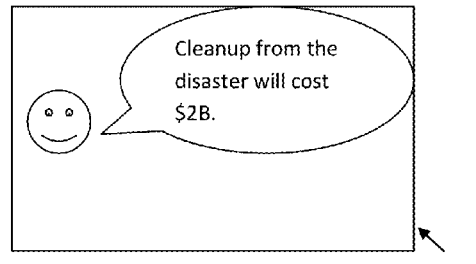
TV  800
Mobile device  802
Figure 8
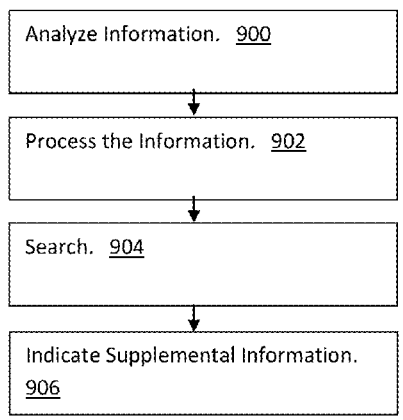
Figure 9

| Argument | Counter Argument |
|---|---|
| +Pro-Globalization | +Anti-Globalization |
| +Increased profits | +Lost US Jobs |
| +$5B profits in 2010 vs. $1B in 2000 | +US Unemployment at 10% |
| ... | ... |

Figure 10

| Brand X | Brand Y |
|---|---|
| ... | ... |

Figure 11

| User Selection/Info | Keywords | ... | Advertisement |
|---|---|---|---|
| Liberal, Environmental | Global Warming, Pollution, ... | ... | Hybrid X Vehicle |
| Conservative, Gun Owner | Second Amendment, Gun Control, ... | ... | Machine Gun Z |
| ... | | | |

Figure 12

*News Page Headlines*

President Plans to Cut Taxes   5

EPA to Enforce New Regulations   10

XYZ Corporation has $200M loss in Q3   2

Figure 13

|  | 10PM | 10:30PM | 11PM |
|---|---|---|---|
| XYZ (2) | News | News Analysis X | TV show Y |
|  | Homicide Report (10:01) | Taxes going up (10:31) | Intro (11:01) |
|  | Sports Report (10:04) | Personal (10:40) | Beach Segment (11:11) |
|  | ... | ... | ... |
|  | Weather Report (10:27) | Wrap up (10:57) | Closing (11:27) |
| JKL (3) | TV show | TV show | TV show |

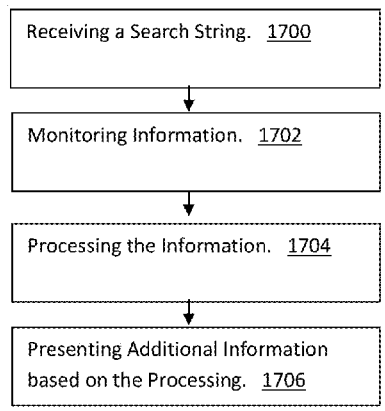
Figure 17
Figure 18
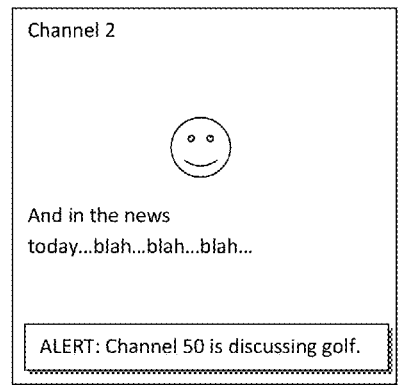
Figure 19
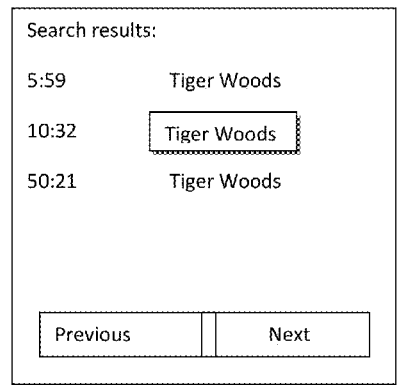
Figure 20

| Setting Up a Specific Fact Checking/ Supplemental Information Plan. 2100 |
| --- |
| ↓ |
| Selecting Which Plan to Use. 2102 |
| ↓ |
| Monitoring Information. 2104 |
| ↓ |
| Processing the Information. 2106 |
| ↓ |
| Searching for the Information. 2108 |
| ↓ |
| Presenting Additional Information based on the Processing. 2110 |

Figure 21

| How would you like the information analyzed? |
| --- |
| Ultra-conservative |
| Conservative |
| Moderate |
| Liberal |
| Ultra-Liberal |

| Which Channels? |
| --- |
| All \| 2 \| 3 \| ... \| 999 |

Figure 22

| How would you like to set up your opposing arguments plan? | |
| --- | --- |
| Which channels do your arguments apply to?<br><br>All \| 2 \| 3 \| ... \| 999 | Input responses to keywords:<br><br>http://www.myresponse.com |
| Input keywords to look out for:<br><br>Global Warming | Style of response:<br>◉ Send Text Message<br>◉ Display on TV |

Figure 23

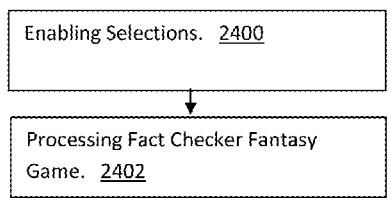
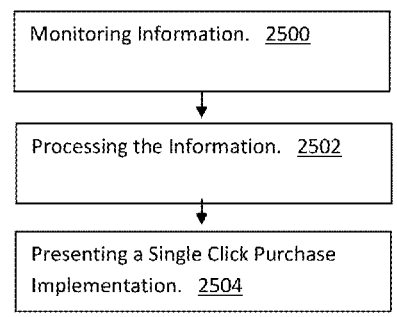
Figure 24
Figure 25
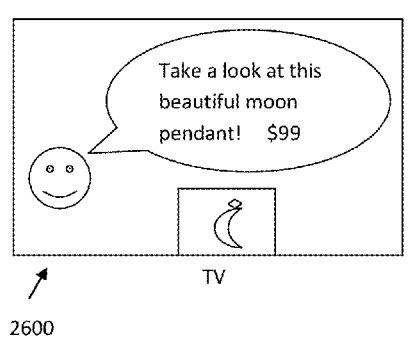
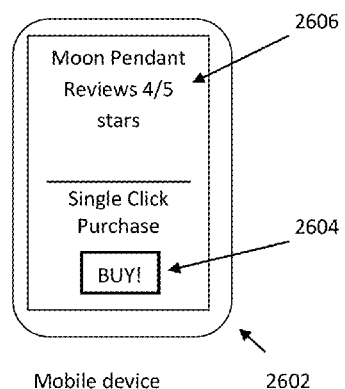
Figure 26

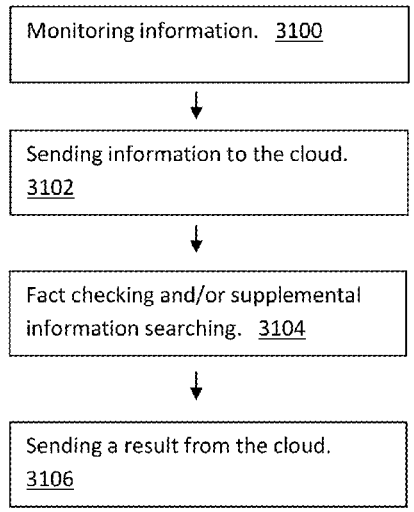
Figure 31
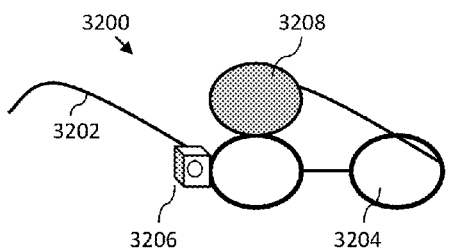
Figure 32
|  | Fact checking system | Network A | Network B |
|---|---|---|---|
| # of inaccuracies | 1 | 502 | 359 |
| # of biased points | 0 | 622 | 208 |
| # of misleading points | 0 | 875 | 527 |
Figure 33

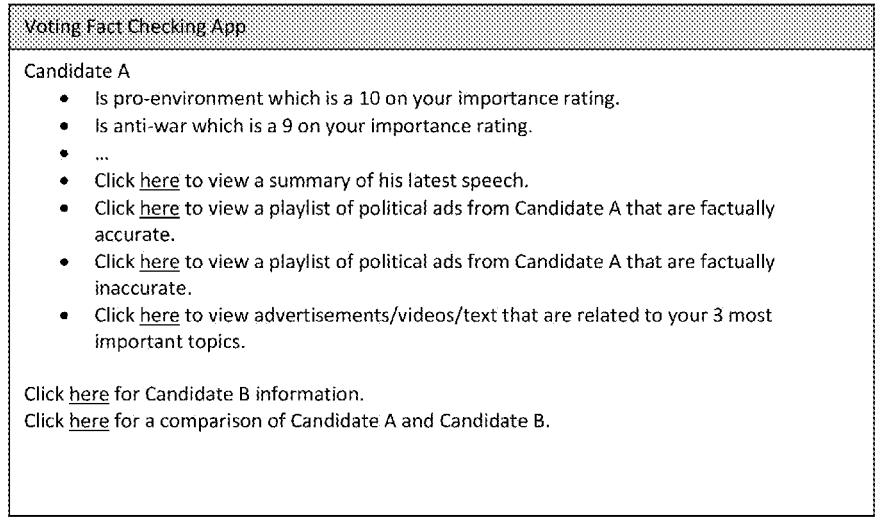

```
Voting Fact Checking App
Candidate A
    • Is pro-environment which is a 10 on your importance rating.
    • Is anti-war which is a 9 on your importance rating.
    • ...
    • Click here to view a summary of his latest speech.
    • Click here to view a playlist of political ads from Candidate A that are factually
      accurate.
    • Click here to view a playlist of political ads from Candidate A that are factually
      inaccurate.
    • Click here to view advertisements/videos/text that are related to your 3 most
      important topics.

Click here for Candidate B information.
Click here for a comparison of Candidate A and Candidate B.
```

Figure 41

Candidate Comparison

|  | Candidate A | Candidate B |
|---|---|---|
| # of misleading ads | 3 | 7 |
| # of inaccurate ads | 4 | 12 |
| # of negative ads | 22 | 21 |
| # of positive ads | 4 | 3 |
| # of supporting superpacs | 8 | 10 |
| # of misleading ads by superpacs | 12 | 10 |
| ... | ... | ... |
| Money spent | $500M | $700M |

Figure 42

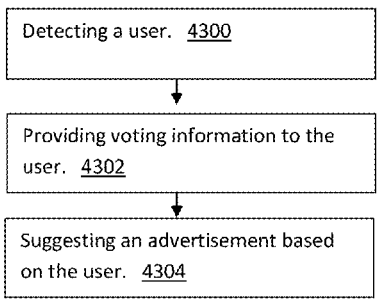
Figure 43
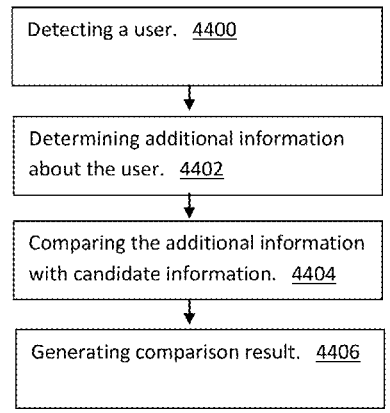
Figure 44
News Coverage Analysis
|  | Network W | Network X | Network Y | Network Z |
| --- | --- | --- | --- | --- |
| # of inaccuracies | 5 | 7 | 32 | 12 |
| # of ads shown for Candidate A | 3 | 3 | 7 | 5 |
| # of ads shown for Candidate B | 1 | 4 | 9 | 2 |
| # of stories for Candidate A | 11 | 10 | 14 | 19 |
| # of stories for Candidate B | 4 | 5 | 8 | 12 |
| # of stories against Candidate A | 2 | 2 | 12 | 8 |
| # of stories against Candidate B | 12 | 11 | 7 | 7 |
| ... | ... | ... |  |  |
| # of misleading stories | 22 | 29 | 37 | 35 |
Figure 45

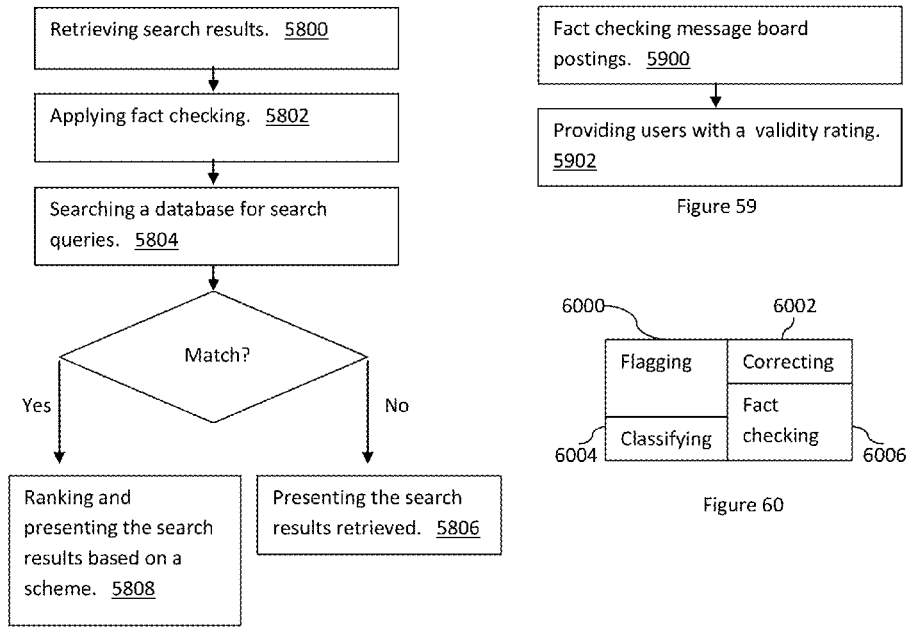
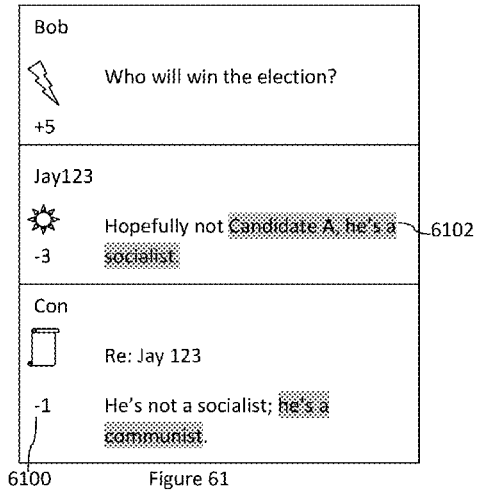

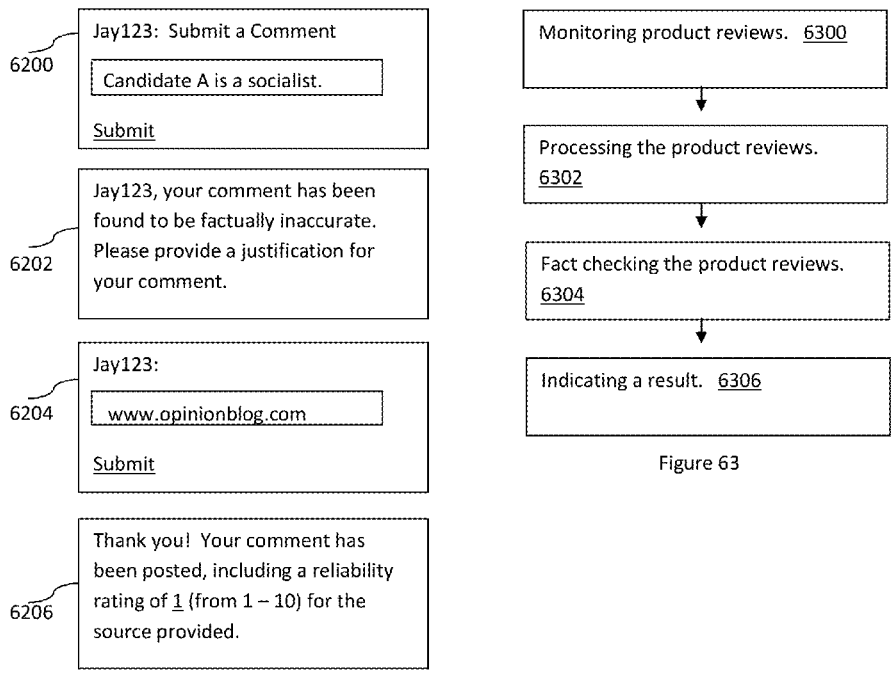
Figure 62
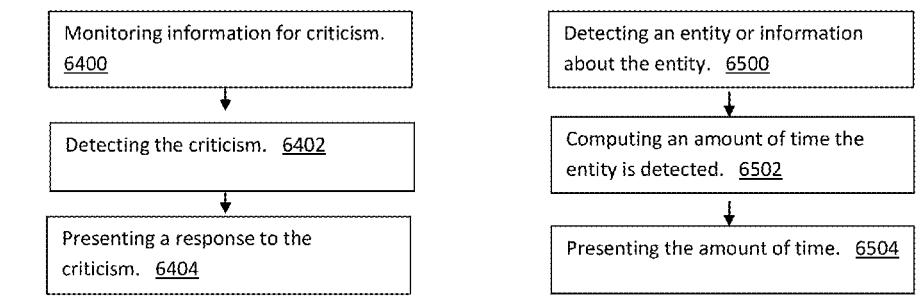
Figure 63
Figure 64
Figure 65

US 9,087,048 B2

METHOD OF AND SYSTEM FOR VALIDATING A FACT CHECKING SYSTEM

CROSS-REFERENCE TO RELATED APPLICATION(S)

This application is a continuation-in-part application of co-pending U.S. patent application Ser. No. 13/565,013, filed on Aug. 2, 2012, and titled "CANDIDATE FACT CHECKING METHOD AND SYSTEM" which is a continuation-in-part application of U.S. Pat. No. 8,321,295, filed on Jun. 20, 2012, and titled "FACT CHECKING METHOD AND SYSTEM" which is a continuation application of U.S. Pat. No. 8,229,795, filed on Apr. 17, 2012, and titled "FACT CHECKING METHODS" which is a continuation application of U.S. Pat. No. 8,185,448, filed on Nov. 2, 2011, and titled "FACT CHECKING METHOD AND SYSTEM" which claims the benefit of U.S. Provisional Patent Application Ser. No. 61/495,776, filed Jun. 10, 2011, and titled "FACT CHECKING METHOD AND SYSTEM," all of which are hereby incorporated by reference in their entireties for all purposes. This application also claims the benefit of U.S. Provisional Patent Application Ser. No. 61/736,181, filed Dec. 12, 2012, and titled "FACT CHECKING METHOD AND SYSTEM," which is hereby incorporated by reference in its entirety for all purposes.

FIELD OF THE INVENTION

The present invention relates to the field of information analysis. More specifically, the present invention relates to the field of automatically verifying the factual correctness of a statement.

BACKGROUND OF THE INVENTION

Information is easily dispersed through the Internet, television and many other outlets. One major problem is that the information dispersed is often not correct. Although there are fact checking websites available online, these websites check facts in a slow manner; typically not truly providing a fact check response for several hours or even days.

SUMMARY OF THE INVENTION

A fact checking system verifies the correctness of information and/or characterizes the information by comparing the information with one or more sources. The fact checking system automatically monitors, processes, fact checks information and indicates a status of the information.

The fact checking system includes many embodiments, some of which are summarized herein. The fact checking system is able to be used to provide supplemental information, for example, information regarding a communication, information about a person or other entity, advertisements, opposing advertisements, information about a user, information about an item, media analysis, commercial analysis, bias classification, a follow-up question for a host, arguments and opposing arguments, and information based on the importance to a user.

The fact checking system is able to be implemented using rated sources, classified sources, a recognition system, learning, context determination, auto-correction, parallel computing and/or many other features.

The fact checking system will provide users with vastly increased knowledge, limit the dissemination of misleading or incorrect information, provide increased revenue streams for content providers, increase advertising opportunities, and support many other advantages.

BRIEF DESCRIPTION OF THE DRAWINGS

FIG. 3 illustrates exemplary screenshots of various implementations of fact checking according to some embodiments.

FIG. 7 illustrates exemplary source ordering according to some embodiments.

FIG. 8 illustrates an example of providing supplemental information based on information from a television where the supplemental information is displayed on a user's mobile device according to some embodiments.

FIG. 9 illustrates a flowchart of a method of providing additional or supplemental information according to some embodiments.

FIG. 10 illustrates an exemplary table of arguments and counter arguments according to some embodiments.

FIG. 11 illustrates an exemplary table of brands according to some embodiments.

FIG. 12 illustrates an exemplary data structure implementing selections and advertising according to some embodiments.

FIG. 13 illustrates an exemplary listing of headlines with an importance rating according to some embodiments.

FIG. 17 illustrates a flowchart of a method of performing television analysis according to some embodiments.

FIG. 18 illustrates an exemplary user interface for receiving search information for television analysis according to some embodiments.

FIG. 19 illustrates an exemplary screenshot of an alert using television analysis according to some embodiments.

FIG. 20 illustrates an exemplary screenshot of search results according to some embodiments.

FIG. 21 illustrates a flowchart of a method of using opposing arguments by an opposing entity according to some embodiments.

FIG. 22 illustrates an exemplary user interface for receiving user selections for information analysis according to some embodiments.

FIG. 23 illustrates an exemplary user interface for receiving opposing argument selections according to some embodiments.

FIG. 24 illustrates a flowchart of a method of implementing a fact checker fantasy game according to some embodiments.

FIG. 25 illustrates a flowchart of a method of presenting a single click purchase implementation according to some embodiments.

FIG. 26 illustrates an exemplary single click purchase implementation on multiple devices according to some embodiments.

FIG. 31 illustrates a flowchart of a method of utilizing cloud computing for fact checking and providing supplemental information according to some embodiments.

FIG. 32 illustrates a diagram of fact checking glasses according to some embodiments.

FIG. 33 illustrates an exemplary chart comparing the accuracy of several entities according to some embodiments.

FIG. 41 illustrates an exemplary voting fact checking app according to some embodiments.

FIG. 42 illustrates an exemplary table of a candidate comparison according to some embodiments.

FIG. 43 illustrates a flowchart of a method of voting fact checking according to some embodiments.

FIG. 44 illustrates a flowchart of a method of voting fact checking according to some embodiments.

FIG. 45 illustrates an exemplary table of news coverage analysis according to some embodiments.

FIG. 58 illustrates a flowchart of a method of using a search engine in cooperation with social network information and fact checking information according to some embodiments.

FIG. 59 illustrates a flowchart of a method of fact checking a message board according to some embodiments.

FIG. 60 illustrates a block diagram of fact checking interactions with a message board according to some embodiments.

FIG. 61 illustrates a screen shot of an exemplary message board implementing fact checking according to some embodiments.

FIG. 62 illustrates a screen shot of an exemplary message board implementing fact checking before allowing a user to post according to some embodiments.

FIG. 63 illustrates a flowchart of a method of fact checking product reviews according to some embodiments.

FIG. 64 illustrates a flowchart of a method of monitoring for criticism of the fact checking system according to some embodiments.

FIG. 65 illustrates a flowchart of a method of calculating the amount of time or number of times an entity or topic is discussed according to some embodiments.

DETAILED DESCRIPTION OF THE PREFERRED EMBODIMENT

Figure 1:
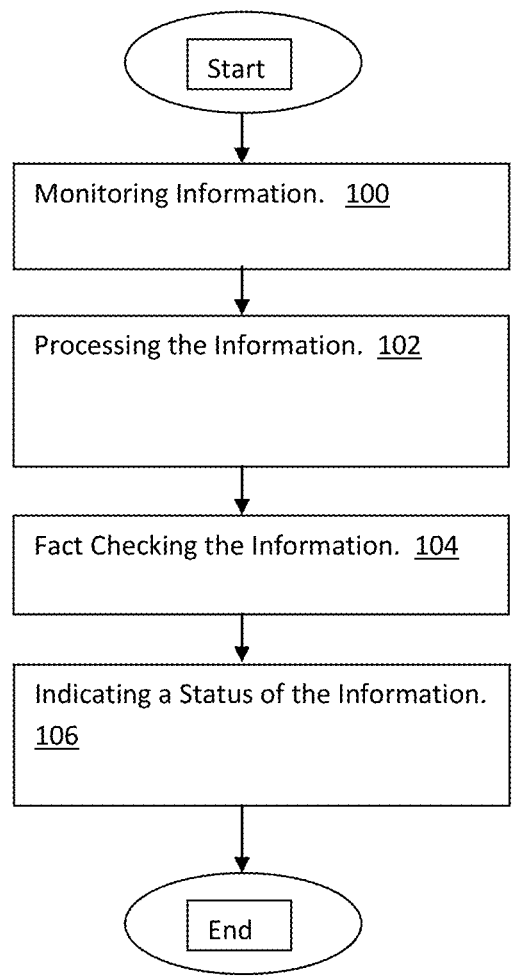
FIG. 1 illustrates a flowchart of a method of implementing fact checking according to some embodiments of the present invention.

A fact checking system verifies the correctness or accuracy of information by comparing the information with one or more sources. Although the phrase "fact checking" is used, any sort of information analysis is to be understood (e.g. determining a phrase is "spin" or sarcasm).

Monitoring

The fact checking system monitors any information including, but not limited to, text, video, audio, verbal communications or any other form of communication. Communications include, but are not limited to email, word processing documents, Twitter (tweets), message boards, web pages including, but not limited to, Facebook® postings and web logs, any computing device communication, telephone calls, television audio, video or text, other text, radio, television broadcasts/shows, radio broadcasts, face-to-face conversations, VoIP calls (e.g. Skype™), video conferencing, live speech and any other communication that is able to be analyzed. In some embodiments, monitoring includes recording, scanning or any other type of monitoring. In some embodiments, monitoring also includes capturing and/or transmitting the data. In some embodiments, monitoring includes determining if a portion of the information is fact checkable.

Processing

To perform fact checking, the monitored information is processed including, but not limited to, transmitted, converted, parsed, formatted, analyzed and reconfigured using context determination and/or any other processing. For example, voice data is converted to text, screen text is converted to usable text, graphics are converted to a usable form of data, or any other data conversion is able to be implemented to enable fact checking. For some types of monitored information, little, if any, processing is performed. For example, text which is already properly formatted is able to be fact checked without any conversion. In another example, when comparing audio to searchable audio records conversion may not be needed. In some embodiments, processing also includes capturing and/or transmitting the data. Formatting is able to include changing the order of words deleting unnecessary words and/or any other formatting to enable the information to be searched.

Verification/Fact Checking

The information including, but not limited to, phrases, segments, numbers, words, comments, values, graphics or any other data is analyzed or verified using the fact checking system. In some embodiments, a phrase is first located or determined, and then it is analyzed. The verification or fact checking process compares the data to be verified with data from one or more sources. In some embodiments, the sources are web pages on the Internet, one or more databases, one or more data stores and/or any other source. In some embodiments, the source is a personal source including, but not limited to, an online log or diary.

In some embodiments, the data verification or fact checking is a straight text comparison, and in some embodiments, another implementation including, but not limited to, natural language, context/contextual comparison or intelligent comparison is used. In some embodiments, a combination of search implementations is used.

An example of a straight text comparison is comparing the phrase, "Texas is the largest state" with text to find "Texas is the largest state." When the text is not found because Alaska is the largest state, a result of false is returned. An example of a context comparison is: "Texas is the largest state" where a list of states by size is found, and Texas is located in the list; when Texas is not #1, a result of false is returned, or the location in the list is returned, e.g. #2. In another example of context comparison: "Texas is the largest state," the land mass of Texas is compared with land masses of the other 49 states, and since Texas does not have the largest land mass, the result is false. An example of an intelligent comparison is: X criticizes Y because Y had an affair, then the intelligent comparison locates a story that indicates X had an affair two years ago. An indication of hypocrisy by X is presented.

In some embodiments, previously checked facts are stored (e.g. in a database on a server) to prevent the perpetration of a false statement or story, or other characterization. In some embodiments, the facts are first checked manually or automatically which is able to occur in real-time or non-real-time, but then when a repeat occurrence happens, the results of that fact check occurs in real-time. For example, a story that Candidate X is a communist is presented by one commentator. The story is fact checked, and the result of the fact check (e.g. not true) is stored, including the original comment and any context related. Then, when another commentator or anyone else says, "Candidate X is a communist," the fact checker uses the previously stored result to immediately inform a viewer/user that the story is not true. Thus, commentators and others will not bother perpetuating a false story as they will not only be proven wrong immediately but will also damage their credibility.

In some embodiments, the sources are rated using a rating system so that sources that provide false or inaccurate information are rated as poor or unreliable and/or are not used, and sources that rarely provide misinformation are rated as reliable and are used and/or given more weight than others. For example, if a source's rating falls or is below a threshold, that source is not used in fact checking. In some embodiments, users are able to designate the threshold. For example, a user specifies to fact check using only sources with an "A" rating or higher. In some embodiments, sources' ratings are available or shown to users. In some embodiments, users are able to rate sources. In some embodiments, sources are rated based on previous fact checking results to determine computer-generated ratings. For example, if a source is proven wrong by comparing the data with other sources or the results with other sources' results, that source would be rated as poor. For further example, Source X indicates that Z is true, but twenty other reliable sources indicate that Z is false. Such a result would affect Source X's reliability rating negatively. Examples of very reliable sources include a dictionary and an encyclopedia. An example of a potentially very unreliable source includes a biased, opinion web log that fabricates stories. In some embodiments, an impartial group or organization rates the sources, or any other method of rating the sources is used. In some embodiments, sources are reviewed by an agency (e.g. an independent rating agency) to obtain a reliability rating. In some embodiments, a combination of user ratings, computer ratings and/or other ratings is implemented. In some embodiments, there are separate classes of ratings or reviews including, but not limited to, general users, experts, friends, co-workers, news organizations or any other groups. The rating system is able to be numeric including, but not limited to, 1-10, by grades including, but not limited to A-F or any other rating or grading system. Furthermore, the rating system is able to be incorporated into a mathematical equation to provide higher quality results. For example, if a statement is being verified, and two different sets of results are found such that one set of results verifies the statement as fact and the other set verifies the statement as fiction, the one from the higher rated sources is selected. A sample equation is:

Source Result Value=Number of Sources*Average Rating of Sources, where the search path with highest Source Result Value determines the verification result. For example, "Person X is running for president," results in 10 sources with an average rating of 9 (where 1 is untrustworthy and 10 is very trustworthy) saying "True," and 20 sources with an average rating of 2 saying "False," the result would be "True" since (10*9)=90 is greater than (20*2)=40. Another sample equation is: Source Result Value=(Source Rating1+Source Rating2+ . . . Source Ratingn)/number of sources.

In some embodiments, the sources are classified in one or more classifications including, but not limited to, comedy, opinion, fact, fiction, and/or political. Any other classifications, groupings, sub-classifications, and/or sub-groupings are possible. In some embodiments, sources are rated in political terms including, but not limited to, independent, ultra-liberal, leaning left, neutral/moderate, leaning right, ultra-conservative, green, and libertarian.

In some embodiments, a user is able to customize which sources are used and/or not used. For example, if a user believes Source Z provides inaccurate information, the user is able to mark that source so that it is not used. In some embodiments, sources are clustered, so that a user is able to select a cluster instead of individual sources. For example, a user is able to select to use all dictionary and encyclopedic references. In some embodiments, a user is able to select sources based on characteristics including, but not limited to, a political characterization (e.g. conservative). Any other user selection or exclusion of sources is possible.

In some embodiments, a phrase to be fact checked may not have an exact answer, the answer may not be known at the time, or the fact checking system may not be able to find the answer. If this occurs, a "best guess" is able to be selected and presented. In some embodiments, each result from a source that is checked is able to include a result accuracy rating. For example, if a fact to be checked is, "the U.S. has 50 states," many sources should return a 100% accuracy rating for the result since it is easily searched for and determined within the sources. However, if a fact to be checked is not easily determined, the results may be less than 100% accurate and could therefore be labeled as a "best guess" including a confidence/accuracy/certainty percentage, instead of a fact.

In some embodiments, for example, where the facts are not certain, a collective determination system is used. For example, a determination that 40 sources (e.g. sites) agree with the statement and 5 disagree, allows the user to make a judgment call and look further into the statement.

In some embodiments, where a subjective statement is made or asked, ratings, objective information, and/or subjective information is located to determine the accuracy of the statement or question. For example, if a person says, "Star Wars is better than Star Trek," ratings information giving Star Wars an 8.5 and Star Trek and 8.0 would verify the validity of the statement, and the fact checker would return the statement "True." The ratings information is able to be any ratings information including, but not limited to, user ratings, critic ratings, other ratings or a combination thereof. In some embodiments, if an opinion is detected (e.g. by recognizing, "in my opinion," "I think" or another opinion phrase), the statement is not ruled as valid or invalid, but supporting information is able to be detected and presented (e.g. 10 sites agree with your opinion and 5 disagree). In some embodiments, if an opinion without basis/justification is detected, an indication of "unfounded opinion" is indicated or the basis is presented. In some embodiments, pros and cons of each are provided so that the user is able to make the determination of which is better. In some embodiments, when a user submits a subjective item, one or more results are presented that answer the subjective item. For example, if a user searches using a search engine for "the best restaurant in San Francisco," a single restaurant is presented which has the highest rating for restaurants in San Francisco. In some embodiments, since there are several rating agencies/sites, multiple restaurants are presented, and a description such as "highest rated by X" is presented next to each result. For example, Restaurant X is highest rated by source A, Restaurant Y is highest rated by source B and Restaurant Z is highest rated by source C. In some embodiments, all of the rating agencies/sites are compared, and a single entity is presented. For example, if there are 10 sites that rate songs, and 8 agree that Song J is the best ever, while 2 agree that Song L is the best ever, Song J is presented as the best song ever. In some embodiments, users are able to select how they want the results presented including, one ultimate result, a list of results, a graph of results, and/or any other presentation.

In some embodiments, context determination is used such that the context of the comment is checked in determining the validity of the comment. For example, if someone says, "he wasted billions of dollars," the "he" is determined based on additional context surrounding the statement. In another example, the question is also analyzed to determine if the response is valid. For instance, if a question asks, "Did you receive any money illegally?," and a respondent answers, "I have not been convicted of a crime," that comment is able to be flagged as "spin," "unresponsive," "questionable" or the like, since technically the answer to the question is true, but the point of the question has not really been answered. Other forms of context checking are able to be implemented as well to provide more information to the viewer. In some embodiments, when "spin," a nonresponsive response or any sort of questionable response is detected, a host is notified, so that he is able to press the issue. For example, a television show host asks a guest if the guest has ever "cheated on his taxes," and the guest responds with, "I have never been convicted of tax fraud." A yellow light is displayed to signal the host to ask the question in a different manner or further press the issue to try to get to the truth. As described herein, in some embodiments, an additional question is automatically presented (e.g. on a teleprompter or in his earpiece), so that the host does not have to formulate the additional question. In some embodiments, a follow-up question is presented to the host after every response by the guest. In some embodiments, the question is based on the guest's answer.

Context is able to be used in many ways to find an answer. For example, if Person A says Person B is biased, there may not be an exact statement to be found that says, "Person B is biased." However, using context, biased quotes, pictures, stories, audio, video or other data may be found from Person B which would indicate he is biased. Additionally, when there may be a gray area such as someone being biased, both sides are able to be found and presented for the viewer to determine the truth. For example, audio with Person B denigrating a specific group would indicate bias, but video of that same person helping that specific group would indicate non-bias or a change of view.

In some embodiments, hyperbole, sarcasm, comedy and other linguistic styles are checked and/or detected, and the information is indicated as such. Detection occurs using any contextual qualities including, but not limited to, the tone, the channel/station/type of website (e.g. a news channel), and/or type of person (e.g. comedian).

In some embodiments, causation is analyzed and fact checked. For example, if Z makes the statements, "A is Russian, Russia in the past was communist, therefore A is a communist," an indication that the causation is weak is presented. Weights of causation are able to be indicated including, but not limited to, weak causation, strong causation or a number rating including, but not limited to, 1 through 10. In some embodiments, causation is able to be analyzed by determining links between items, and the greater the number of links and/or the severity of the links, the greater the causation. Where causation is difficult to analyze and/or establish, an alert questioning causation is indicated. For example, if a commentator makes the statement that prices of goods went up in the under President Z, if there is insufficient data to indicate that the prices went up because of actions President Z took, an indication of "questionable causation" is able to be presented. In some embodiments, causation (or lack thereof) is determined by logical flaws or incorrectness. For example, if a commentator makes the claim that President Z harmed businesses by lowering taxes, an indication of "poor causation" is able to be made since it is logically inconsistent for lowering taxes to harm businesses. In some embodiments, sources supporting and/or contradicting the information are displayed. In some embodiments, a list or another description is displayed indicating other possible causes for the result. For example, if a commentator says the economy is in trouble because of the President, a list of other possible causes could be displayed such as Congress, a credit collapse, and others, including percentages next to each indicating percentages based on previous polling.

In some embodiments, when the data verification or fact checking occurs, one or more dedicated sources are used. In some embodiments, one or more non-dedicated sources are used. In some embodiments, a combination of dedicated and non-dedicated sources is used. In some embodiments, the reliability of the data verification depends on the number of sources used. For example, if a story has 5 independent sources that verify the story, then that would be considered and denoted more reliable than a story with 1 source. The reliability of the sources is also able to affect the reliability of the story. For example, although 5 sources verify a story, if the sources are all poorly rated sources in terms of reliability, then that story may be considered less reliable than a story that has 1 very reliable source. In some embodiments, an implementation is used to determine if the same story/article is used more than once as a source. For example, if there is only one source for an article but the same story is posted on ten different websites, in some embodiments, that repetition is recognized and only counts as one verification source.

In some embodiments, a user performs a check of the automatic fact check results.

In some embodiments, checks are performed to ensure sources or source data are not stale, or that stale sources or source data are not used when fact checking. For example, if the statement, "X is running for President" is made regarding the 2016 election, and several sources have data that show X ran for President in 2000, that data is ignored since it does not prove that X is running in the 2016 election. Checking for stale sources and source data is able to be done by comparing a creation date of the data or other characteristics or landmarks of the sources or data or any other manner.

In some embodiments, via social networking, contacts' sources' search results or other related information is used when performing a user's search. For example, a user fact checks the "Tiger is the best golfer," and a contact (e.g. friend) had already done this fact check. The results from that fact check are given to this user. This is able to improve search speed and accuracy.

Indicating Status

After fact checking is performed, an indication or alert is used to indicate/inform/alert a user of a status of the information including, but not limited to, correct/true/valid or incorrect/false/invalid. In addition to correct and incorrect, other gray area indicators are possible including, but not limited to, "unknown," "depending on the circumstances" or "close to the truth." Additionally, any other status indicators are possible. The indicators are able to be any indicators including, but not limited to, lights, sounds, highlighting, text, a text bubble, a scrolling text, color gradient, headnotes/footnotes, an iconic or graphical representation (e.g. a meter, Pinocchio's nose or thumbs up/down), a video or video clip, music, other visual or audio indicators, a projection, a hologram, a tactile indicator including, but not limited to, vibrations, an olfactory indicator, a Tweet, an email, a page, a phone call, or any combination thereof. For example, text is able to be highlighted or the text color is able to change based on the validity of the text. For example, as a user types, the true statements are displayed in green, the questionable statements are displayed in yellow and the false statements are displayed in red. Similarly, when a commentator speaks on a television program, true statements are displayed in a first color and false statements are displayed in a second color. Additional colors or shades of color or brightness of colors are able to be used to indicate other items including, but not limited to, hyperbole, opinions, and other items. In some embodiments, sources to the verification data are provided (e.g. using hyperlinks or citations). In some embodiments, the text itself includes a hyperlink. The source enables the user to verify the statement himself, for example, by reviewing an original source for an article. In some embodiments, a phrase itself is not affected or labeled, but additional information is provided in close proximity. For example, if a politician on a talk show says, "the President raised the deficit by $1 T this year," the fact checking system presents data showing the deficit from last year and this year, so that users are able to compare what the politician said and what an independent source said. In some embodiments, indicating includes transmitting and/or broadcasting the indication to one or more devices (e.g. televisions).

In some embodiments, the fact checking system is implemented such that responses, validity determinations and/or indications are available in real-time or near real-time. By real-time, it is meant instantaneously, for example, such that when a politician makes a comment on a political show, within a second or a few seconds, the comment is fact checked, and an indication of the validity of the comment is presented. Furthermore, since the monitoring, processing, fact checking and indicating are all able to be performed automatically without user intervention, real-time also means faster than having a human perform the search and presenting results. Depending on the implementation, in some embodiments, the indication is presented in at most 1 second, at most several seconds (e.g. at most 5 seconds), at most a minute, at most several minutes or by the end of a show. In some embodiments, the time amount (e.g. at most 1 second) begins once a user pauses in typing, once a phrase has been communicated, once a phrase has been determined, at the end of a sentence, once an item is flagged, or another point in a sequence. For example, a commentator makes the comment, "Z is running for President." As soon as that phrase is detected, the fact checker checks the fact, returns a result and displays an indication based on the result in less than 1 second—clearly much faster than a human performing a search, analyzing the search results and then typing a result to be displayed on a screen.

FIG. 1 illustrates a flowchart of a method of implementing fact checking according to some embodiments of the present invention.

In the step 100, information is monitored. In some embodiments, all information is monitored; in some embodiments, only some information is monitored; or in some embodiments, only explicitly selected information is monitored. In some embodiments, although all information is monitored, only some information (e.g. information deemed to be fact-based) is utilized for the fact check analysis. Monitoring is able to be implemented in any manner including, but not limited to, storing or recording the information, transmitting the information, and any other method of monitoring. The information to be monitored is any information including, but not limited to, television audio, video or text, other text, radio, television broadcasts/shows, radio broadcasts, word processing data and/or documents, email, Twitter (tweets), message boards, web pages including, but not limited to, Facebook® postings and web logs, any computing device communication, telephone calls, face-to-face conversations, VoIP calls (e.g. Skype™), video conferencing, live speech and any other information. In some embodiments, monitoring includes, but is not limited to, observing, tracking, collecting, scanning, following, surveying and/or overseeing.

In the step 102, the information is processed. In some embodiments, processing includes converting the information into a searchable format. During or after the information is monitored, the information is converted into a searchable format. Processing is able to include many aspects including, but not limited to, converting audio into text, formatting, parsing data, determining context and/or any other aspect that enables the information to be fact checked. Parsing, for example, includes separating a long speech into separate phrases that are each separately fact checked. For example, a speech may include 100 different facts that should be separately fact checked. In some embodiments, the step 102 is able to be skipped if processing is not necessary (e.g. text in word processor may not need to be processed).

In a more specific example of processing, broadcast information is converted into searchable information (e.g. audio is converted into searchable text), and then the searchable information is parsed into fact checkable portions (e.g. segments of the searchable text; several word phrases). Parsing is able to be implemented in any manner including, but not limited to, based on sentence structure (e.g. subject/verb determination), based on punctuation including, but not limited to, end punctuation of each sentence (e.g. period, question mark, exclamation point), based on search results and/or any other manner. In some embodiments, processing includes, but is not limited to, calculating, computing, storing, recognition, speaker recognition, language (word, phrase, sentence, other) recognition, labeling, and/or characterizing.

In the step 104, the information is fact checked. Fact checking includes comparing the information to one or more sources of information to determine the validity, accuracy, quality, character and/or type of the information. In some embodiments, the comparison is a straight word for word text comparison. In some embodiments, the comparison is a context comparison. In some embodiments, an intelligent comparison is implemented to perform the fact check. Any method of analyzing the source information and/or comparing the information to the source information to analyze and/or characterizing the information is able to be implemented. An example implementation of fact checking includes searching (e.g. a search engine's search), parsing the results or searching through the results of the search, comparing the results with the information to be checked using one or more of the comparisons (e.g. straight text, context or intelligent) and retrieving results based on the comparison. The results are able to be any type including, but not limited to, binary, Boolean (True/False), text, numerical or any other format. In some embodiments, determining context and/or other aspects of converting could be implemented in the step 104. In some embodiments, the sources are rated and/or weighted. Although the phrase "fact checking" is used, any sort of information analysis is to be understood (e.g. determining a phrase is sarcasm).

In the step 106, a status of the information is indicated. The status is indicated in any manner including, but not limited to, transmitting and/or displaying text, highlighting, underlining, color effects, a visual or audible alert or alarm, a graphical representation, and/or any other indication. The meaning of the status is able to be any meaning including, but not limited to, correct, incorrect, valid, true, false, invalid, opinion, hyperbole, sarcasm, hypocritical, comedy, unknown, questionable, suspicious, need more information, deceptive, and/or any other status. The status is also able to include other information including, but not limited to, statistics, citations and/or quotes. Indicating the status of the information is also able to include providing additional information related to the fact checked information. In some embodiments, indicating includes pointing out, showing, displaying, recommending, playing, presenting, announcing, arguing, convincing, signaling, asserting, persuading, demonstrating, denoting, expressing, hinting, illustrating, implying, tagging, labeling, characterizing, and/or revealing.

In some embodiments, fewer or more steps are implemented. Furthermore, in some embodiments, the order of the steps is modified. In some embodiments, the steps are performed on the same device, and in some embodiments, one or more of the steps, or parts of the steps, are separately performed and/or performed on separate devices.

Example 1

A news channel broadcasts a show with political commentary. The show allows a host and guests to discuss various political issues. As the host and guests make comments, their comments are monitored, converted from speech to text and automatically fact checked using online data sources. Based on the results of the fact check, a status of the comments is shown. For example, if the guests respond with factually accurate statements, no alert is displayed. However, when a guest or host makes an untrue statement, an alert is displayed at the bottom of the screen including a quote of the incorrect statement and a correction to the statement. If a guest "spins" a comment, the fact checker is able to determine "spin" and indicate "spin" for the comment and provide data that explains why it is spin. This ensures the guests provide valid data and arguments, as well as maintains the integrity of the show.

Example 2

A user is typing a report using a word processor. As the user is typing, the word processor monitors the information being input. Depending on the format of the information, the information may not need to be converted. The information, such as segments of the report, is fact checked. For example, a user is typing a report on the history of New Jersey and types, "Newark is the capital of New Jersey." The fact checker would compare this segment with an online source such as Wikipedia.org and determine that Trenton is the capital of New Jersey. As a result, the word processor would strikethrough "Newark" and next to it, insert Trenton, underlined. Any other means of indicating that the information is wrong is able to be used. In some embodiments, supplemental information and/or citation information is provided. For example, regarding the capital city, information such as Trenton became the capital in 1790, and the state flower is the Common Violet. In some embodiments, the fact checker is used as a citation finder. For example, if a user types in a statement, regardless of whether it is correct, the user is able to select the text and click "cite finder" where the fact checker provides sources that verify the statement. The "cite finder" is not limited to word processing applications and is able to be applied in any implementation.

Example 3

A user posting information to his Facebook® page types commentary regarding his favorite golfer, and says, "I can't believe Tiger came in eighth this week." Using additional data such as knowing when the commentary was written and that the user is an avid golf fan, after monitoring this information, converting the information including adding the context of Tiger Woods (the famous golfer), at the Masters, in 2011, the fact checker is then able to compare this information with the results of that specific tournament for that specific golfer. Then, a blurb with a citation is able to be posted on the user's Facebook® page to indicate that Tiger actually finished fourth, or the user is informed so that he is able to correct the page himself.

Example 4

A user searches using a search engine by inputting "Alaska is the largest state." The search engine provides a response of True and also displays one or more links to the sources that support the result. In another example using the search engine, a user searches using the phrase, "Magic Johnson is taller than Michael Jordan." The search engine determines that Magic Johnson is 6' 9" and Michael Jordan is 6' 6" and then compares the heights with a mathematical operator to provide the result of True. In some embodiments, the heights of each are displayed, and in some embodiments, one or more cites providing the information used in the comparison are displayed.

Figure 2:
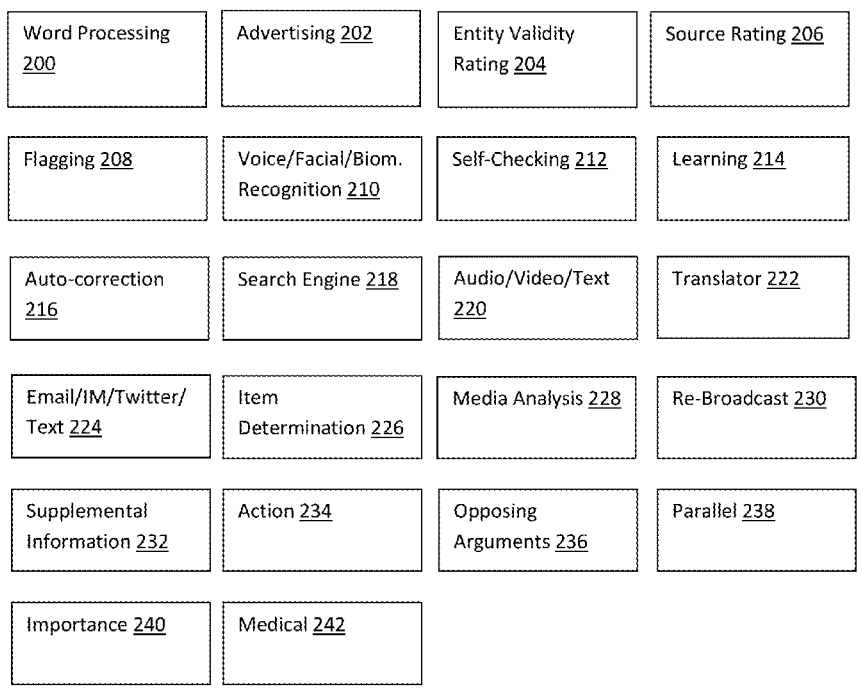
FIG. 2 illustrates a block diagram of various implementations of fact checking according to some embodiments.

FIG. 2 illustrates a block diagram of various implementations of fact checking according to some embodiments. As described herein, some specific implementations are shown including, but not limited to, a word processing component 200 for incorporation with a word processing application, an advertising component 202 for advertising, an entity validity rating component 204 for rating entities, a source rating component 206 for rating sources, a flagging component 208 for flagging items, a voice/facial/biometric recognition component 210 for recognizing entities, a self-checking component 212 for checking a user, a learning component 214 for learning, an auto-correction component 216 for implementing auto-correction, a search engine component 218 for implementing a search engine fact checker, an audio/video/text component 220 for fact checking audio, video, text and any other information, a translator component 222 for translation-fact checking, a text component 224 for fact checking an email, instant message, text messages, tweets or other text communications, an item determination component 226 for determining an item, a media analysis component 228 for analyzing media including but not limited to, television and radio, a re-broadcast component 230 for applying fact checking analysis to re-broadcasted information, a supplemental information component 232 for providing supplemental information to content, an action component 234 for taking an action against an entity based on the fact checking, an opposing arguments component 236 for providing opposing arguments to content, a parallel component 238 for implementing parallel monitoring, processing, fact checking and/or indicating, an importance rating component 240 for determining the importance of content, and a medical fact checker component 242 for fact checking medical information. The various implementations shown are not meant to be limiting in any way and are merely examples of some of the possible implementations.

FIG. 3 illustrates exemplary screenshots of various implementations of fact checking according to some embodiments.

Screenshot 300 shows a word processing display where a user typed a statement, the statement has been fact checked, and a notification appears with a suggestion to correct the incorrect statement. Although a bubble with the correction is shown, any form of indicating an error and/or correction is possible including, but not limited to, underlining, strikethrough, highlighting, an icon, and/or an audible alert. When there are multiple ways of correcting a statement, a user is able to be given options as described herein.

Screenshot 302 shows a television screen where a commentator is making statements. Since the commentator made a false statement, text is displayed at the bottom of the screen indicating the statement is false and providing a correction of the false statement.

Screenshot 304 shows multiple forms of rating speakers on a television broadcast. Statistics for the guest speaker in the window are shown below the window indicating the number of true statements he has made and the number of false statements he has made. A rating is displayed under the host of +10 which, for example, is a positive rating of +10 on a −10 to +10 truthfulness scale. These ratings enable users to determine how trustworthy the speaker is based on past results.

Screenshot 306 shows a smart phone which monitored a user's comments and informed him that he misspoke by saying the U.S. has 51 states.

Screenshot 308 shows a search engine search and result. In the example, the user searches for the fact, "Texas is the largest state." The result presented is "False," a correction is shown, and citations (links) of supporting websites or other sources are shown. In another the example, the user searches for the fact, "Alaska is the largest state." The result presented is "True" and citations (links) of supporting websites or other sources are shown. The displayed results are able to vary from simple (e.g. merely presenting True or False) to more detailed (e.g. presenting True or False, providing a correction if false, providing specific information, and providing citations).

The various implementations illustrated in FIG. 3 are not meant to be limiting in any way and are merely examples of some of the possible implementations.

Figure 4:
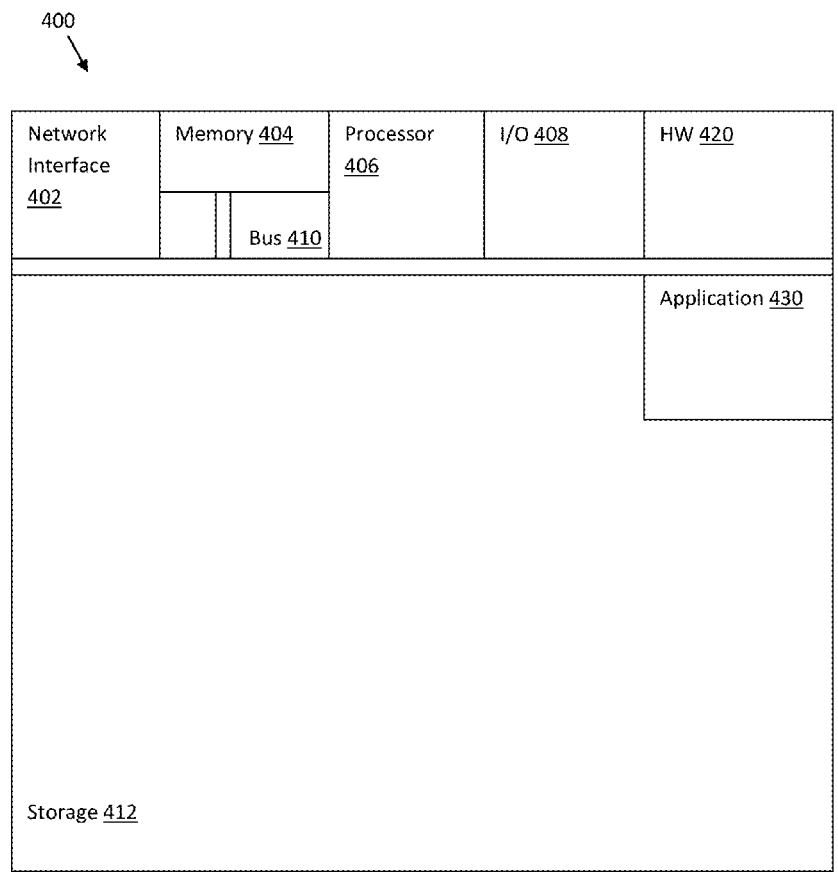
FIG. 4 illustrates a block diagram of an exemplary computing device configured to implement fact checking according to some embodiments.

FIG. 4 illustrates a block diagram of an exemplary computing device 400 configured to implement the fact checking method according to some embodiments. The computing device 400 is able to be used to acquire, store, compute, process, communicate and/or display information including, but not limited to, text, images, videos and audio. In some examples, the computing device 400 is able to be used to monitor information, process the information, fact check the information and/or indicate a status of the information. In general, a hardware structure suitable for implementing the computing device 400 includes a network interface 402, a memory 404, a processor 406, I/O device(s) 408, a bus 410 and a storage device 412. The choice of processor is not critical as long as a suitable processor with sufficient speed is chosen. The memory 404 is able to be any conventional computer memory known in the art. The storage device 412 is able to include a hard drive, CDROM, CDRW, DVD, DVDRW, flash memory card, solid state drive or any other storage device. The computing device 400 is able to include one or more network interfaces 402. An example of a network interface includes a network card connected to an Ethernet or other type of LAN. The I/O device(s) 408 are able to include one or more of the following: keyboard, mouse, monitor, display, printer, modem, touchscreen, touchpad, speaker/microphone, voice input device, button interface, hand-waving, body-motion capture, touchless 3D input, joystick, remote control, brain-computer interface/direct neural interface/brain-machine interface, and other devices. In some embodiments, the hardware structure includes multiple processors and other hardware to perform parallel processing. Fact checking application(s) 430 used to perform the monitoring, converting, fact checking and indicating are likely to be stored in the storage device 412 and memory 404 and processed as applications are typically processed. More or less components shown in FIG. 4 are able to be included in the computing device 400. In some embodiments, fact checking hardware 420 is included. Although the computing device 400 in FIG. 4 includes applications 430 and hardware 420 for implementing the fact checking, the fact checking method is able to be implemented on a computing device in hardware, firmware, software or any combination thereof. For example, in some embodiments, the fact checking applications 430 are programmed in a memory and executed using a processor. In another example, in some embodiments, the fact checking hardware 420 is programmed hardware logic including gates specifically designed to implement the method.

In some embodiments, the fact checking application(s) 430 include several applications and/or modules. Modules include a monitoring module for monitoring information, a processing module for processing (e.g. converting) information, a fact checking module for fact checking information and an indication module for indicating a status of the information. In some embodiments, modules include one or more sub-modules as well. In some embodiments, fewer or additional modules are able to be included. In some embodiments, the applications and/or the modules are located on different devices. For example, a device performs monitoring, converting and fact checking but the indicating is performed on a different device, or in another example, the monitoring and converting occurs on a first device, the fact checking occurs on a second device and the indicating occurs on a third device. Any configuration of where the applications/modules are located is able to be implemented such that the fact checking system is executed.

Examples of suitable computing devices include, but are not limited to a personal computer, a laptop computer, a computer workstation, a server, a mainframe computer, a handheld computer, a personal digital assistant, a pager, a telephone, a fax machine, a cellular/mobile telephone, a smart appliance, a gaming console, a digital camera, a digital camcorder, a camera phone, a smart phone/device (e.g. a Droid® or an iPhone®), an iPod®, a tablet (e.g. an iPad®), a video player, an e-reader (e.g. Kindle™), a DVD writer/player, a Blu-ray® writer/player, a television, a copy machine, a scanner, a car stereo, a stereo, a satellite, a DVR (e.g. TiVo®), a home entertainment system or any other suitable computing device.

Figure 5:
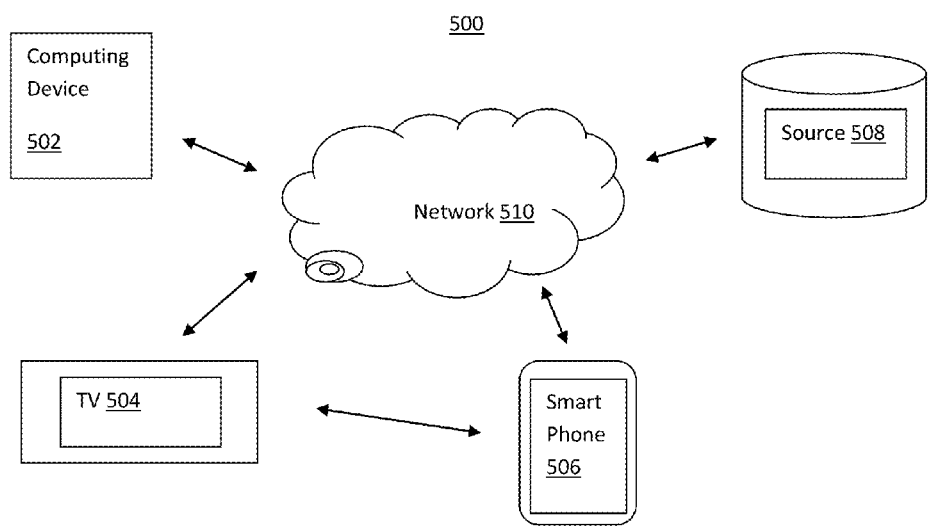
FIG. 5 illustrates a diagram of a network of devices configured to implement fact checking according to some embodiments.

FIG. 5 illustrates a network of devices configured to implement fact checking according to some embodiments. The network of devices 500 is able to include any number of devices and any various devices including, but not limited to, a computing device (e.g. a tablet) 502, a television 504, a smart device 506 (e.g. a smart phone) and a source 508 (e.g. a database) coupled through a network 510 (e.g. the Internet). The source device 508 is able to be any device containing a source including, but not limited to, a searchable database, web pages, transcripts, statistics, historical information, or any other information or device that provides information. The network 510 is able to any network or networks including, but not limited to, the Internet, an intranet, a LAN/WAN/MAN, wireless, wired, Ethernet, satellite, a combination of networks, or any other implementation of communicating. The devices are able to communicate with each other through the network 510 or directly to each other. One or more of the devices is able to be an end user, a media organization, a company and/or another entity. In some embodiments, peer-to-peer sourcing is implemented. For example, the source of the data to be compared with is not on a localized source but is found on peer sources.

For example, a news company uses its computers to monitor and process information presented on its broadcast. The processed information is then fact checked with one or more sources (on site and/or external), and then the results are presented to the user's home device such as a television. The monitoring, processing, fact checking and presenting are all able to occur locally at the news company, externally by another entity, or parts occur locally and parts occur externally. In a modified example, the results are sent to and presented to a user on her computer, smart phone or tablet while she is watching television.

In another example, when a user is watching television, the user's smart phone monitors and processes information from the television and sends the information to be fact checked, and then the results are presented on the user's smart phone.

In another example, when a user is watching television, the user's computing device monitors and processes information from the television and sends the information to be fact checked, and then the results are presented on the user's computing device.

In another example, when a user is watching television, the user's smart phone monitors and processes information from the television and sends the information to be fact checked, and then the results are sent from the user's smart phone to the television to be presented.

Any combination of devices performing the fact checking system is possible.

Implementations

Advertising

Figure 6:
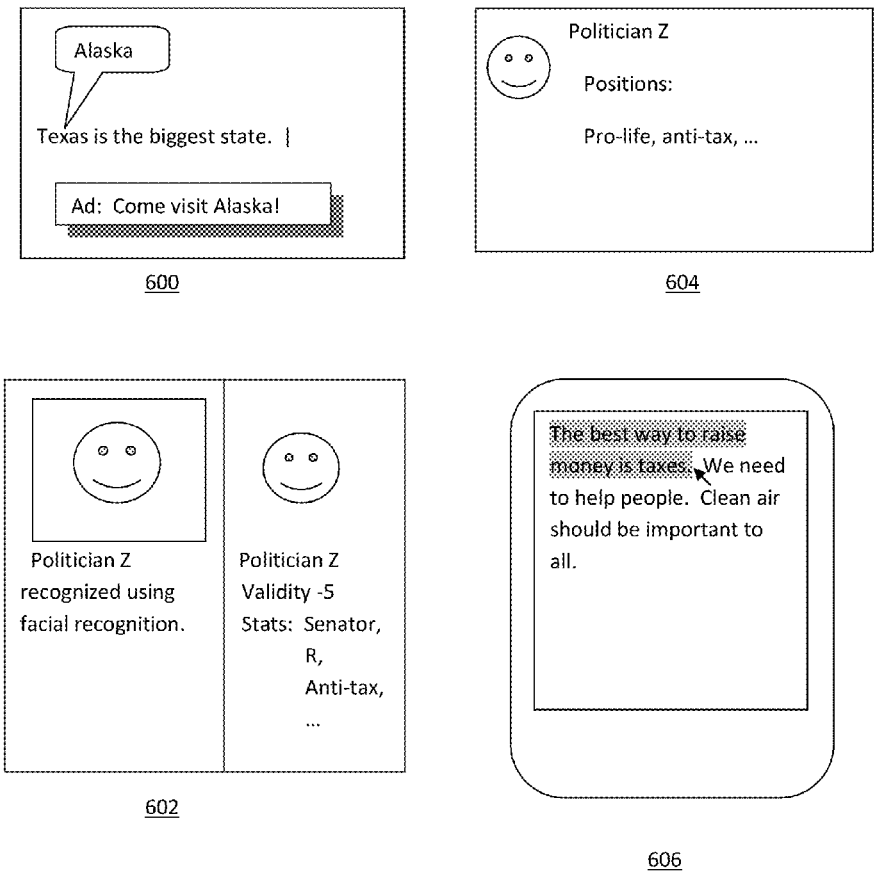
FIG. 6 illustrates exemplary implementations according to some embodiments.

In some embodiments, advertising is incorporated with the fact checking system. For example, a fact checking result includes, "This fact check is brought to you by: Company X." In some embodiments, the advertising is related to the item being checked or the result of the fact check. For example, if the fact to be checked is "California is the most populated state," an advertisement about California is presented. In some embodiments, the advertising is based on other information instead of or in addition to the fact to be checked including, but not limited to, a user's age, sex, location, occupation, industry of the fact, location of a subject, or any other information. In some embodiments, personal networking information is used including, but not limited to, Facebook® information. In some embodiments, coupons are presented with the fact checking. For example, if a fact to be checked is whether "Ice Cream Z is gluten-free," a coupon for Brand Z ice cream is presented to the user. Another example is pay per click or click-through money-making. Any other implementation of making money using the fact checking system is able to be implemented. FIG. 6 illustrates exemplary implementations including an advertisement 600. Additional advertising implementations are described herein, for example, in the Supplemental Information section.

Entity Validity Rating and Recognition

In some embodiments, an entity including, but not limited to, a speaker, author or another entity (e.g. corporation) has a validity rating that is included with the distribution of information from him/it (for example, see FIG. 3, screenshot 304). For example, if a politician has been found to have misstated the truth, an indication of such is able to be displayed when he appears on a television program. In another example, when a commentator appears, statistics of how many factually accurate statements have been made by him and/or factually inaccurate statements have been made by him are presented during the show. In some embodiments, parameters related to the statistics are able to be selected (e.g. specific to a show or a time period). In some embodiments, a running tally is presented throughout the show. The indication is able to include any information including, but not limited to, statistics, highlighting, the other indications described herein and/or any indication to further inform the audience of his trustworthiness. In the example further, text appears on the television screen, such as at the bottom, which states, Senator A has misstated the truth 10 times, but has been truthful 20 times. The severity of the misstatement is also able to be factored in when rating a person or entity. For example, stating that something occurs 90% of the time but in reality it occurs 89% of the time is a minor and possible ignorable mistake. However, stating something occurs 90% of the time when it occurs 20% of the time is not likely a rounding error or a slip of the tongue. Additionally, the subject of the mistake is also able to be taken into account in terms of severity. For example, if a person makes an untrue statement about the country of origin of baseball, that is a minor mistake, whereas making an untrue statement about tax information is a major mistake, and the major mistake is weighted more than the minor mistake. In some embodiments, an independent agency determines what is major and what is minor. In some embodiments, individual users are able to indicate what is important to them and what is not. In some embodiments, another implementation of determining what is major, minor and in between is implemented. The context of the situation/statement is also able to be taken into account. In some embodiments, entities are able to fix their validity rating if they apologize for or correct a mistake, although measures are able to be taken to prevent abuses of apologies. Another specific form of indication includes gradients of coloring such that a truthful person is highlighted with a border in bright green, and the green becomes less bright as the truthfulness of the person decreases and becomes red when they are viewed as less than truthful, ultimately reaching bright red when considered completely untruthful. Any combination of colors is able to be used, or any other indication described herein is able to be used. In some embodiments, in addition to or instead of a validity rating, an entity is able to include another rating, including, but not limited to, a comedic rating or a political rating. In some embodiments, an entity includes a classification including, but not limited to, political, comedy or opinion. Examples of information or statistics presented when an entity appears include, but are not limited to the number of lies, misstatements, truthful statements, hypocritical statements or actions, questionable statements, spin, or any other characterizations. In some embodiments, the information or statistics are available through a link, mouse-over, picture-in-picture or other implementation. In some embodiments, specifics of the statements are able to be viewed; for example, by clicking on "hypocritical statements," a list of the hypocritical statements is presented to the user. In some embodiments, both the hypocritical statement and the source statement are shown. In some embodiments, the source for one or both of the statements is shown. Additional statistical information is available too, including, but not limited to, the severity of the statement (e.g. egregious lie versus minor mistake). In some embodiments, users are able to specify an amount of statements shown: by number of statements, by time period of statements (e.g. last 6 months) or by any other implementation. For example, Person X's last 5 hypocritical statements (out of 30) are shown. In some embodiments, dates or time frames are used in determining the relevance of fact check comparison. For example, if a hypocritical statement was made 30 years ago, the fact checker may realize that it was more likely a change of view rather than a hypocritical statement; whereas, a contradictory statement made 2 weeks ago is likely due to hypocrisy not a change of view. In some embodiments, friends, family members, co-workers, users and others have validity ratings.

In some embodiments, the entity rating is implemented using a database or other data structure. For example, the database includes a column or row with names and their corresponding entity rating. In embodiments where additional information is stored, additional column(s) include specific information such as hypocritical statements, severity of the mistakes, and any other information. The database is then used to look up the entity's information for indicating the information.

In some embodiments, people/face recognition is implemented. For example, a politician is on a talk show, and the face recognition identifies the politician. Once recognized, information about the politician is displayed including, but not limited to, the validity rating described herein, statistics, and/or other information. In some embodiments, the information posted includes quotes of most outrageous things said, most truthful things said, or other specific quotes. Similarly, other recognition is able to be implemented including, but not limited to, voice recognition or biometric recognition. For example, a mobile application recognizes who is talking by voice recognition and posts a validity rating and/or other information on the phone. In other examples, at a dinner party the mobile application is able to identify a person who tells tall tales, or at a negotiation, the application is able to indicate if the opposing side is honest. Voice recognition is also able to identify someone on a television show or radio show. In some embodiments, users' online/screen/usernames are identified. In some embodiments, a person's identity is input by a user, and then information is displayed about that person. FIG. 6 illustrates exemplary implementations including facial/people recognition 602.

In some embodiments, when an entity is displayed (e.g. on a device screen), the entity's positions on topics are displayed. For example, political positions are displayed (e.g. pro-life, pro-choice, anti-tax, others). The positions are able to be regarding a lighter material than political positions such as personal preferences regarding foods, entertainment and any other information. In some embodiments, different magnitudes regarding the positions are able to be displayed. For example, if someone is a fervent anti-war activist, the person's fervor is indicated. In some embodiments, evidence is provided showing the entity's position. For example, a voting record is shown to indicate that the person may be saying she is against raising taxes, but voted 10 times to raise taxes while in Congress. FIG. 6 illustrates exemplary implementations including entity information 604.

Flagging

In some embodiments, users are able to flag statements. FIG. 6 illustrates exemplary implementations including flagging information 606, where highlighting text is shown. Users are able to flag the statements using Twitter, polling, text messaging (e.g. SMS or MMS), audio texts, video texts, phone, voice, selecting (e.g. with a mouse, keyboard, remote control, hand-waving, body-motion capture, touchless 3D input or joystick), highlighting, copying, or any other implementation of flagging a statement. In some embodiments, a flagged statement is then highlighted or another effect is applied. Flagging is also able to include a "thumbs up"/"thumbs down" or "happy face"/"frown" representation, for example, users who feel the statement is valid would give a "thumbs up." Although the word "flag" is used, the strict definition is not implied. Any form of highlighting, pointing out, commenting on, selecting, or linking to is able to be implemented. Comments are able to be flagged as valid/true, invalid/untrue, questionable, unverifiable, depending (on context) or using a scale including, but not limited to, 1-10, where 1 is blatantly false and 10 is definitely true. Comments are also able to be flagged as spin, comedy, sarcasm, hyperbole, hypocritical and/or any other characterization. Comments are able to be flagged to force them to be fact checked (e.g. manually forced fact checking). Additionally, comments are able to include support for the flag, including, but not limited to, a citation supporting or proving the user's position.

In some embodiments, the users who flag statements are rated. For example, the users are rated by comparing their flagging with results of a fact check. In some embodiments, if a user is wrong often, then his flag is not used. In some embodiments, if a user's rating is or falls below a threshold, the user is ignored. In some embodiments, separate classes of users are implemented for flagging, including, but not limited to, media, viewer, and professional. In some embodiments, if a user is correct often, his flag is used and is able to have a stronger value. In some embodiments, a weighting scheme is used such that a value of a user's flag is proportional to the correctness of previous flags. For example, if User A flags 100 items as wrong, and after a fact check, the user is found to have wrongly flagged 95 items, that user's future flags will have little weight or will possibly be ignored; whereas, if User B flags 100 items as wrong, and after a fact check, the user is found to have correctly flagged 95 items, that user's future flags will have weight and possibly additional weight compared to others. In some embodiments, a competition is implemented using flagging where users are asked to assess the validity of statements, and the user who is correct the most often wins the competition. Any other competitions involved with fact checking are possible as well.

Structure, Execution and Sources

In some embodiments, a site is specifically designed (e.g. formatted) for data verification or fact analysis. For example, common quotes and/or data are appropriately formatted to be compared with other text, speech or any other communication. In an example, speech checking occurs such that if a commentator says, "Person A said X, Y and Z," a digital version of the transcript would be located and compared to determine if Person A actually said X, Y and Z.

In some embodiments, the fact checking system has the ability to learn. The learning is able to be in terms of context, detecting items like sarcasm, cheating or manipulation of data sources and other items that would help the fact checking process. In some embodiments, a database is used to track people's comment habits or history and other information. For example, if Person X is known for using hyperbole, the fact checking system is able to recognize that and then provide future indications using such knowledge. In some embodiments, new sources are able to be found using learning. For example, a crawler, data miner, bot, and/or other implementation is able to search for and utilize additional sources of information for fact checking. Learning is also able to include analyzing archived data of sources to determine the reliability of the sources. In some embodiments, if a characterization or other item has not been learned, an expandable list of options is presented to a user for the user to select an option.

In some embodiments, an auto-correction feature is implemented. For example, if text is being monitored, when a factual statement is inaccurate, the text is automatically changed. In some embodiments, the user is asked if they want to correct the statement. In some embodiments, the flawed text is merely indicated including, but not limited to, underlined, highlighted or change in font/color. In some embodiments, in video, the auto-correction feature automatically posts text on the video with the correction.

In some embodiments, specific phrases known to be true or false are added to a database and/or a website, so that the fact checking system is able to indicate the correctness of the phrase. For example, if one news organization is known for misquoting someone and continuing to use the misquote instead of the correct quote, that is able to be determined, and the quote is indicated as incorrect. In some embodiments, the correct quote is displayed or is accessible (e.g. through a hyperlink).

In some embodiments, determining which phrases to be fact checked is performed automatically (e.g. by a computing device). In some embodiments, determining which phrases to be fact checked is performed manually. For example, while a television broadcast is occurring, one or more individuals select segments of the broadcast to be fact checked. As a further example, if a person says, "we need to do something about taxes, unemployment is at 10%," the first part of that sentence probably does not need to be fact checked or is labeled an opinion, but "unemployment is at 10%" is an easily verifiable fact. In some embodiments, manual and automatic fact checking are implemented together. For example, a user selects a sentence to be fact checked out of a paragraph, but a device automatically parses the sentence for separate phrases to be fact checked.

In some embodiments, information is checked for being stale or outdated. For example, if a news organization runs a story that occurred many months ago but presents the story as occurring recently, the fact checking system is able to alert the user by presenting a date of when the story initially occurred. Determining if the information is stale is able to be performed in any manner including, but not limited to, a date comparison. In some embodiments, fact checking is updated as information changes. For example, saying X is running for President may be labeled as "uncertain" at one point, but then when X officially declares that he is running, the label is changed to "true."

In some embodiments, the source of the information to be checked and/or the organization presenting the information to be checked are related to and/or are working in cooperation with the fact checking system. For example, a news organization implements its own fact checking system to present results to viewers. In some embodiments, the source of the information to be checked and/or the organization presenting the information to be checked are unrelated to and/or are not working in cooperation with the fact checking system. For example, a company independent from the news organization implements the fact checking system on a user's mobile device so that when the mobile device receives information from the news organization, the mobile device performs the fact checking.

In some embodiments, caching is implemented to speed up the fact checking process. Caching is able to be implemented in any manner. In an example, if Commentator X is known to spread the same lie, that specific lie is not re-checked; rather, when that lie is made, an indication that the statement is a lie is presented based on cached analysis of the statement. In some embodiments, cached data is re-checked periodically to ensure the data does not become stale. In some embodiments, the re-checking occurs in the background to avoid interruption of any other processing.

Any search algorithm, sorting algorithm, data structure and/or other data organizational or analysis scheme is able to be used to implement the fact checking system and any other systems described herein. For example, advanced search algorithms, advanced search text algorithms, indexing and searching by indices, including combinations of search implementations, are able to be used. Data structures including, but not limited to, arrays, queues, maps, buffers, tables, matrices, lists, trees, heaps, graphs, classes and subclasses, databases, and other structures, including combinations of data structures are able to be used. The search, sorting, data structure and/or other data organizational or analysis scheme is able to be used in any aspect of the fact checking system including, but not limited to, locating sources, organizing sources, comparing information with source information, searching within sources, storing sources and any other aspect. In another example, a data structure is used for implementing the fact checker and/or providing supplemental information by storing relationships and/or related items, including, but not limited to, arguments/opposing arguments, misquotes/correct quotes, brands/competitors, and/or any other items.

In some embodiments, pattern recognition of recognizing a pattern is implemented in any aspect of the fact checking system. For example, the pattern recognition is implemented in monitoring information. In another example, the pattern recognition is implemented in processing the information. In another example, pattern recognition is implemented in fact checking including, but not limited to, locating sources, organizing sources, comparing information with source information, searching within sources, storing sources and any other aspect.

In some embodiments, a queue or other structure is implemented to store facts or other items to be checked when a connection is not available.

In some embodiments, sources are rated based on popularity or "trending." For example, if Site X has 1,000,000 individual hits per day, and Site Z has 50 individual hits per day, Site X has a higher popularity. Popularity is able to be established using any method including, but not limited to, total hits per time frame, unique hits per time frame, quantity of links to the source, quality of linking items to the source, duration of existence of the source, any other method and/or any combination thereof. Any of the sorting, filtering and applying of thresholds described regarding reliability ratings and sources is able to be applied to popularity and sources. For example, the fact checker is able to be limited to sources with a popularity above a specified threshold. In some embodiments, both popularity and reliability are implemented in determining which sources to use. In some embodiments, other reliability determinations are used with the popularity rating to determine the reliability of a source.

In some embodiments, the sources are ordered by reliability (for example, as shown in FIG. 7), and when information is fact checked, the process of fact checking starts the search with the most reliable source and continues to less reliable sources. In some embodiments, a structure such as a tree, list or any other structure includes pointers to the sources ordered by reliability. In some embodiments, the order is descending order from most reliable to least reliable. In some embodiments, the order is ascending order from least reliable to most reliable. In some embodiments, the order is configurable. In some embodiments, a fact checking search stops after N (e.g. N=2) sources verify the fact.

A short version of an exemplary list of sources ordered by reliability includes:
1. a link to the Random House Dictionary website with a reliability rating of 100% reliability,
2. a link to the Britannica Online Encyclopedia website with a reliability rating of 100% reliability,
3. a link to the XYZ News website, with a 90% reliability, and
4. a link to Bob's made-up-opinion-on-all-things website, with a 1% reliability.

In some embodiments, multilevel fact checking is implemented. For example, a phrase is fact checked, but before the fact check is completed, the source is fact checked to determine if the source is reliable. The multilevel fact checking is able to continue until a reliable source is found, and then the fact check of the phrase is completed with the reliable source.

In some embodiments, sources are classified as fact/objective and opinion/subjective. For example, a data structure such as a tree is implemented with objective sources on one side of the tree and subjective sources on the other side of the tree. In another example, as one goes left to right at the bottom of the tree, the sources go from most objective to most subjective. The sources are able to be classified by determining what the majority of their content is, by being classified by a user, by including a classification tag, or any other method.

In some embodiments, a determination of whether information is taken out of context is made. The determination is made by comparing the audio, video, text and/or other content used with the original or full version. For example, if a news organization shows a clip (e.g. portion of a video), the entire video is made available to a user for a period of time before and/or after of the clip is shown. For example, 30 seconds of the video before the clip started is shown.

In some embodiments, the data verification or fact checking occurs on a remote server including, but not limited to, a central server. The results are able to be cached and/or sent to users' local machines. In some embodiments, the data verification or fact checking occurs at a user's local machine. In some embodiments, the data verification or fact checking occurs using cloud computing.

The fact checking system is able to be implemented on a separate device that couples or communicates with a television; as part of a television, radio or Internet broadcast or any other broadcast; on a mobile device including, but not limited to, an iPhone® or Droid®; on a computer; on a tablet including, but not limited to, an iPad®; or any other device.

In some embodiments, the fact checking system is a smartphone application including, but not limited to, an iPhone®, Droid® or Blackberry® application. In some embodiments, a broadcaster performs the fact checking. In some embodiments, a user's television performs the fact checking. In some embodiments, a user's mobile device performs the fact checking and causes (e.g. sends) the results to be displayed on the user's television and/or another device. In some embodiments, the television sends the fact checking result to a smart phone.

In some embodiments, parallel monitoring, processing, fact checking and/or indicating is implemented. For example, two or more implementations of a fact checker are used. In the example, the two or more implementations are able to be on the same device or on different devices. In a further example, each implementation is different, and then the results of each are compared to determine a "best" result and/or to provide several results. For example, one implementation of a fact checker excludes certain sources, while another fact checker uses all sources, and their results are able to be different, and in some embodiments, the different results are presented to a user and/or ratings are provided with the results and/or other information is provided. In some embodiments, monitoring and processing are implemented in parallel with fact checking. For example, one device monitors and processes information and a second device performs the fact checking while the monitoring and processing occurs. In some embodiments, pipelining is implemented. In some embodiments, distributed processing is implemented. For example, multiple devices perform fact checking (e.g. searching, comparing and returning results) and return a composite result. In some embodiments, separate fact checkers are implemented to fact check multiple data providers (e.g. broadcasters, newspapers, websites and/or any other communications/information). In some embodiments, the fact checking multiple data providers occurs at the same time, and in some embodiments, the fact checking occurs at different times. For example, 3 fact checkers are implemented to fact check 3 major cable news networks. In some embodiments, one fact checker is able to fact check multiple data providers at the same time. When fact checking multiple data providers, the information from each is able to be shared, compared, and/or any other processing/analysis is able to be performed. For example, if 5 out of 6 data providers lead with Story A, but the 6th data provider leads with Story B, an indication is able to be made that Story B is presenting different information. In some embodiments, multiple fact checkers are used to fact check different aspects of a show. For example, a first fact checker is used to fact check historical information, a second fact checker is used to fact check charts and graphics, and a third fact checker is used to provide supplemental information.

Supplemental Information

FIG. 8 illustrates an example of providing supplemental information based on information from a television 800 where the supplemental information is displayed on a user's mobile device 802. In some embodiments, the fact checking system provides clarifying comments or additional (or supplemental) information to assist a user or viewer. For example, if a commentator makes a general statement that the cost of a cleanup will cost X dollars, the fact checking system is able to find specifics regarding the cost and provide a detailed explanation of each component of the total cost.

FIG. 9 illustrates a flowchart of a method of providing additional or supplemental information according to some embodiments. In the step 900, information is monitored. For example, broadcast information (e.g. a television program or advertisement) is monitored. In the step 902, the information is processed. For example, the information is parsed. In the step 904, additional or supplemental information is searched for and returned. For example, a database is searched to find opposing arguments to an argument, or supporting arguments are searched for on web pages, or a competitor's advertisement is located in a database, or any other supplemental information is found and returned. The amount of information returned depends on the implementation. For example, a link to a webpage could be returned, a link to a video, the video itself, text, and/or any other information is returned. In the step 906, the supplemental information is indicated or displayed. For example, an opposing argument is displayed on a mobile device. As described herein, monitoring, processing, searching and indicating are able to be implemented in many different ways and are able to include many different items.

In some embodiments, supplemental information is provided without performing the step of fact checking. For example, monitoring, processing and indicating still occur, but instead of fact checking, supplemental information is found and returned. As an example, a news show is monitored, processed (e.g. converted and parsed), and then supplemental information is determined (e.g. located) and indicated. For example, a person discusses a new candidate from North Dakota, North Dakota is searched for and is found in an encyclopedic source, some or all of the encyclopedic information is retrieved, and supplemental information providing statistics about North Dakota is shown. In another example, a person states, "the U.S. debt has been growing significantly under this President;" supplemental information is able to be displayed showing U.S. debt growth under some or all of the previous Presidents. In another example, if a complex issue is discussed, clarification is provided. For instance, if a complex economic issue is discussed, the issue is broken down into simpler parts. In yet another example, if something is explained incorrectly or not clearly, clarification is provided. For example, during the Presidential race, national polls are displayed regularly; however, national polls mean very little due to the Electoral College election system of the U.S. Therefore, supplemental information providing battleground state polling is able to be shown to supplement the national polls. In some embodiments, supplemental information is provided for both sides of an argument. Any of the other steps and implementations described herein are applicable to provide supplemental information without fact checking.

In some embodiments, supplemental information includes an advertisement. In some embodiments, a price comparison is displayed. In another example, a viewer is watching an awards show and on the red carpet, celebrities are wearing designer brands of attire, and an advertisement for each dress/suit/shoe/clothing/jewelry/items is displayed (or a similar knock-off item is displayed). In some embodiments, the supplemental information is presented on the same device the user is watching (e.g. television). In some embodiments, the supplemental information is presented on a separate device such as mobile device and/or another device. In some embodiments, the supplemental information is a Tweet, an email, a text message and/or any other communication. In some embodiments, the advertisement is presented during the program being viewed, and in some embodiments, the advertisement is presented after the program is viewed.

In some embodiments, supplemental information is provided based on a headline, title, caption, talking point and/or other short phrase. For example, titles (or any other short phrases) are monitored, processed, fact checked and a result is indicated. In some embodiments, the step of fact checking is replaced with finding supplemental information. By focusing on just the title, less processing takes place. For example, if a news program begins the show with "Nasdaq Hammered," statistical information of the worst days for the Nasdaq are indicated for the user. In another example, if a headline states, "Taxes Going Up," supplemental information that specifies which taxes are going up, by how much and when the taxes are going up is indicated. Or in some instances, rebuttal supplemental information that indicates taxes are not going up (e.g. if the information is outdated or new information showing taxes are not going up) is presented. The amount of supplemental information is able to be as short as a single word (e.g. False!) or as detailed as a 200+ page study or anywhere in between and including any kind of information to provide the user with more information. In some embodiments, analysis of only the title (or other heading) is used for an opposing view to be presented. For example, if a headline states, "Global Warming Causing Wildfires," supplemental information of an opposing view that discusses how the wildfires are caused by La Niña is presented.

Supplemental information is found and returned in any manner, including, but not limited to, the same or similar manner(s) described regarding fact checking. For example, information is searched for by comparing the information with sources, and information related to the searched for information is returned. In another example, the supplemental information is stored in a data structure such as a database or table.

In some embodiments, one or more opposing arguments are indicated in response to content or information. In some embodiments, the opposing arguments are based on fact checking information. In some embodiments, the opposing arguments are indicated without fact checking the information; rather, opposing arguments are determined and presented. For example, an argument is determined, the argument is classified, an opposing argument is determined, and then the argument is presented. In some embodiments, a table (or other data structure) contains arguments and matching opposing arguments. In some embodiments, the opposing argument or supplemental information is based on political classification. In some embodiments, a set of links of arguments are coupled with opposing arguments. For example, a pro-life argument is detected, which finds that argument in the table, and then the counter-argument coupled with the argument is found. FIG. 10 illustrates an exemplary table of arguments and counter-arguments according to some embodiments. Sub-arguments and sub-counter-arguments are also able to be included. In another example, if a person makes a comment with a position, an opposing position is indicated without fact checking the position. To further the example, if a guest on a political show makes a comment, an opposing position is indicated on the television screen in text. Indicating the opposing position is able to be in any manner as described herein (e.g. text on a television screen or text on a mobile device). In some embodiments, determining the opposing argument is able to be based on keywords detected, based on the speaker/author/entity of the position, based on political leanings of the speaker/author/entity, based on context, based on metadata, and/or based on any other detection described herein. For example, if a keyword of "abortion" is detected, and the speaker is a strict conservative, a description of a liberal view is presented. In another example, if keywords of "President" and "economy" are detected by a liberal commentator, context is able to be used such as the current date to determine which President is being discussed, and economic data, past and present, including comparisons, is able to be presented to the user. Such additional information would help guarantee a balanced presentation of information to users.

In some embodiments, an opposing advertisement is presented when an advertisement is presented. For example, if there is a commercial for Beer X displayed on the television, a commercial for Beer Y is displayed on the user's mobile device, on a smaller section of the television (e.g. bottom of the screen), or another device. FIG. 11 illustrates an exemplary table with Brand X and Brand Y, where when a Brand X commercial is detected, a Brand Y commercial is displayed on the user's device, or vice versa. In some embodiments, a fee scheme is implemented with this to collect advertising money from Brand Y. In some embodiments, multiple companies/products are included within the table (e.g. Brand X, Brand Y and Brand Z), and when one is detected one or more of the others is displayed (e.g. in a random manner, in an alternating manner, based on advertising fees by the brands, or in any other manner). In another example, when an advertisement for a new medicine is detected, supplemental information providing the side effects and other negatives is displayed. In another example, an opposing political advertisement is displayed. In some embodiments, the groupings of the arguments or commercials/products/companies are generated automatically (e.g. based on searches), and in some embodiments a user inputs groupings, or both are implemented. In another example, an advertisement for Candidate X is displayed, and an advertisement for Candidate Y is displayed on the same device or another device. In some embodiments, a correction or contradiction to an advertisement is displayed. For example, an advertisement says, Candidate X raised taxes N times, and a correction and/or advertisement explains Candidate X never raised taxes. As described herein, an automatic rebuttal is able to be implemented. For example, if Candidate X knows of the advertisements run by Candidate Y which attack Candidate X, Candidate X is able to generate advertisements that directly refute the attacks which are then run at the same time or in response to the Candidate Y advertisements (for example, using a table similar to FIG. 11 where Candidate X and Candidate Y are in the same row of the table or another form of linking). In some embodiments, the original content (e.g. advertisement) and the opposing content are displayed on the same device, and in some embodiments, the original content and the opposing content are displayed on different devices (e.g. original on television, opposing on mobile device or vice versa). As described herein, in some embodiments, a commercial or advertisement is detected based on a product, a company and/or language in the commercial/advertisement, metadata, or any other method. For example, an advertisement for Soda Brand X by XYZ Corp. is detected based on monitoring for "Soda Brand X," "XYZ Corp." and/or a catch-phrase or other language used in commercial/advertisement. In some embodiments, a commercial/advertisement is detected using another implementation.

In some embodiments, opposing arguments are presented by an opposing entity including, but not limited to, a website, television company/network/station, person, company and/or other entity. Information is able to be monitored, processed, compared with/searched for (e.g. in a lookup table or database) and then the opposing argument is presented. For example, a first entity is able to fact check and/or respond to another entity with the first entity's analysis (possibly biased analysis). The first entity makes selections of how to fact check, analyze and/or respond. The selections include but are not limited to the site/station/network/show to analyze, keywords or arguments to look out for, responses to arguments, sources to use, styles of responses, format of output, and/or any other selections. For example, a conservative blogger selects a liberal news organization to monitor, specifically indicates to automatically monitor for "global warming" and indicates a set of links to books and articles to be displayed that present an opposing view of global warming. Then, when a viewer is watching programs from that organization, any time global warming is discussed, the viewer is presented the set of links. In some embodiments, the arguments and opposing arguments are stored in a data structure such as a table. In some embodiments, the selections are grouped by political classification (e.g. liberal, conservative or any others) and/or grouped by other classifications, for example, so the user only has to select his political classification without specifying other details. In some embodiments, a user makes selections (e.g. specifying that he is a conservative), and in some embodiments, the selection is automatic. The automatic selection is able to be based on analysis of websites the user visits (e.g. browser history shows he goes to liberal websites, so automatically select liberal), based on purchases the user makes (e.g. buys "green" products, so automatically select liberal), based on television/radio shows watched/listened to (watches conservative talk show, so automatically select conservative), and/or any other automatic selection. In some embodiments, a database or other data structure is used to classify and store the website names/links, television shows, and any other information. In some embodiments, a user's selection is automatically generated based on social networking information such as associations (e.g. if Facebook® friends are conservative, assume user is conservative). In some embodiments, users are able to make several selections to further specify their orientations (e.g. selecting: socially liberal, fiscally conservative, and environmental). The selections are able to be very broad, very specific, somewhere in between, and are able to be many selections or a single selection.

In some embodiments, advertising is presented based on a user's selection(s) and/or classification(s). In some embodiments, advertising is presented based on the monitored language. For example, if a user is indicated as liberal and a global warming topic is monitored, a Prius advertisement is presented. Additional information regarding the user is also able to be incorporated in determining the advertisement to be presented. For example, if the user is a new mom and liberal, and an environmental topic is presented, an advertisement for "green" diapers is presented. FIG. 12 illustrates an exemplary data structure (e.g. a database or a table) implementing selections and advertising. In the example, user selections/information, keywords to monitor and advertisements are maintained, as well as any other relevant information. Further in the example, user information includes that the user is a liberal and an environmentalist, therefore the keyword/phrase "Global Warming" is monitored for, and when detected, an advertisement for a Hybrid X Vehicle is displayed. In some embodiments, recent search history of the user is also included in the data structure.

In some embodiments, supplemental information is indicated for entertainment shows. For example, if a television show is about teen pregnancies, then educational videos, images, links, statistics, games, advertisements, or any other information is indicated. The supplemental information is able to be found using any implementation such as by the searching and comparison described herein including searching a data structure (e.g. a database) which stores the information to be presented in response to the entertainment information. In another example, if the show appears to glorify teen pregnancies, information regarding the negatives of teen pregnancy is presented. Similarly, if a television network is promoting purchasing housing or even "flipping" housing, negatives of owning housing or the dangers of "flipping" housing are presented. In some embodiments, specific details about the "flipped" house are shown, for example, the purchase price, the expenses, and the sales price. For sports shows, statistics and/or other information is shown. For example, if a user is watching a football game on television or on his mobile device, and the game is in the fourth quarter, and the quarterback just threw a completion, additional information is presented on the user's television or mobile device which shows statistics (e.g. game statistics, historical statistics, other statistics, personal information, other information) of the quarterback. For example, to increase the viewing audience, the personal information could be information that would interest a person not interested in football itself, including, but not limited to, the player's girlfriend, age, alma mater, home town, likes/dislikes, and other information to entice other viewers to watch. In some embodiments, the supplemental information explains the sport/game including, but not limited to, what just happened, why there was a penalty, the rules of the sport/game (e.g. how to play Texas Hold'em), the purpose of the sport/game and/or any other explanation to help the audience. In some embodiments, the supplemental information provides an easy way to purchase items. For example, a football jersey advertisement is presented for the jersey of the player who just had an exciting play. The way to purchase the item(s) could be a link to a store to purchase the items, a single button purchase or any other way of providing sales. The supplemental sales information could be related to a commercial or advertisement. For example, if a commercial is displayed for X Brand mountain bikes, then a store locator is displayed on a user's device indicating where to purchase the X Brand mountain bike, or an online site with a link to purchase the item (e.g. bike) is presented. In some embodiments, when a movie is being played, related movies are presented or information including, but not limited to, a description, rental information, and purchase information is presented. In some embodiments, if a movie or other item is referenced in another movie, television show, or other content, a clip, transcript or other information of the movie or other referred item such as a book or a poem is presented. For example, when George sings "Master of the House" from Les Miserables in "Seinfeld," a clip of the musical is shown or lyrics are displayed on the user's device.

In some embodiments, the supplemental information is related to sports betting/play-along including, but not limited to, fantasy football and college basketball brackets, where a user's fantasy team or bracket is updated automatically in sync with the game results. For example, if a basketball game ends, the user's bracket is automatically updated and presented on the user's device including the current standings. In another example, as the football games occur, a player's fantasy team information is updated during the games and presented on the user's device.

In some embodiments, news, weather, traffic and/or other information is fact checked by comparing the information with other stations' results (e.g. fact checking by comparison with peers is performed). For example, if News Company A states Candidate X paid $0 in taxes last year, but News Company B, News Company C and News Company D all say, Candidate X paid $100,000 in taxes, the additional information is presented to the user. In another example, if meteorologist at Channel A says it will be 80 degrees today, but meteorologists at Channels B through D and online sites Y and Z say it will be 90 degrees today, the additional information is presented to the user. In some embodiments, if a story (e.g. news story) is incomplete on one station, or another station has supplemental information, that information is presented to the user. For example, if one station does not indicate the victim's race, but another station does provide this information, that supplemental information is presented (e.g. as text at the bottom of the screen with credit given to the providing source). Determination of the missing information is able to be by comparing keywords in the information, processing and formatting the information (e.g. by searching for specific items in a story and determining if any information is missing) or any other implementation. For example, for a news story about a homicide, a data structure contains elements for race of the attacker and victim, age of the attacker and victim, motive, location, weapon, and any other information. And if any of the information is unknown from one channel/site/network, other sources of information are able to be used to fill in the missing information.

In some embodiments, supplemental information is provided by the same source that is providing the original content (e.g. XYZ Network broadcasts a political show and also provides supplemental information). In some embodiments, supplemental information is provided by a third party (or independent party). For example, XYZ Network broadcasts a political show, and TTT App provides supplemental information to be displayed with the political show, where TTT App has no affiliation with XYZ Network.

In some embodiments, supplemental information is provided when the fact checker is used for print articles. For example, after a user acquires content of an article in a magazine, supplemental information related to the article is provided including, but not limited to, where to buy an item in the article, what the latest study says about the content of the article, and any other information.

In some embodiments, a running log of supplemental information is kept. In some embodiments, the running log is user-specific and/or device-specific. For example, the supplemental information for Bob is based on what Bob has been viewing, reading and/or receiving. In some embodiments, by keeping a log of the supplemental information, repeated indication of supplemental information is avoided. For example, if a viewer of a television show has already been provided with supplemental information about a character, that supplemental information is not automatically shown again. In an additional example, a data structure stores information indicating what supplemental information has been displayed to a specific user, and then that information is used to determine what supplemental information to display, if any. In some embodiments, updated supplemental information is shown based on the previous supplemental information. For example, if character information has previously been shown to a user, but there is new information since the user missed a week, only the new information is shown. In some embodiments, a history of supplemental information is kept, so that the user is able to search and/or look through this information on demand.

In some embodiments, when numbers or charts are described in words (e.g. in a broadcast), supplemental graphics are displayed. In some embodiments, when a trend or statistics are mentioned, graphics are displayed to show the trend. For example, a reporter says, "housing prices have decreased for 5 months," and then supplemental information is shown that includes a chart of the past 5 months of housing prices by retrieving 5 months of data and generating a chart using a chart generation application. Providing the supplemental information is performed in any manner; for example, by finding the data and generating a chart and/or finding the chart. In some embodiments, context is used; for example, if the comment is "over the past 6 months," then today's date is used to find data going back 6 months.

In some embodiments, supplemental information is generated in advance of a broadcast based on a guest list for the show or other knowledge of the show. For example, the guest information such as views, biases, political party and/or any other information is able to be located and prepared beforehand for a political guest. Or for an actor appearing on a late night show, recent movies, events in the personal life of an actor, or other information is prepared in advance. In some embodiments, the advanced generation of information is performed automatically, and in some embodiments, the advanced generation of information is performed manually.

In some embodiments, supplemental information is based on personal conditions, personal traits, recent events and/or other information. In some embodiments, the information is able to be taken from a social networking site (e.g. Facebook®) or a site/implementation such as Twitter. For example, if a user indicates his mood on a social networking site, that information is able to be used in providing supplemental information. In some embodiments, the supplemental information is used in generating a suggested list of channels and/or programs for the user. For example, if the user indicated "depressed," a list of comedies is presented to the user. In another example, if the user indicated "depressed" and "conservative," comedies with a conservative slant are presented (or at least presented first in a descending order starting with the most conservative). The supplemental information is able to be used in presenting advertisements to the user in combination with or without other elements described herein. In some embodiments, the information (e.g. mood) is fact checked.

In some embodiments, when a word or phrase is mentioned (e.g. in a movie, on the news, in a television show, in person, in a discussion, on the Web and/or elsewhere), supplemental information is provided regarding that word or phrase. In some embodiments, only words or phrases that are included in a data structure (e.g. database) to provide supplemental information are used. In some embodiments, common phrases (e.g. don't look a gift horse in the mouth) are used. In some embodiments, only words and phrases deemed to be "not well known" are used. For example, if a movie makes a reference to an obscure object or person, supplemental information is provided so that the user understands what or who that object or person is. As described herein, the word or phrase is able to be searched for in a data structure, the web and/or any other source, and the result of the source is returned (e.g. a definition of the word).

In some embodiments, a data structure, for example a database, a table or any other data structure, is used to search for and present supplemental information. In some embodiments, supplemental information is based on subsequent searches.

Importance/Relevance

In some embodiments, broadcast information, stories, articles, or other content is rated and/or classified in relation to a user. FIG. 13 illustrates an exemplary listing of headlines with an importance rating according to some embodiments. In some embodiments, the content is rated based on an importance or relevance to the user's life or based on the user's interests. In some embodiments, the importance is selected by the user, and in some embodiments, the importance is based on standards of a group of people (e.g. neighborhood, town, state, country) such as community standards. For example, a community may establish the economy as the most important topic, followed by national security, then taxes, and other items following. In some embodiments, a combination of community standards and user selections is used to determine importance. Thus, content focused on lower priority (less important) items is rated lower than higher priority (more important) items. In some embodiments, content is presented to users based on the ratings (e.g. higher rated articles are presented at the top of a list to a user). In some embodiments, content that falls below a threshold is not presented to a user. In some embodiments, the user sets the threshold and/or specifies which kind of content not to show. For example, articles about Presidential wardrobes are not displayed to users where the user's importance ratings have such content below the user's threshold. In some embodiments, users are able to search based on the importance rating. In an example of a user-specified rating, a user selects lifestyle choices as the most important topic followed by the environment. In some embodiments, user-specified ratings are based on social networking site information, search information, preferences, favorites, city or state of residence, and/or other selections. For example, if a user searches for economic data often, then the economy is designated as an important topic for the user. In some embodiments, content is rated using multiple topics. For example, an article is rated as to how religious it is, how economic-related it is and how environmentally-conscious it is. In some embodiments, the rating in relation to importance to a user is used in combination with other ratings to provide a more complete rating. For example, an article is rated highly (e.g. 10) in importance because it involves unemployment and creating jobs, but it is rated poorly (e.g. 4) for its lack of accuracy, so the combined rating is a 7 on a scale of 1 to 10. In some embodiments, the separate ratings are presented separately (e.g. article is a 10 for importance and a 4 for accuracy). Any rating indication is able to be used (e.g. 1-10, A-F, a rainbow gradient of colors, or any other indication). In some embodiments, classification of content is determined based on keywords found within the content and/or any other classification. For example, if an article uses economic terms such as unemployment, stimulus, and taxes, the article is able to be classified as related to the economy. In some embodiments, content is able to be classified in one or more classifications. In some embodiments, the rating and/or classification of content is performed by monitoring, processing, keyword searching, and indicating. Keyword searching includes searching within the content for keywords. In some embodiments, monitoring or processing includes keyword searching and/or detection. In some embodiments, the rating and/or classification is performed automatically. In some embodiments, the rating and/or classification includes fact checking, and in some embodiments, fact checking is not performed. In some embodiments, there are classifications and one or more levels of sub-classifications. For example, a news broadcast that uses the terms: "unemployment," "stocks," and "taxes" is able to be included in the class "economy" and the subclasses "stock market" and "employment." The importance rating is indicated next to a title, displayed at the beginning of a television program, displayed in the information of a television program guide, displayed on a mobile device, and/or any other indication. In some embodiments, the classifications are based on general topics including, but not limited to, politics, sports, entertainment, finance and others. For example, if a user has no interest in sports, the user is able to place that at the bottom of the importance list. Using the sports example, "sports" could be the overall classification with specific sports (e.g. hockey, baseball, basketball, football, golf) as sub-classifications, and NCAA® football and NFL® football as a further level of sub-classification. In some embodiments, the position of the article (e.g. pro/anti) affects the importance to a user.

In some embodiments, a likelihood of importance is indicated to a user and/or used to determine the importance of an article, where the likelihood is based on the percentage of the population the article affects. In some embodiments, the position of the article (e.g. pro/anti) affects the likelihood of importance. In some embodiments, importance is based on what is trending now (e.g. what people are searching for, texting about, and/or other popularity based data).

In some embodiments, importance to a user automatically increases or decreases depending on the number of content (e.g. articles and television shows) presented to and/or selected by the user. For example, a user selects many "economics" articles; therefore, they are likely important to a user, thus the importance rating increases with time. In another example, a user has seen 10 television clips about the royal wedding, and the importance rating decreases with time since the user is likely tiring of the story.

In an example of an importance rating being implemented, a website displays titles of 20 articles. The user viewing the website has selected taxes, environment and foreign affairs as most important to the user. Three of the articles are rated as 100s (scale of 1 to 100) on the importance scale since they are focused on taxes (e.g. tax-related keywords are detected), 5 are rated as 99s since they are focused on the environment and 1 article is rated a 98 since it is focused on foreign affairs. The remaining articles fall below the user's threshold, and are grayed-out or not shown, so that the user is able to focus on articles important to him.

Figures 14, 15, 16:
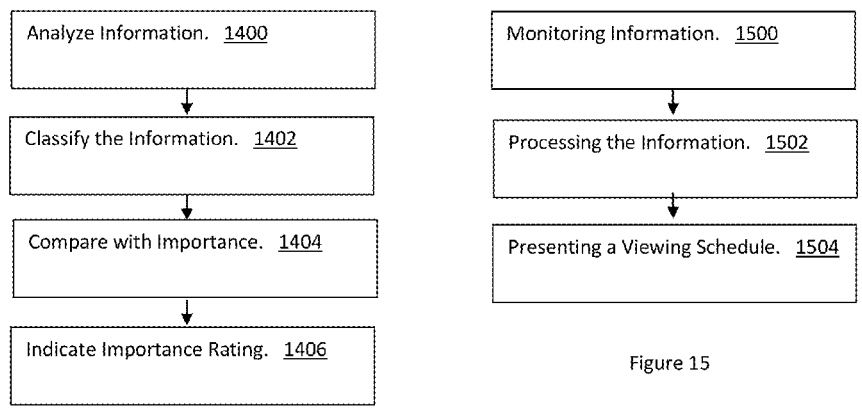
FIG. 14 illustrates a flowchart of a method of determining an importance of information according to some embodiments.
FIG. 15 illustrates a flowchart of a method of presenting a viewing schedule according to some embodiments.
FIG. 16 illustrates an exemplary viewing schedule according to some embodiments.

FIG. 14 illustrates a flowchart of a method of determining an importance of information according to some embodiments. In the step 1400, information (e.g. an article) is analyzed. For example, keywords are searched for in an article. To further the example, keywords are compared with a database that classifies the keywords. For example, a database specifies that "global warming" is in an environment class, and "gun control" is in a constitutional class or a 2nd amendment class. In the step 1402, the information is then classified based on the analysis. For example, an article which uses the words or phrases, "pollution" and "global warming," is classified as "environmental." In some embodiments, information is classified in multiple classes. For example, if an article discusses guns and the environment, the article is classified in a "guns" classification and an "environment" classification. In some embodiments, the information is classified in only one classification, based on the most relevant classification. For example, if an article contains 10 keywords related to war and only 2 keywords related to the environment, the article is classified in a "war" classification. In some embodiments, the classification includes a strength rating. For example, the percentage of occurrences, number of occurrences and/or another analysis is used to determine how strongly the article is classified. Furthering the example, an article is 90% composed of keywords related to war, thus, the article is given a "strong" rating of being related to war. In another example, a lengthy article only mentions the environment once; the article is given a "weak" rating of being related to the environment. The strength rating is able to be used in additional calculations in determining importance and/or separately displayed. In the step 1404, the classification of the information is compared with an importance, where the importance is able to be user-defined, based on standards or a combination. For example, a user is recognized and has defined his "important" items to be the environment, the economy and sports. Furthering the example, if an article (e.g. environmental article) matches the user's most important item, the article is rated a 10 (e.g. most important). In some embodiments, an importance rating includes a user rating plus the strength of an article. For example, a user rates the environment as his top priority, and an article is focused on the environment, the article is rated as most important, but a second article merely mentions the environment, the article is rated as moderately important. In the step 1406, an importance rating is indicated based on the comparison in the step 1404. For example, since the user indicated environment as the most important topic to him, and an article is determined to be about the environment, the article is given an importance rating of 10, which is displayed near the headline as is shown in FIG. 13. In some embodiments, fewer or more steps are implemented. Furthermore, in some embodiments, the order of the steps is modified.

In some embodiments, a channel is automatically changed when a television program discusses a story that falls below the user's importance threshold, for example, by determining the importance of the story, comparing the importance rating with the threshold, and if the importance rating is or falls below the threshold, the channel is changed. In some embodiments, the channel is changed to a story that is most important to the user. For example, a user has selected 3 topics—economy, sports, weather, and the user is watching News Channel A, when the sports segment ends, and goes to a story about fashion, so the television automatically switches to Channel B which is discussing the economy. To make the switch, content on all or specified channels is monitored and given an importance rating. In some embodiments, a video is changed in a similar manner to changing a channel. For example, if a website displays videos, and the current video is below an importance threshold, the next video is presented. Similarly, a radio station or other program is able to be automatically changed based on a user's importance threshold.

Bias

In some embodiments, a monitor of news stories and/or articles determines if a story and/or article is being ignored or overanalyzed. For example, if 3 of 4 news networks cover a story, and the fourth news network does not cover the story or barely reports on it, a notification or alert is presented to inform the user that he is missing the story. This is able to be implemented by comparing the stories, for example, comparing keywords or other information in the stories. This will help provide users with a full scope of news knowledge. In some embodiments, the notification includes a link or a guide to change the channel, so the user is able to see or hear the story. In a similar but contrasting manner, in some embodiments, stories are monitored to determine if they are over reported. For example, if the same story is played on all stations, every 10 minutes, a notification or alert is presented to inform the user that the story is being over reported. In some embodiments, users are able to rate stories under reported, over reported or other ratings. For example, users are able to text a rating. Other methods of rating a story are possible as well. News networks are then able to modify the presentation of news based on users' ratings. In some embodiments, users register to be able to interact with a show or website. In some embodiments, users have to qualify (e.g. pass a test) to be able to rate and/or post comments. For example, in some embodiments, users must prove they are not "trolls" by accurately predicting the factual accuracy of several statements.

In some embodiments, identifying framing of data including, but not limited to, spin, slant, bias or any other framing or manipulation of data is implemented. Identifying framing of data is able to be done in any manner. In some embodiments, a data structure (e.g. a database) is used to store biases including, but not limited to, biased information, biased entities, and other biases. In some embodiments, the bias of the speaker is able to be used to identify framing. For example, if a speaker is known to be an ultra-conservative, that knowledge is able to be used to label framing. In some embodiments, a comparison with other people's take on a subject is used to determine spin. In some embodiments, the comparison is based on peers or groups. For example, news reporters are compared with other news reporters. In an example, if 9 commentators label a speech as "well done," and 1 commentator labels the speech as "poor," the 1 commentator's comments are able to be labeled as "unrepresentative" or "minority view." Further in the example, the information that 9 commentators view something one way and the 1 commentator views it another, is able to be used with additional information (e.g. that the 1 commentator is an ultra-liberal), and the 1 commentator's comment is labeled as "liberal spin." In some embodiments, safeguards are able to be implemented to prevent manipulation such as a group ganging up against an individual. Additionally, the tone of the commentator, the number of factual inaccuracies by the commentator, and any other information is able to be taken into account to properly label the comments as spin, slant, bias or some other classification/category. In cases of subtle spin, such as where a commentator starts off by describing a radical element of a group and then generally applies a broad stroke to the entire group, that is able to be detected as well. For example, antecedent basis is monitored and checked. In an example, a commentator says, "the far right is a bunch of warmongers," and then later, the commentator says, "the right loves to go to war." While the first statement may be true, the second statement is clearly an overly broad statement and is able to be labeled as "misleading" or is able to be clarified by adding "far" to the statement to indicate "far right." Entities including, but not limited to, individuals, commentators, networks, companies and any other entity are able to have labels or other information to help determine a bias or slant. For example, commentators, channels, networks, websites and blogs are able to be labeled with political terms or other terms as described herein. Companies are able to be labeled with political terms as well or other terms including, but not limited to, anti-environment. Not only do the labels help identify to a viewer or reader where the information is coming from, but the labels are able to be quantified to perform additional calculations including, but not limited to, identifying spin. As described herein referring to the slant rating, the labels are able to be determined using any data including, but not limited to, the number of errors, types of errors, statistical analysis, surveys, analysis of content, analysis of past performance, and any other information.

In some embodiments, the fact checker monitors a news story for bias or one-sidedness and presents helpful information to provide a full story. For example, if a news report discusses a police shooting of a suspect but leaves out the aspect of the story that the suspect fired at the police first, the fact checker is able to determine the incompleteness of the story and provide supplemental information in any of the manners described herein (e.g. a text message of the missing information to the user's mobile device, an alert that there is more to the story, an email, or any other method). In an exemplary implementation, a database with full details of a story is maintained to compare with the presented story, and any information not mentioned in the presented story is able to be supplemented. In some embodiments, the full detail database is compiled by searching sources. In another example, if a news program only discusses negative aspects about an issue, or if a news program only discusses positive aspects about an issue, such one-sidedness is detected. In some embodiments, to determine the one-sidedness, the underlying data of the story is monitored (e.g. the stock market) and the show/program is monitored, and then they are compared so that if the underlying data changes but the show/program does not report the change, one-sidedness is detected. Furthering the example, if a show, for 3 days in a row, mentions the stock market is down, and then the show is subsequently silent when the stock market is up for 4 days in a row following that, such a characterization is able to be detected. In some embodiments, the information is also presented to users (e.g. scrolling text saying, "although this program mentioned the stock market being down 3 days, the stock market has been up 4 days since then"). In some embodiments, such information is able to be tracked and used to rate the news program.

In some embodiments, a caller (e.g. of a radio show) or commenter (and/or his comments) is fact checked to determine the quality of the caller/commenter. For example, the arguments of the caller are classified as good/poor arguments, the grammar is classified, and other information is taken into account to determine the quality of the caller. Multiple callers are able to be analyzed to determine if the callers are being selected to poorly represent one side of an argument or a group of people. For example, if a radio show selects callers with outrageous arguments for one side, and reasonable arguments for the other side, such a bias is able to be detected and indicated to users (e.g. listeners).

In some embodiments, supplemental information regarding what percentage of the population agrees or disagrees with a position is displayed. For example, a commenter says, "liberals believe in socialism," and in response, an indication of "This view is shared by 20% of people who consider themselves 'liberals' and 5% of people who consider themselves 'democrats' is shown." In some embodiments, specific phrases are monitored to implement this, such as "liberals believe" or "liberals think."

In some embodiments, bias or other classifications are determined or tracked based solely on analyzing headlines, titles, or other headings.

In some embodiments, polling, ratings or other information are fact checked or analyzed for bias. For example, if a news organization says they cover stories with a fair representation of each side since they mentioned each side the same amount of time, further analysis is able to be performed to determine if each time they had a bias towards one or the other. And a clarification of bias is able to be presented. In some embodiments, a classification and an indication of sources, polling, organizations and/or other entities is presented. For example, if a commentator cites the XYZ poll, an indication that the XYZ poll is a left-leaning poll is indicated.

In some embodiments, analysis and/or comparison of the fact checking data/results of networks, shows, web sites or other presenters of data is performed. For example, Channel A is found to lie (or err) 20 times/day and have 1 stale story/day, and Channel B lies 5 times/day and has 0 stale stories/day. Other data is able to be tracked including, but not limited to, historical data and improvements or trends. The results and other information are able to be stored, sorted, compared, analyzed, searched, displayed (e.g. chart/graph/numerical), and/or used for many different purposes. The information is also able to be used to generate a results rating. For example, channels are rated based on the number of errors, number of corrections, timeliness of correction, number of stale stories, and/or any other factors. The results rating is able to be in any form including, but not limited to, 1-5 stars, A-F, 1-10 or 1-3 diamonds. A slant rating is able to be used to indicate if a channel, show, site or other item has a political slant including, but not limited to, liberal, conservative, moderate, or any others. Users are also able to search, sort or perform other tasks based on the slant rating or other information. For example, users are able to set, sort or search channels, web pages, blogs, shows/programs and others, based on the comparison of a results rating such as searching for all cable news programs with a 4 star rating or higher. The searches are able to be generic or more detailed. For example, a user is able to search for all shows that have 3 stars or better. In an example of a specific search, a user searches for all shows with 4 stars or better, with a moderate rating, in channel range of channels 2-10.

Television/Video/Other Media

In some embodiments, archiving is implemented. For example, television shows are recorded or converted to text and recorded. In some embodiments, only fact checked aspects are archived. In some embodiments, only fact checked items that are classified a certain way (e.g. false) are archived. In some embodiments, the archives include groupings. For example, false statements are in one group, hyperbole is in another group, and other items are in other groups.

In some embodiments, the fact checking is used for analysis of commercials. For example, if a law firm advertisement is displayed, the fact checker is able to provide statistics about the law firm including, but not limited to, where the attorneys went to law school, bar ratings, articles about the law firm, the law firm's website link, provide comparison results such as similar law firms and/or any other relevant information. In another example, a restaurant displays an advertisement that is broadcast nationally, and the nearest location is able to be displayed by determining the user's location (e.g. the device location via GPS and/or IP address). Furthering the example, ratings, menus, nutritional information, allergen information and/or any other information for the restaurant is made available or displayed. Again furthering the example, a user's mobile device automatically maps directions to go to the nearest location from the user's current location. In some embodiments, the fact checker is used to determine the validity of commercials. For example, if a commercial claims the advertised product is the best, the fact checker is able to compare the product by searching for ratings on comparison websites, and/or any other resources to determine if the commercial is true. The fact checker is also able to present additional information to provide a user more detail. For example, an automobile commercial claims the displayed vehicle is the #1 rated vehicle. The fact checker verifies the claim and also informs the viewer that the vehicle is #1 rated for men ages 19-29, but overall, a competitor's vehicle is #1 rated. The fact checker is able to provide automatic comparison shopping. Any commercials or advertisements are able to be fact checked including, but not limited to, print, broadcast, digital/online and mobile-based. In some embodiments, a commercial or advertisement is detected based on a product, a company and/or language in the commercial/advertisement. In some embodiments, a commercial/advertisement is detected using another implementation.

In some embodiments, users are able to post comments directly to a televised show or other video. For example, users send comments to a television network or show producer. In some embodiments, the network filters the comments. The comments are able to include citations proving or disproving a speaker's comment, or labeling the comment in another manner. As described herein, in some embodiments, comments are displayed to a designated group of users. In some embodiments, users are able to be in more than one group.

In some embodiments, group video viewing is implemented. For example, a specific group of users watch a video at the same time and are able to post comments and perform other fact checking aspects on the video. Users are able to invite others to join the group. In a further example, a set of co-workers form a viewing group to watch the State of the Union Address. While the State of the Union Address is displayed, the users are able to input (e.g. tweet, instant message, text) comments about the speech which are shown to the other users in the group. If the automatic fact checker is implemented, then the speech is automatically fact checked as well. If the automatic fact checker is not implemented, users are able to flag items to be fact checked. Additionally, users are able to flag other users' comments, or users' comments are automatically fact checked, depending on the implementation. The groups are able to be as small as two people (e.g. husband and wife viewing the same video from different locations) or as large as an entire population (e.g. billions). The groups are configurable in many ways. Users can be added to groups, deleted from groups, be in multiple groups, and any other grouping features are able to be implemented.

In some embodiments, television analysis is performed. For example, the fact checker monitors video and audio, converts the audio to text and analyzes the text to provide information of what is going on in the video in real-time. The fact checking process is able to occur in the background, so that the user is able to view other channels. By monitoring and analyzing the video in the background, the fact checker is able to then inform a user when it detects information the user is looking for. For example, there is a sports show on Channel 50 which discusses all different sporting events such as baseball, golf, soccer and basketball, but the user simply wants a recap of golf scores. The user is able to input a search string (e.g. golf), or the system automatically knows what to look for based on previous searches or other information (e.g. trending information), or another implementation is used to monitor. The fact checker analyzes the text of the show for the word "golf" or a related word/name/item such as par, U.S. Open, Tiger, and when the word is found, the user is alerted that his topic is being displayed on that channel, so that the user knows to change to that channel. This enables users to avoid having to constantly switch back and forth to find a desired segment. In some embodiments, the information monitored is an actor, a location, and/or any other information. In some embodiments, images are monitored (e.g. a user selects an image of an actor, and that image is compared with the broadcast information to determine a match). In some embodiments, when the correct segment is being displayed, the channel automatically changes for the user. In some embodiments, a picture-in-picture window of the other channel is displayed. In some embodiments, an audible or other alert is presented to inform the user. In some embodiments, the fact checker is able to be used to alert a user that a commercial is over, and that the desired show has returned. In some embodiments, the fact checker is used in conjunction with a recording device, for example, a Digital Video Recorder (DVR) (e.g. TiVo®). After audio is converted to text, a search is able to be performed on the text. For example, an entire sports show is recorded and converted. A search for "Tiger Woods" is performed by the user. The text is searched, and when the phrase "Tiger Woods" is found, the video begins playing from that point in the video (e.g. in the video, a commentator mentions the name "Tiger Woods"). In some embodiments, every instance of the search phrase is found, so that the user is able to jump to each instance of the search phrase in the video. For example, if "Tiger Woods" is discussed at 5:59, 10:32 and 50:21 of the video, the user is able to hit a "Next" or "Previous" button to navigate to each point in the video where "Tiger Woods" is mentioned. Any search techniques and/or features are able to be implemented. In some embodiments, instead of a conversion of audio to text, text is provided in advance or during the show. For example, networks are able to provide text from the show in a searchable form. In some embodiments, converted text or other text is also able to be used to predict future television information. For example, a news program states that stories about A, B and C will be shown tonight. The fact checker is able to determine when the specific stories of A, B and C will actually air, so that users are able to avoid stories they are not interested in. The television analysis is also able to be applied to other forms of media including, but not limited to, radio, Internet webcasts, videos and any other media. For example, the fact checker is able to monitor some or all radio stations for a desired song and when that song is found, the station switches to play that song. The search is able to be used to find a song by a title, artist, based on several words of the song (e.g. first three words), or some other method.

In some embodiments, re-runs or replays of shows do not use additional fact checking. For example, if a show is typically displayed at 5 pm and then replayed at 8 pm, the 8 pm show is able to use the previous fact check information from the 5 pm show. In some embodiments, additional information is provided in the 8 pm show that was not provided in the 5 pm show. In some embodiments, analysis is performed to confirm the shows are the same.

In some embodiments, the fact checking is performed using an original broadcast and then displayed during a repeat broadcast or a recorded broadcast. In this implementation, the fact checking is able to be in real-time or non-real-time, automatically or not automatically. For example, a show is broadcast at 5 pm, and fact checking occurs. Then, when the show is re-broadcast at 8 pm, fact checking results/information is presented automatically and in real-time during the re-broadcast. Similarly, when a re-broadcast occurs via the Internet, such as on a broadcaster's website, results/information is presented during the re-broadcast. Although this would not prevent misinformation from being spread in the initial broadcast, the fact that any re-broadcasts would catch any misinformation could potentially discourage misinformation from being presented in the initial broadcast. In an exemplary manual implementation, viewers watching the 5 pm telecast flag information as misleading, incorrect, unclear and/or any other characterization, then fact checking and/or other analysis is performed, and then at a later telecast (e.g. the 8 pm telecast), corrective and/or supplemental information is displayed automatically to the viewers of the later telecast at the appropriate times. The appropriate times are able to be determined in any manner, including, but not limited to, monitoring for keywords (e.g. database includes keywords to monitor and corresponding corrective comments to display), monitoring for a designated time (e.g. each time a user flags information, a timestamp is made which is then used to display the corrective comments) and/or any other method.

In some embodiments, polling occurs during a broadcast and then is posted during the re-airing of the show. For example, a poll is presented, "conservatives, do you agree with Commentator A's position," and people respond, and then the results are shown that "earlier polls show X % polled agree with this position."

In some embodiments, the fact checking system is used to avoid or correct a mistake presented. For example, in the past, news networks have accidentally posted graphics with incorrect statistics. The fact checking system is able to preemptively check the graphics or post-display check the graphics, so that the poster (e.g. network) is able to correct the error before broadcasting the error or quickly thereafter.

In some embodiments, automatic prediction tracking is implemented. For example, a commentator says, "President Z is going to lose in 2012." That comment is stored, and once a result is determined (e.g. the election ends), the accuracy of the prediction is determined (e.g. using the fact checker). In some embodiments, the prediction determinations are stored, used for statistics, to generate prediction ratings/accuracy ratings and/or for any other purposes. For example, commentators or any other entities that make predictions are able to have prediction ratings so that viewers are able to see how accurate commentator's predictions are. For example, when a commentator is shown on television, a prediction rating is shown (e.g. correct predictions 5, incorrect predictions 10) to indicate to viewers that this commentator's predictions do not usually come true. The prediction ratings are able to be in any form such as grades (A-F) or any other rating scheme. In some embodiments, multiple categories of predictions ratings per entity are implemented. For example, a sports analyst may predict football well but not baseball, so his rating for football is high but for baseball is low. Examples of entities that make predictions, guesses or estimates include but are not limited to, commentators, weathermen, stock commentators, news commentators, businesses, sports commentators, real estate commentators, analysts, financial commentators, entertainment commentators, reality show hosts/judges, and/or any other entity.

In some embodiments, the fact checking system is used to rate weather predictors. For example, if one channel is wrong more often than another, viewers would be informed of this and could change their viewing habits accordingly. In some embodiments, viewers are given a list of alternatives. For example, a list of channels with accuracy percentages is displayed.

In some embodiments, a stock picker is fact checked to determine the accuracy of stock pickers. For example, if an online site boasts about being able to select stocks, the fact checker is able to monitor the picked stocks and then provide an accuracy rating for the site, so that users are able to use the most accurate site. Similarly, sports analysts are fact checked and tracked to indicate the accuracy of the sports analysts' predictions/picks.

In some embodiments, the fact checker indicates a status of a comment to the host/interviewer of a show (e.g. so that the host is able to ask a follow-up question). In some embodiments, the fact checker comes up with the follow-up question automatically (e.g. follow up question is displayed on teleprompter). For example, if a host asks a guest what the guest does not like about the President, and the guest responds that "taxes are too high." The fact checker is able to determine that the current President has lowered taxes since becoming President, and automatically generate a follow-up question of, "since the President has lowered taxes, is that a valid complaint about the President?" In some embodiments, the follow-up question is based on searches performed by the fact checker. In some embodiments, a database of potential follow-up questions is implemented and based on the answer, a follow-up question is selected.

In some embodiments, an avatar or other representation of an entity is displayed on a show (e.g. a television show or webcast) to present the fact checking information. For example, a political commentary show has guests, and one of the guests is able to be an avatar that comments when one of the other guests or the host makes a misstatement or some other statement that warrants commenting. The avatar is able to be computer-generated or any other type of generated avatar.

In some embodiments, the severity (e.g. severity of incorrectness, severity of bias, severity of political slant) of a statement is indicated with the result. For example, if a person says, "Rhode Island is the largest state," a severity rating of 10 is displayed as the statement is completely wrong since Rhode Island is the smallest state. In another example, if a person shows extreme bias, a bias severity rating of 10 is displayed. The severity rating is able to be indicated in any manner, including, but not limited to, 1-10, by grades including, but not limited to A-F, bright colors indicating severe and dull colors indicating not severe, imagery/pictures, audio (e.g. "wow!" for severe, "wah wah" for not severe, or a loud chime for severe, a quiet chime for less severe), or any other rating, grading or indicating system.

In some embodiments, the fact checker is used to inform a person (e.g. a host) that he made a mistake. For example, a host states the U.S. is $15 Billion in debt, and a chime and/or other audio is emitted in the host's earpiece, letting the host know that he made a mistake. In some embodiments, the chime is merely just a short chime where the host has to figure out what the mistake was, and in some embodiments, the audio is a correction (e.g. "Trillion" in this example) or a chime linked to a teleprompter that could display accurate information or incorrect statement. In some embodiments, the indicator to the person is visual (e.g. a flashing red light), tactile (e.g. vibration), or any other indicator.

In some embodiments, a host, guest or other entity is provided additional information (e.g. statistics) by the fact checker during a communication. In some embodiments, additional information is indicated when questionable information or other information is presented. For example, in a debate, debater A is able to have the fact checker running while debater B is making comments. Debater A is then able to use the fact checked information to debate better.

In some embodiments, using the fact checker, if a commentator (e.g. guest) is found to have misstated facts a specified number of times (e.g. 3 times) within a specified period of time, an action is automatically taken against the guest (e.g. the guest's microphone is cut off for a period of time). For example, a guest is on a political commentary show, and he makes 3 factually inaccurate statements on the show, his microphone is cut off (silenced) for 1 minute. In addition to fact checking, other events are able to contribute towards taking the action. For example, if a guest keeps interrupting other guests, each interruption could contribute toward taking action. For example, a guest interrupts once and makes two factually inaccurate statements; those 3 events cause the action to be taken against the guest. Another example of an action is shining a colored light (e.g. a red light) on the entity for a period of time. In another example, when a score is maintained to determine the winner of the argument on the show, an action includes disqualifying a participant or deducting points due to improper conduct. The action is able to be taken against any entity, not only a guest, and any actions are able to be taken.

In some embodiments, points are awarded to hosts, guests, callers/commenters and/or others based on their arguments to determine who wins an argument. The points are able to be awarded based one or more factors including, but not limited to, factual accuracy/inaccuracy of the arguments, conduct, viewer voting, judge voting, and/or any other factors. The point tally is able to be kept running while the argument occurs and/or indicated at the end of the argument. For example, a political commentary show includes a segment with a host debating a guest on a controversial topic. The host and the guest each go back and forth presenting their arguments. The fact checker automatically monitors, processes, and fact checks the arguments and then gives points for factually accurate information, and deducts points for inaccurate information. The fact checker also determines if improper conduct occurs, for example, cutting off the other or filibustering (e.g. not answering the question directly), and deducts accordingly. While the segment is airing, or quickly thereafter, users are able to vote (e.g. by text or any other implementation) for who is winning/won the argument. A formula is able to be implemented to add the votes with the fact checker results to determine a score (e.g. whoever wins each argument receives a point which is added to the fact checker points). Then at the end of the segment or some other point in the show, the results are displayed, indicating a winner of the argument (e.g. the one with the most points). In some embodiments, a host is given a handicap (e.g. host starts with a 1 point reduction) in an attempt to balance the likely bias of his viewers. In some embodiments, users are able to select the factors used in determining a winner. For example, if a user does not like the idea of other users affecting the outcome, the user is able to specify that the winner is determined solely based on the fact checker results.

In some embodiments, when an entity communicates (e.g. speaks or writes) or is displayed, donors and/or contributors who have contributed to him or his campaign and/or charities or other entities he has contributed to are displayed. For example, a politician is shown on television, and a list of the top 10 contributors to his campaign is displayed on a user's mobile device. In some embodiments, only contributors related to a topic (e.g. discussing energy, display oil company contributions). Any amount of information about the contributors is able to be displayed (e.g. how much in contributions, when the contributions were made, and other information). The contribution information is able to be determined using a data structure (e.g. a database) which stores entities and related contribution information, via searching as described herein or any other method.

In some embodiments, a list of names of supporters and/or dissenters of information is presented. The list is stored in a data structure such as a database and/or is based on previous comments, writings and/or other information. For example, a guest on a talk show makes the comment: "lower taxes creates jobs," and a list of prominent people supporting that position is displayed.

In some embodiments, the fact checker is used to assist users in reading the fine print displayed in television advertisements. For example, the fact checker captures the fine print and allows the reader to display the fine print for longer than the normal display time. In another example, the fact checker allows the user to capture and enlarge the fine print so that it is more legible.

In some embodiments, to determine a character/actor/location/other information, a user takes a picture of a television screen, computer screen, mobile device screen or any other object/scene. For example, if a movie is being played on a person's television, the person uses his mobile device to take a picture of the screen, and then the mobile device is able to analyze the picture and determine the actor, movie being played, where the set location is, and/or provide any other information.

In some embodiments, when a poll is referred to, related polls are searched for and presented. In some embodiments, the polls are compared. For example, Political Program X only shows an XYZ poll that shows Candidate Z in the lead, but a similar poll (ZZZ poll) shows Candidate Y in the lead, then the ZZZ poll is also presented. Similar polls are able to be searched for in any manner, including, but not limited to, same or similar dates, same or similar topics and/or any other manner.

In some embodiments, a mobile device (e.g. smart phone) is used to scan a television advertisement to obtain information. For example, if a user is watching television and a commercial appears, the user holds his mobile device with camera so that the camera is able to scan the commercial, and then the user is able to click on an item in the advertisement or entire advertisement to receive additional information regarding the item and/or advertisement. In some embodiments, the user is able to transfer the advertisement to his mobile device (e.g. by pointing the camera of the mobile device at the advertisement and selecting "transfer" or "capture").

In some embodiments, fact check information and/or supplemental information is indicated while a user is fast-forwarding, pausing and/or taking another action with a video. For example, while a user is fast-forwarding a DVD, supplemental information is displayed to the user.

In some embodiments, a DVR records a show with or without fact checked information or supplemental information, but fact checked information and/or supplemental information is determined in the time between the initial recording of the show by the DVR and when the user views the recorded information, so that when a user views the recorded information, the fact checked results and/or supplemental information is displayed. In some embodiments, the fact checked results and/or supplemental information is stored on the DVR, and in some embodiments, the information is stored on another device. In some embodiments, the fact checked results and/or supplemental information is updated incrementally as new information is determined.

In some embodiments, supplemental information that includes a fusion of genres is implemented. For example, a user is watching a political commentary show and comedic supplemental information is provided. The determination of the supplemental information to provide is the same as or similar to other implementations described herein. In some embodiments, a database of keywords and corresponding actions to take or information to display is maintained, or the actions or information are based on searches performed. For example, a database includes a keyword "global warming" and a joke related to global warming is included to correspond with that keyword. Then, as the information is monitored, and the keyword is detected, the joke is presented to the user (e.g. on his mobile device or television). In some embodiments, more information is used in determining what supplemental information is displayed. For example, user-related information is used including, but not limited to, age, gender, location, political leaning, and any other information. Furthering the example, if a user is conservative, a joke linked to global warming would be critical of global warming; whereas, a joke for a liberal user would be critical of those who do not believe in global warming. In some embodiments, a personalized viewing schedule is implemented. The personalized viewing schedule is able to be implemented by switching among channels, using a video recording system (e.g. DVR or TiVo®), using online video, using radio and/or any other implementation. For example, after the fact checker monitors and processes a 10 pm news program, in conjunction with a DVR storing the news program, the fact checker displays a list of topics/stories covered in the news program. Furthering the example, the 10 pm news includes a stock market report, a homicide report, a weather report, a sports report, and a story about local art projects. The user is presented these items (e.g. in a list), and then the user is able to select and/or rank the stories to watch in order or select only particular stories to view. For example, the user chooses to watch the sports report, the stock market report and the weather report, and then only those stories are shown to the user. In some embodiments, the items (or segments) are pre-sorted based on previous selections by the user, user preferences, friends' selections (e.g. Facebook contact recommendations), popularity, and/or any other bases. In some embodiments, the list of stories is displayed on the screen, so that the user is able to see what stories are upcoming.

In some embodiments, the fact check information and/or supplemental information is displayed as part of and/or during a commercial break.

In some embodiments, a fact checker button is implemented for turning on/off the fact checking system. The fact checker button is able to be located on a remote control, television, mobile device and/or any other device and is able to be a hard button, soft key, menu selection, or any other implementation.

In some embodiments, the fact checker is implemented such that the monitoring, processing, and fact checking are performed automatically, but a user (e.g. moderator) is also involved with the indicating such that it is performed semi-automatically. For example, a person's speech is monitored, processed and fact checked automatically, and then the results of the fact check are displayed to a moderator who is able to determine which fact check results are indicated (e.g. displayed to viewers). For further example, the fact checker finds that the speaker misspoke and said $100 Billion instead of $100 Million. The fact checker presents this to the moderator who then approves the correction which is then posted to viewer's screens. Although this slows down the process slightly, the delay will be minimal such that the indication is still presented within several seconds and possibly even within one second.

Additional Structure and Execution

In some embodiments, a device such as a mobile device is used to perform a fact check of an item through the use of the device's camera or other sensor. The mobile device is able to scan (e.g. merely point camera without taking picture), take a picture, take a video, or any other method of acquiring the content of the item. For example, a mobile phone is used to take a picture of a print newspaper and perform a fact check of the newspaper. The writers of the articles are able to be rated as described herein. The newspaper or magazine is able to be rated as described herein. For example, tabloids are viewed as unreliable or are given less credibility than a standard newspaper. Any print material is able to be fact checked, including, but not limited to, newspapers, magazines, books, billboards and pamphlets, including any advertisements within. In some embodiments, the device is able to fact check an item including, but not limited to, a purse, dress, watch, ring, shoe, suit, clothing, or any other item to determine the brand of the item and/or if the item is a replica. For example, a user directs the camera of his mobile phone toward a watch and the fact checker determines if the watch is an original Rolex or a replica. The fact checker is able to perform the check in any manner such as determining that the watch says Molex instead of Rolex, or by a picture comparison of the acquired watch and certified watches stored in a database, comparing distinct features of a genuine article such as stitching and/or hardware/material used, or any other comparison.

In some embodiments, the item determination is performed on items on television, the Internet or elsewhere. For example, during an awards show, the item determination posts information about the dresses being worn, including, but not limited to, designer and/or price. The fact checker is also able to perform person identification. Using the awards show example, an indication of who is being shown on camera is able to be displayed. As described herein, facial/body analysis or any other method is able to be performed to determine who people are. Additionally, character/actor/person determination is able to be performed. For example, if a commercial is being displayed, and a user is curious who the main actor is, actor determination is implemented to display the actor's information. In some embodiments, all character/actor information is displayed, only selected character/actor information is displayed, or any other configuration of information is displayed. For example, all names of actors on a television show are shown under each actor. In another example, a user specifically selects (e.g. by touchscreen or any other method of selecting) the actor to see information. The amount of information is also able to be variable. For example, as little as a name is shown or much more detailed information is shown including, but not limited to, biographical information, other shows/movies, ratings/reviews, links, character/plot summary (e.g. a summary of this character's involvement in the plot) and any other information. In some embodiments, information about when a specified actor will be on television next is displayed. For example, a user clicks on Actor A, and the user is informed that the actor is also in Movie Z, at 7 pm on Channel 263. For sports, some or all names of the players are shown on/near each player. In another example, a user specifically selects (e.g. by touchscreen or any other method of selecting) the player to see information. The amount of information is also able to be variable (e.g. game stats, historical stats, personal information, fantasy football stats, and any other information). The fact checker is also able to perform location recognition. For example, if a reporter is "on location," the fact checker is able to determine where that location is. The fact checker is able to determine the location by comparing the image with a stored image, by searching the credits (e.g. a movie specifies locations of shootings), by searching text of the transcript (e.g. newscaster earlier said, "we're on location live at x," and/or any other implementation. In some embodiments, after a location is determined, the viewer is able to pull up additional information about the location (e.g. historical information, current information (weather, prices of goods)). Character determination, location determination and any other determination is able to be implemented using any media including, but not limited to, television, movies, photographs (e.g. online photographs), videos (e.g. online videos), satellite information, prior news feeds, or any other media. In some embodiments, identifying the object is by comparing the object with other objects in the scene, finding a story/article about the object, or any other method of identification. Distances and/or sizes of objects within the scene are able to be determined with scene analysis.

In some embodiments, the fact checker checks for and indicates defamation, slander, libel, plagiarism, copyright infringement, trademark infringement, patent infringement, and/or other crimes. In some embodiments, when a crime is committed or may have been committed, the targeted person and/or someone else (e.g. the police) is contacted (e.g. an email or Tweet is sent with the criminal comment, who said/wrote the comment, and any other relevant information). In some embodiments, defamation or other crimes are determined by: determining the location of the speaker or victim, determining if the statement is false, determining state law and presenting the state law and statement to the victim or the victim's attorney and/or analyzing the law to determine if the law is violated. In some embodiments, additional elements are considered such as defenses to the crime. In some embodiments, other crimes/laws are fact checked by analyzing the law/statute/regulation/ordinance/cases/other information, analyzing the facts and determining a result. In some embodiments, a database of laws, cases and holdings is used to perform the analysis. In some embodiments, the analysis merely returns similar cases, so that the user is able to compare. In a same or similar manner, a disparaging comment is detected and reported (e.g. to the target of the comment). For example, if someone writes on a message board that Company XYZ is a terrible company, the comment, web address, citation, and/or any other information is sent (e.g. by email, Twitter or any other means) to the target of the comment. In some embodiments, future shows and/or news stories are based on fact checking results. For example, if users respond to news stories as overplayed, future newscasts will not include stories related to that topic. In another example, if users request more information about an aspect of the story (e.g. victim's race), future newscasts will include that information. In another example, if users rate a story as "biased," the future newscast will remove the bias.

In some embodiments, an indication on or near a headline, title, caption, talking point and/or other short phrase is implemented. For example, a rating of a story, article, news or any other information is able to be implemented. In some embodiments, the rating of the story is based on an automatic fact check of the story. In a further example, a title of an article is "Vaccines Proven Harmful," but the article uses studies that have been discredited and readers rate the article poorly, future viewers will see the article as "Vaccines Proven Harmful 0 Stars." In some embodiments, the indication is not near the headline or other phrase. For example, the indication is on a user's mobile device after scanning or taking a picture of a hardcopy title. In some embodiments, the indication is a characterization of the article. For example, the article is characterized as liberal, neutral or conservative. Other characterizations, ratings and indications are able to be implemented. In some embodiments, an indication of a better and/or opposing article, story and/or other information is indicated. In some embodiments, if a headline is determined to be misleading (e.g. by comparing the headline with the content of the article and/or based on user reviews), an indication of "misleading" is displayed near the headline.

In some embodiments, stories (e.g. articles, news stories, and other) are rated. For example, if users are tired of hearing about Story X, users are able to communicate that opinion. In some embodiments, broadcasters and/or reporters are able to receive the ratings information automatically, so that they are able to cut short, extend or otherwise modify the programming. In some embodiments, users are able to provide more specifics about the rating of the story. For example, a viewer is able to indicate she is tired of the slanted presentation of the story or the presentation of the lineup of stories (e.g. always making criminals looking like they were unfairly treated by leaving out important details). The ratings are able to be any form of ratings including, but not limited to, thumbs up/down, good/bad, 1-10, A-F, emoticons, a selection from a list of choices, and/or any other implementation.

In some embodiments, a self-checking system is implemented. For example, a mobile device application including, but not limited to, an iPhone® App, monitors a person's comments when he speaks, and if the person says something incorrect, the application alerts (e.g. chime, ringtone) the person. For further example, a dad is explaining geography to his daughter and says Alabama is West of Mississippi; the application chimes. In some embodiments, the application provides a correction, provides a citation and/or any other information to help the person. In some embodiments, the self-checking is able to be implemented to provide positive feedback for saying a correct statement, for example, as a learning tool or a game for children. In some embodiments, a quiz, a multiple choice program, or other testing material is implemented. In some embodiments, the fact checker fact checks a user's statement and then asks a question related to the statement. In some embodiments, the fact checker learns based on the result of the fact check to ask an additional question. In some embodiments, based on a series of statements by the user, the fact checker asks the user a question. In some embodiments, the self-checking system has the ability to only fact check a specified user (e.g. by voice recognition or some other recognition) so that other people's comments are not fact checked. For example, if a user implements a self-checking iPhone® application which monitors everything received by the iPhone® listening device, then while the user is walking on the street, conversations of others may be fact checked. If the user does not want these other conversations fact checked, the specified user implementation is able to filter received information, and only fact check statements made by the specified user.

In some embodiments, the fact checking is implemented in or as a search engine and/or a browser. Using a standard search engine, entering a statement such as "Alaska is the largest state" results in links being displayed on the screen which enable a user to then select a link where the user is able to verify if Alaska is the largest state. Using a fact checking enabled search engine, a user is able to enter "Alaska is the largest state" in the browser window, and the result of "True" appears. In some embodiments, links still appear as from a standard search engine, and next to or near each link appears a result including, but not limited to, True/False or any other indicators. In some embodiments, search engine capabilities are available in other software (e.g. word processors) to perform a fact check.

In some embodiments, the fact checking system is embedded or used with a word processor including, but not limited to, Microsoft® Word or any other software program. In some embodiments, the word processor highlights, underlines, circles, auto-corrects or performs another form of fact checking identification. In some embodiments, if the statement being fact checked could be corrected in more than one way, a user is presented with multiple options. For example, if a user types, "Texas is the biggest state," the user is able to be presented with "Alaska" as a replacement of Texas, or "second biggest state," to clarify that Texas is the second biggest state.

In some embodiments, the fact checker is implemented as part of an operating system.

In some embodiments, some or every tweet a person sends out is highlighted or color-coded based on the type of tweet. For example, different tweets are coded as factually correct, factually incorrect, spin, opinion, hyperbole, or any other characterization.

In some embodiments, email is fact checked. Depending on the embodiment, the email is fact checked before being sent out or fact checked when the email arrives in a user's inbox, or when the user opens the email. In some embodiments, when the user opens the email, the email is able to be provided marked up such that factually inaccurate statements are indicated, for example. In some embodiments, a user is able to send the email to a service, and the service returns a marked up version. The service is able to be local to the device (e.g. software running on a user's device) or could be external including, but not limited to, on the Web. The same or similar implementations are able to be used for SMS texts, MMS texts, audio texts, or any other communication. In some embodiments, an entire email or other message is indicated as "spam" or any other indication/label if it is found to be factually inaccurate. In some embodiments, a threshold is implemented to determine if the message is spam. For example, if the threshold is 10 inaccuracies, and 11 factually inaccurate items are found, then the message is labeled as spam.

In some embodiments, conversations are recorded for a time period (e.g. a night) so that they are able to be used later for comparison with a statement.

In some embodiments, a closed system of information is searchable, such as for a court case. For example, all documents, testimony and evidence are put in a searchable digital format, and if someone makes a conflicting statement compared to what is on the record, an alert or a similar effect is presented. In some embodiments, all of the searchable information is fact checked. In some embodiments, the fact checker performs a document reviewer's task. In some embodiments, legal arguments are fact checked to make sure a case is not cited out of context, a holding is not misstated, and/or any other checking.

In some embodiments, a language translator is implemented. For example, a video is translated from one language to another using closed caption. In another example, only mistakes are translated and displayed. In some embodiments, a foreign language monitor is implemented. For example, if a device knows a user's native language is English, and the user is attempting to speak Spanish, the device monitors for incorrect usage or pronunciation. In some embodiments, the device monitors every language for incorrect usage or pronunciation. For example, if a user says, "you played good today," the device is able to correct the user and indicate the sentence should have been, "you played well today." In some embodiments, the fact checker checks for outdated word use.

In some embodiments, if a comment is made about an individual, a group, a company or any other entity, that person is able to post a comment rebutting the comment on a different location than the original comment. Or the rebuttal is on the person's website and pulled, or tweeted, spoken, or any other means. For example, if Person A says Person B plans to raise taxes, the fact checking system is able to pull a quote from Person B's website that says, "I promise not to raise taxes," and that comment is automatically posted with Person A's comment, providing a real-time rebuttal. The rebuttal is able to be made/posted before the opposing comment is made for an immediate rebuttal. The location of the rebuttal is able to be found in any manner such as by determining the name of the person being commented on and finding the person's personal website (e.g. Facebook® page).

In some embodiments, the fact checker is used to prevent bullying on social networking sites including, but not limited to, Facebook®, Myspace, LinkedIn, Twitter, and other websites. For example, users are able to flag other poster's comments or pages as false or any other characterization. Additionally, as described above, an automatic rebuttal is able to be implemented such that if a user posts something on his site and then other users post a contradictory remark on their sites, the user's post is automatically used to rebut the other users' comments. For example, if a group of users try to disseminate a rumor about Teen X, Teen X is able to post a remark on his page that the rumor is not true. Then, when the group of users post their rumor on their sites, their comments will be marked on their sites, and they will be rebutted immediately, helping to dispel the rumor. The user is able to post his rebuttal proactively or after the other remarks are already made.

In some embodiments, real estate prices/values are fact checked. For example, if a real estate agent tells a person, "this house is worth $500,000," the fact checking system is able to take data regarding the house and do a real-time comparison with comparable sales (and other factors or specific information related to the house or the purchase including, but not limited to, household incomes, unemployment rates, population growth, upgrades, and others) and determine the validity of the agent's price. Other price comparison is able to be performed as well such as with tradespeople. For example, if a plumber quotes a person $100 to replace a pipe, the fact checking system is able to determine what other plumbers in the area charge for such a task and/or compare BBB ratings. In some embodiments, a rent checker is implemented. In some embodiments, other price comparison is performed including, but not limited to, comparison of stores, online goods/services or any other goods/services.

In an example of live fact checking, while a sporting event is being broadcast, a commentator provides commentary including statistics which are usually fed to the commentator by someone behind the scenes. To further ensure the accuracy of the comments, the fact checker is able to be implemented to monitor the data fed to the commentator before the commentator presents it or after the commentator makes the statement, so that he is able to make any corrections.

In some embodiments, a picture-in-picture configuration is used to provide information and results from the fact checking system to a user. In some embodiments, picture-in-picture is not used.

In some embodiments, the fact checking system is used to fact check archived data. For example, a network's past footage is fact checked. The results of the archived data are able to be used in rating the network or for other purposes.

In some embodiments, hypocrisy is detected. For example, statements are compared to source information to determine if previous statements contradict or are hypocritical. For example, Speaker A says, "we should do X" and then two weeks later, Speaker A says, "we should not do X," the second statement is indicated as hypocritical or flip-flopping. In some embodiments, the first statement is then displayed. Context is able to be implemented in conjunction with searching for hypocritical statements. For example, if Speaker A says, "adultery is wrong," but sources show that Speaker A previously committed adultery, an indication that Speaker A is being hypocritical is presented. Any other methods of determining hypocrisy are able to be implemented. Further, hypocrisy is able to be included with the validity rating of entities described herein. For example, when Speaker A appears on a television program, a label of hypocrite and/or a number of hypocritical statements/actions is presented. In some embodiments, dates or time frames are used in determining the relevance of fact check comparison. For example, if a hypocritical statement was made 30 years ago, the fact checker may realize that it was more likely a change of view rather than a hypocritical statement; whereas, a contradictory statement made 2 weeks ago is likely due to hypocrisy not a change of view. In some embodiments, items similar to hypocrisy including, but not limited to, flip-flopping and waffling are detected. In some embodiments, dates of when the conflicting (e.g. hypocritical) statements/actions occurred are displayed. Contradictions and other similar items are able to be determined in any manner, including, but not limited to, logic comparisons. For example, sentences with and without "not" are compared. In another example, detecting antonyms is used. In another example, a data structure (e.g. database) of quotes is kept and the quotes are classified (e.g. pro-tax), and if quotes by the same entity are on opposite classifications, hypocrisy is determined. Furthering the example, a commentator says we should attack Country A, which is classified as pro-war with Country A, and then later the commentator says we should not attack Country A, which is classified in an opposing cell as anti-war with Country A, hypocrisy is detected and indicated. In some embodiments, a database of potentially hypocritical statements/actions is maintained and monitored for contradictions. For example, the database includes names/entities and corresponding statements that are most ripe for hypocrisy (e.g. positions on adultery, wasting money, other political positions).

In some embodiments, subscriptions are implemented. Subscriptions are able to be implemented to perform any variety of subscription services. For example, users are able to subscribe to or unsubscribe to fact checking being displayed on their television screen. In some embodiments, users are able to subscribe to different levels of fact checking. In some embodiments, users are able to select preferences and/or settings for the extent of or quantity of items to be fact checked.

In some embodiments, the fact checker is used with rating websites including, but not limited to, yelp.com to ensure the comments/reviews by users are accurate. For example, if a user states that Business X is the worst in State Z, but Business X is not even in State Z, the comment is able to be filtered.

In some embodiments, the fact checker is used for fact checking sports' rules and the implementation of the rules. For example, the fact checker is used for determining if the umpire/referee made the correct call. The fact checker is able to analyze video or images of the sport, determine the applicable rule, analyze the facts and the rule, and produce a judgment. In some embodiments, the fact checker is used to fact check personal information. For example, a potential employer uses the fact checker to fact check potential employees' resumes. The fact checker is able to take portions of the person's resume and compare the person's education with education records, previous job history with company information, Bar information with public legal databases, and any other information. In another example, a mortgage company uses the fact checker to fact check a potential borrower's mortgage application. In yet another example, a dating service uses the fact checker to fact check people's postings. In another example, health information is checked, and to verify that a person qualifies for life insurance, the person's application is fact checked based on medical records. The fact checker is able to be used based solely on what is in a person's document (e.g. resume) or based on other information as well. For example, in some embodiments, a person's name is able to be used to locate supplemental information regarding the person. For example, the person's web page, Facebook® page, previous papers/articles written and any other information is able to be found to supplement the information provided. In some embodiments, only public information is searched, in some embodiments, only private information is searched, and in some embodiments, both public and private information is searched.

In some embodiments, the fact checker is able to be used to provide details regarding a physical object. For example, if a user takes a picture of a painted wall, the fact checker is able to determine the color, brand, type and/or any other information about the paint by database, based on date, location and any other information. In another example, the physical object determination is able to be used for learning, such that a person is able to take a picture of an object and the fact checker provides information about the object. For example, a child takes a picture of a cat, and the fact checker tells the child that it is a cat and that the cat is gray. In some embodiments, additional information is provided including, but not limited to, history of cats, anatomy of cats, and any other information. In some embodiments, the user takes a picture and then inputs (e.g. voice input) what the user thinks the object is, then the fact checker determines if the user is correct. For example, a child takes a picture of a cat and says, "dog," the fact checker will determine that the object is a cat and inform the user of that he is wrong and/or provide the correct answer. In some embodiments, a game is played using the fact checker where after the user takes the picture, the fact checker asks a question about the object. For example, a child takes a picture of the cat, and a question of what color the cat is, is presented. The fact checker then analyzes the response and responds accordingly. More difficult questions are able to be asked as well, such as historical questions (e.g. which group worshipped cats?), geography questions (e.g. what country has the most cats?), and/or mathematical questions (e.g. how many trees do you see in this scene?). In some embodiments, the questions become progressively more difficult as the user answers correctly. In some embodiments, the information acquired when taking pictures is organized in a report format. For example, if a student is supposed to do a report on different types of trees, and the student takes pictures of 5 different trees, a report, including the pictures, is generated with details about the trees. In some embodiments, the user is able to take a picture of a food item, and recipes are generated that use that item. In some embodiments, the user is able to take a picture of a store (e.g. restaurant), and information about that store is presented including, but not limited to, user ratings/reviews, critic ratings/reviews, hours of operation, menu and/or a description of the store. In some embodiments, the user does not have to take a picture; rather, the user merely points the lens of the camera of the mobile device at the object, and the device is able to scan the object. The information provided about the object is able to be based on a database lookup, a search or any other implementation. In some embodiments, the user takes a picture or points the camera at a street sign, and a list of items (e.g. restaurants) is displayed in order of proximity, ratings and/or reviews, for example. In some embodiments, GPS or another locating mechanism is used for determining a user's location.

In some embodiments, users are given rewards, awards and/or prizes for participating with and/or contributing to the fact checker.

In some embodiments, a collection of incorrect predictions and/or statements and/or hypocrisy is maintained.

In some embodiments, a shortcut fact checker is implemented. The shortcut fact checker performs a shortcut fact check and indicates "likely true," "likely false" or another indication. The shortcut fact check is implemented by performing a search and based on the number of results, indicating "likely true" or "likely false." For example, if a search results in zero results or few results, "likely false" is indicated. If a search results in many results, "likely true" is indicated. In some embodiments, the shortcut fact checker uses reliability ratings to narrow sources used. In some embodiments, the result accuracy rating is used (e.g. only "likely true" if there are many results with an accuracy rating above a threshold).

In some embodiments, the fact checker is implemented to correct word pronunciation of any communication (e.g. of broadcast information). For example, people's names, geographic locations and any other words are able to be corrected. In some embodiments, the fact checker compares the sound clip with another sound clip. For example, a database of people's names is stored and when their name is spoken, the pronunciation is compared with the stored data in the database. For example, each player on a football team says his name, and it is recorded in a database, then, when a broadcaster says his name, if it is mispronounced, some form of action is taken including, but not limited to, playing the correct version to the user, playing the correct version to the broadcaster so that he is able to repeat it, playing a chime to the broadcaster, displaying a phonetic spelling to the users and/or the broadcaster, and/or any other indication. In some embodiments, the sound clip is converted into text, and then the text is compared with a pronunciation guide. In some embodiments, the fact checker is implemented to correct grammar of any communication (e.g. of broadcast information). For example, if a commentator says, "I'm doing good," the grammar correction is able to correct the statement by indicating, "I'm doing well." The indication is able to be any indication; for example, sending a corrective Tweet to a user's mobile device.

In some embodiments, a lie detector is implemented with the fact checker. The lie detector analyzes a speaker's voice, body language, heart rate and/or any other information to determine if the person is telling the truth. For example, a video of a speaker is analyzed in conjunction with fact checking the content of the communication to provide a better assessment of the video. The lie detection analysis is able to be used to provide context to the fact checking analysis or vice versa.

In some embodiments, tracking is implemented. For example, words and/or phrases are tracked as a speech is displayed, throughout the speech or at the end of the speech, the number of repeats is displayed. For example, if the President says, "job creation" 5 times in a speech, that total is presented to the viewer. The information is also able to used for analysis of the speech (e.g. automatically determining the focus of the speech). In another example, words and/or phrases are tracked, and supplemental information is presented related to the tracked information. For example, if the President says, we need to "increase our energy independence," supplemental information is able to be shown to the viewer that the past 5 presidents have said the same or similar idea, and the viewer is able to understand that this may be a point with little substance. The phrases do not have to be verbatim matches; similar matches are able to be found. In some embodiments, fact check information and/or supplemental information is displayed on a mobile device while the user is talking on the phone. For example, both sides of a user's phone conversation are being fact checked, and if something is detected as untrue, the fact checker indicates it to the user.

In some embodiments, user information is acquired to be used by the fact checker and/or supplemental information, for example, for advertising.

In some embodiments, information is presented in real-time, but also saved/stored so that the user is able to review the information later. The information is searchable, able to be categorized and/or organized/formatted in any manner.

In some embodiments, the date/time of a comment is recorded and/or determined. For example, if one entity begins a trend by saying a catchy phrase, and then other entities repeat the phrase making it out to be their original idea, a note is able to be presented giving credit to the first entity. Comparisons of dates/times or other implementations are able to be used in determining the first entity versus subsequent entities.

In some embodiments, the fact checker is able to detect changed names. For example, high fructose corn syrup is being changed to corn sugar. By detecting changed names, either name is able to be used in the fact check or to provide supplemental information. For example, if a person makes a comment about "corn sugar," the fact checker knows to search for "corn sugar" as well as "high fructose corn syrup." The implementation could be by using a database which stores name changes and searches based on all known names, or by using an embedded search to search for other names, or any other implementation.

In some embodiments, artificial intelligence is used in any aspect of the methods and systems described herein. For example, artificial intelligence is used to determine which follow-up question to ask a guest on a television show.

In some embodiments, the fact checker is used with tele-prompters and/or to fact check scripts prior to airing. In some embodiments, the fact checker implements measures to prevent hacking, skewing and/or other tampering of the system.

In some embodiments, the fact checker is linked to or is a part of a gaming system.

In some embodiments, an independent fact checker device is implemented where the device receives information (e.g. a television signal) without the television being on and is able to perform monitoring, searching, analysis, and/or any other tasks.

In some embodiments, one or more of the data structures described herein are populated automatically, (e.g. by automatically searching and storing results in the data structure), manually, or a combination thereof.

In some embodiments, a scam checker is implemented using the fact checker. In some embodiments, the scam checker checks websites and/or emails to determine if they are safe. In some embodiments, the scam checker determines if an advertisement is a scam (dishonest scheme or fraud). In some embodiments, a scam is detected using a database of scams. For example, content (e.g. of a website) is compared with language in a database. In some embodiments, a scam is detected by determining it is similar to other scams. In some embodiments, a scam is detected by determining it is mathematically or economically impossible. In some embodiments, a scam is detected by determining the content includes misinformation. In some embodiments, a scam is detected by searching other website and/or weblogs that have commented on the scam. In some embodiments, a user is able to request a website to be fact checked by inputting a URL in a user interface of the fact checker. Any implementation is able to be used to detect a scam. In some embodiments, a scam website is indicated as such when displayed in a search engine result or other webpage (e.g. bubble when mouse over link).

Medical

In some embodiments, a medical fact checker is implemented. The medical fact checker monitors, processes, fact checks and indicates information. In some embodiments, the fact checker checks the information with a limited set of sources (e.g. validated medical sources). For example, in some embodiments, only medical journals and studies are used as sources for fact checking. In some embodiments, other sources are used, but the sources are still certified as valid before being used. In some embodiments, additional sources are used such as medical websites. In some embodiments, a designated medical database is used as a source. For example, a database of all known illnesses and symptoms is utilized as a source. In some embodiments, users are able to specify their threshold for sources to use. The medical fact checker is able to be utilized in various implementations. In some embodiments, a user inputs (e.g. says or types), "I think I have X disease, because I have symptoms A, B, and C." The medical fact checker fact checks the statement by looking up the disease and symptoms for the disease to see if the symptoms match the disease. In some embodiments, statistics are determined and indicated to the user. In some embodiments, additional information about the person is utilized to assist in performing the medical fact check, including, but not limited to, age, weight, height, race, previous conditions, time of the year, location, genetic conditions, family history, vaccinations, recent activities, recent travels, and any other information. For example, if the user says, "I think I have Polio because I have a fever and a headache," the medical fact checker indicates a 0.0001% chance of Polio based on recent diagnosis rates and/or any other data. In some embodiments, the medical fact checker indicates possible illnesses/conditions based on the symptom(s). For example, a list of possible illnesses/conditions is presented. In some embodiments, information is displayed to indicate that the listed illnesses/conditions include some symptoms described but not others.

In some embodiments, the medical fact checker prevents misinformation from being spread by fact checking email, websites, broadcast information and any other information. The fact checker compares the information with medical journals and/or other medical information to determine the validity of the information. For example, an email discussing homeopathic remedies is fact checked and/or to provide supplemental information about the remedies (e.g. what plant the remedy comes from, where it is located, any tests or studies done with the remedy, if the remedy is FDA approved, and other information). For further example, medical analysis is presented regarding the remedy. In some embodiments, it is determined if the medical information is stale and/or if a newer study has been performed. In some embodiments, information about the source of the information is fact checked and/or supplemental information presented. For example, the doctor's credentials are displayed (and fact checked), the medical school's information is displayed, certifications are fact checked and displayed, study information is displayed, any criminal charges, complaints and/or comments are displayed and/or any other information is displayed. In some embodiments, a database is implemented to track deceptive/false/fake medicine, doctors and/or medical information. In some embodiments, an email, website and/or other content is analyzed to determine if an item is being sold. For example, an email is distributed about being tired, and at the end of the email is an item to cure tiredness. The sales pitch is highlighted or indicated in a manner to alert the user of possible misinformation or medical scam.

In some embodiments, the fact checker checks for allergy information of items. For example, a device acquires allergy information by scanning the ingredients label, taking a picture of the ingredients label, using a barcode reader to determine the ingredients information, using RFID information, and/or any method of determining the ingredients and/or food preparation information (including, but not limited to, "processed in a plant that also processes X"). The fact checker then compares the information to a database of allergy information. In some embodiments, the fact checker uses a higher level approach and fact checks the allergy information by the name of the item. Any other implementation of fact checking the item for allergy information is able to be used to assist a user in avoiding allergic reactions, such as postings on a website or statements a company has made about a product in a FAQ, blog, or other location. Analysis such as fact checking is able to be done to determine the reliability of the posting; for example, a blogger receives a reliability or credibility rating.

Television/Controversy/Candidates and Other Implementations

FIG. 15 illustrates a flowchart of a method of presenting a viewing schedule according to some embodiments. As described above, a personalized viewing schedule is able to be implemented using steps of fact checking and generating a viewing schedule for a user. In the step 1500, information (e.g. a television broadcast) is monitored. In the step 1502, the information is processed. Processing includes, but is not limited to converting the information into searchable information, parsing the searchable information into fact checkable portions, separating a show/program into segments based on time, events in the information, keywords in the information and/or any other method of separating the show/program, storing the segments in a device such as a DVR, ranking the segments, ordering the segments, filtering the segments, and/or any other processing described herein. In the step 1504, a viewing schedule is presented to the user. In some embodiments, the viewing schedule is personalized for the user or the device. For example, the viewing schedule is personalized based on personal information (e.g., age, sex, and/or other information), user preferences (e.g., music preferences, movie preferences), user input, social networking information (e.g., Facebook® page comments/likes/dislikes), tweets, the user's political classification, popularity of information/trends, and/or any other information. The viewing schedule is able to include segments of a program, show, movie, commercial, sporting event, or any other content. In some embodiments, one or more steps are skipped. In some embodiments, more or fewer steps are implemented. In some embodiments, the order of the steps is modified.

FIG. 16 illustrates an exemplary viewing schedule according to some embodiments. Using the examples directly above and further above, a news program is monitored and processed including determining separate segments of the show such as a homicide report, a sports report, and a weather report. The segments are displayed to a user in any format, for example, a view similar to a standard cable channel guide with subsets of data for each program. The user is able to select which segments to watch instead of selecting an entire show, or as described above, the segments and their order to watch is automatically generated based on personal information of the user or device information. Additionally, the segments do not have to be watched in chronological order. The segments are able to be displayed and/or watched based on a user's preferences or importance. For example, the user wants to watch weather first and then sports even though in the program, sports was first. Additionally, in some embodiments, segments that fall below a user's importance threshold (as described herein) or other criteria are not displayed.

FIG. 17 illustrates a flowchart of a method of performing television analysis according to some embodiments. As described above, television analysis is able to be implemented to improve a user's ability to enjoy television programming. In the step 1700, a search string is received. In some embodiments, the step 1700 is skipped. In some embodiments, the searched for information is automatically determined from personal information, previous viewing history, social networking information and/or from any other information. In some embodiments, additional information is received and/or automatically determined to perform the television analysis, including but not limited to which channel to monitor for which search string (e.g., different search strings for different channels or the same search strings for different channels), and the time frame of the search. In the step 1702, broadcast information is monitored. In the step 1704, the broadcast information is processed. Processing is able to include converting, parsing, analyzing, storing, comparing with a search string, auto-comparing, and/or any other processing. In the step 1706, information is presented based on the processing. Presenting the information includes but is not limited to automatically changing the channel, presenting a text/audio/video alert/alarm, displaying picture-in-picture, playing a video from a detected point, displaying different points in a video where a search string is found, and/or any other presentation of information. In some embodiments, one or more steps are skipped. In some embodiments, more or fewer steps are implemented. In some embodiments, the order of the steps is modified.

FIG. 18 illustrates an exemplary user interface for receiving search information for television analysis according to some embodiments. As described above, information such as keyword(s)/search string(s), channel(s) to be monitored, start and end time(s) for the monitoring, and/or any other information is able to be entered. The information is able to be entered using any user interface implementation including, but not limited to, text boxes, radio buttons, drop-down menus, voice input, movement recognition, SMS message, and/or any other input described herein.

FIG. 19 illustrates an exemplary screenshot of an alert using television analysis according to some embodiments. An alert is displayed at the bottom of the user's screen when the user's search string (e.g., golf) is found on a different channel. The user is then able to change the channel to view his desired programming. As described above, other alerts or effects are able to be used to inform the user that his desired programming is being played on a different channel.

FIG. 20 illustrates an exemplary screenshot of search results according to some embodiments. By searching recorded information, a user is able to locate all instances of a search string. As shown, every instance where the programming mentions the phrase "Tiger Woods" is displayed. The user is then able to go to each instance using "next" and "previous" buttons or another implementation. This enables a user to quickly view very specific desired sections of programming.

FIG. 21 illustrates a flowchart of a method of using opposing arguments by an opposing entity according to some embodiments. In the step 2100, a specific fact checking scheme and/or supplemental information scheme is configured. For example, a conservative selects a liberal channel to be monitored, conservative sources to be used, links to be displayed as supplemental information based on keywords detected and/or any other selections. In the step 2102, a user selects which plan or scheme to use for fact checking and/or providing supplemental information. For example, a user selects a conservative blogger's fact checking scheme. In the step 2104, information is monitored using the selected fact checking scheme. In the step 2106, the information is processed as described herein. In the step 2108, the processed information is fact checked using the selected fact checking scheme as described herein. In some embodiments, both the selected fact checking scheme and a general fact checking scheme are used in parallel, and both results are used. In the step 2110, a result of the fact checking is indicated as described herein. In some embodiments, supplemental information is presented including opposing arguments. The opposing arguments are able to be input and/or generated in the step 2100 or elsewhere. The supplemental information is presented with or without fact checking depending on the embodiment. In some embodiments, one or more steps are skipped. For example, if a user has already selected a fact checking scheme, steps 2100 and 2102 are able to be skipped. In another example, a fact checking scheme is automatically selected based on personal information, political classification, and/or other information about a user (e.g. social networking information), and the step 2102 is able to be skipped. In some embodiments, more or fewer steps are implemented. In some embodiments, the order of the steps is modified.

FIG. 22 illustrates an exemplary user interface for receiving user selections for information analysis according to some embodiments. For example, a user is able to select how the information is analyzed or fact checked by selecting ultra-conservative, conservative, moderate, liberal or ultra-liberal. The user is able to select a general classification of a fact checking and supplemental information scheme or a specific user's scheme. For example, a cable news network generates a fact checking and supplemental information scheme for a competing cable news network which other users are able to select for when they watch television. Additional information is able to be selected as well including, but not limited to, which channels the scheme is used for and/or any other information. In some embodiments, suggestions/recommendations are presented to users based on previous selections, suggestions by the developer of the scheme, personal information, social networking information, and/or any other information.

FIG. 23 illustrates an exemplary user interface for receiving opposing argument selections according to some embodiments. The selections for presenting opposing arguments and/or other supplemental information are able to include, but are not limited to selecting channels to apply the opposing arguments to, receiving keywords to detect, receiving responses to keywords, selecting sources to use, and/or selecting a style of response.

In some embodiments, a fact checker fantasy game is implemented. Users assemble a team similar to a fantasy football team such that each team is allowed a pre-determined number of players, and a specified number of players at each "position" that can or must be used in each game. A user for each team then determines each week which players will play that week and which are benched. For example, a team roster includes two hosts, a guest, a network and a website. The team could include any other entities to be fact checked such as a stock picker, weather person, politician, candidate, senator, representative, actor/actress, blog, anchor, comedian, announcer, sportscaster, business/corporation/organization, charity, and/or any others. The fact checker then monitors each member of the team for false information, bias and/or any other specified criteria (e.g., hyperbole). For example, host X makes a false statement, so the user's team loses 1 point, since host X is on his team. The user with the team at the end of a specified period of time with the most points is the winner. In a similar but opposite manner, the goal is to pick members of a team who provide false information and/or other specified criteria, and points are awarded to users when a team member says something false. In some embodiments, a user is awarded a point for each misstatements, bias, and any other specified characterization. In some embodiments, a user is awarded a point for misinformation, and two points for bias (or two points for misinformation and one for bias), and other point amounts for other characterizations. In some embodiments, a user is awarded a point for each characterization and an additional point if the characterization is major (e.g., a gross lie or blatant bias) as determined by a judge/referee, other players or any other implementation. In some embodiments, a user is awarded a point when a team member detects another person's inaccuracy (e.g. host X is on the user's team, and host X points out that guest Y is incorrect, then host X earns a point for the user's team). Any other parallels of fantasy games are able to be incorporated. In another embodiment, users pick fantasy teams for bias, accuracy, and/or other characterizations. For example, points are earned for a team member being biased but points are lost for a team member misstating a fact. Points are able to be awarded and lost in any desired manner. In some embodiments, users are able to configure the manner in which points are awarded and lost.

The fact checker fantasy game is able to be implemented in many different implementations. For example, in head-to-head leagues, a team matches up versus a different team each week or other designated period. The team that earns more points receives a win for that week. A team's total points is the sum of all players' points in a starting lineup. Teams with the best win-loss record win or advance to the playoffs. In another example, total points leagues are leagues in which teams accumulate points on an ongoing basis. The league standings are determined by the teams' total points instead of their win-loss record. The teams who accrue the highest total of points throughout the duration of the a set time period win or advance to the playoffs. In another example, a "survivor pool" is implemented where each user picks a commentator (or other entity) who will make the first misstatement (or other specified characterization such as the first biased comment), who will make the most misstatements in a period of time, or who will not make a misstatement for a period of time. The users who are correct, continue to play the next week, and whoever is knocked out of the pool.

FIG. 24 illustrates a flowchart of a method of implementing a fact checker fantasy game according to some embodiments. In the step 2400, user selections are received. For example, a user selects two hosts, a guest, a network, and a website to form his team. Other users make selections to form their teams. In some embodiments, the users select members of their team from the same pool, and when a member is selected, other users are not able to select that member. In the step 2402, the fact checking fantasy game is processed. For example processing includes fact checking team members comments, awarding points, managing trades/additions/deletions, determining a winner throughout and/or at the end of a season, and any other fact checking fantasy game play features. In some embodiments, one or more steps are skipped. In some embodiments, more or fewer steps are implemented. In some embodiments, the order of the steps is modified.

In another embodiment, users earn points for finding and/or providing a source that information presented is wrong or another classification. For example, users watch and highlight/select when information is false, biased, hyperbole or any other classification. The selection is able to be using a user's remote control, mouse, keyboard, mobile device and/ or any other I/O device. Users are able to win prizes or purchase items through the competitions.

In some embodiments, a single click purchase implementation is provided. In some embodiments, the single click purchase implementation is used in conjunction with any of the advertisement implementations described herein. For example, an advertisement is displayed on a user's television, and a single click option is presented on a user's mobile device or another device. In some embodiments, the single click option is used in conjunction with fact checking, and in some embodiments, fact checking is not utilized. In some embodiments, the single click option is not specifically tied to an advertisement but rather other broadcast information. For example, a user is watching a football game, and a single click option to buy a specific player's jersey is presented on the television or a second device (e.g. mobile phone or computer). In some embodiments, additional personal information is utilized to select the features of the product. For example, a user's height and weight is known by the system, and an XL jersey is presented. In another example, the user's favorite player is known by the system based on information on the user's social networking site (e.g. Facebook®). Any other ways of determining a user's information described herein is able to be used to select and/or personalize the single click advertisement. In some embodiments, the user is able to click on the item, and an advertisement is presented on the user's device(s) for single click purchase or another type of purchase. For example, a user clicks a football player's jersey, and an advertisement/screen purchase page is presented for that jersey. In another example, a user clicks a star's fancy dress at an awards show, and a single click screen purchase page is presented for that dress or a similar dress.

FIG. 25 illustrates a flowchart of a method of presenting a single click purchase implementation according to some embodiments. In the step 2500, information is monitored (e.g., television broadcast information is monitored as described herein). In the step 2502, the information is processed (e.g., broadcast information is converted and parsed for keywords). Other processing steps are able to be implemented as described herein. In the step 2504, a single click purchase implementation is presented based on the broadcast information. The single click purchase implementation enables a user to purchase an item by a single click of a button or another input. The single click purchase implementation is implemented by using stored user information, payment information, purchase information, and/or any other information that enables a user to click a button, speak a command, and/or input any other input to execute a purchase with a single click. For example, after a user clicks the single click purchase implementation, an order is sent to the selling entity with the customer's purchase information (e.g., name, address, credit card information), and the entity is able to process the order including billing the user, packaging the purchased item, and shipping the purchased item. In some embodiments, the single click purchase implementation is presented on the same device that is displaying the information (e.g., both on a television). In some embodiments, the single click purchase implementation is presented on a different device (e.g., television information displayed on television, and single click purchase implementation displayed on mobile device). In some embodiments, the single click purchase implementation is accompanied by fact checking information and/or supplemental information. For example, the single click purchase implementation is included with an advertisement, and the advertisement is fact checked to inform the user if the advertisement is truthful. In another example, supplemental information such as prices of competing products are displayed. In another example, reviews and/or ratings of: the product, the company selling the product, the network selling the product and/or any other reviews or ratings are displayed with the single click purchase implementation. For example, complaints and/or positive remarks about a shopping network are displayed along with the single click purchase implementation. The single click purchase implementation is able to be implemented as button on a touch screen, a hard button on a mobile device or remote controller, or through any other input implementation described herein. In some embodiments, a competing advertisement is displayed with the advertisement, and each has a single click purchase implementation. In some embodiments, the single click purchase implementation incorporates bidding by competing advertisements such that the advertisers are able to lower the price of the product, and the user is able to purchase the item at a desired price. In some embodiments, the single click purchase implementation is used for purchasing an auctioned item. For example, a user watches an auction on television, and presses a single button to make a higher bid. In some embodiments, the supplemental information accompanying the single click purchase implementation suggests a movie or television programming to subscribe to, download, stream, rent and/or purchase. The supplemental information is able to be based on monitoring television programming, movies watched, social networking information (e.g. Facebook® page information and recent tweets), personal information, and/or any other information. In some embodiments, foods are suggested for purchase based on programming (either directly related or indirectly related). For example, a user watches a cooking program, and the recipe is displayed (e.g. on the mobile device) for the user including items to be delivered to the home or picked up. The user is then able to purchase the items with a single click. In an example of an indirectly related food suggestion, the monitoring determines that a user is a football fan, and that the championship is upcoming. A suggestion of a delivery of pizza for that day is presented to the user for purchase with a single click. In some embodiments, the implementations described related to single click purchasing are able to be implemented using multiple clicks. Although the word "click" is used as an example herein, any single input is able to be used such as a single voice command. In some embodiments, the single click purchase implementation is used for making donations and/or contributions (e.g., an advertisement is for an animal shelter, and a single click purchase implementation allows a user to make a donation to the shelter). In some embodiments, the advertisement is a national advertisement, but the single click purchase implementation enables a user to donate to a local chapter of the organization which is determined based on the user's location. In some embodiments, one or more steps are skipped. In some embodiments, more or fewer steps are implemented. In some embodiments, the order of the steps is modified.

FIG. 26 illustrates an exemplary single click purchase implementation on multiple devices according to some embodiments. As described above, the single click purchase implementation is able to be implemented on multiple devices such as a television 2600 and a mobile device 2602 (e.g., smart phone or tablet). For example, the television 2600 displays home shopping programming, and a user's mobile device is able to coordinate with the television programming to offer a single click purchase button 2604 where the user taps the smart phone screen, and an order is placed. In some embodiments, supplemental information 2606 such as fact checking information, an additional advertisement, comparative shopping information and/or any other information described herein is displayed with the single click purchase button 2604 on the mobile device 2602. In some embodiments, the single click implementation is implemented on the same device as the programming. For example, home shopping programming is presented on a television, and a single click purchase implementation is presented on the television. In another example, the single click purchase implementation is overlaid on a standard television advertisement.

In some embodiments, a candidate fact checker is implemented. The candidate fact checker tracks and stores candidate information including, but not limited to, flip-flops, main arguments/points, positions on issues, dates of positions, advertisements by the candidate or associated people/groups, contact information, strengths/weaknesses, how to contribute to the campaign, who has contributed to the campaign or related groups (e.g., PACs/SuperPACs), associated PACs/SuperPACs, direct quotes by the candidate and/or associates, video clips of the candidate, audio clips of the candidate, and/or images of the candidate. The information is able to be stored and sorted in any manner; for example, the candidate's positions on issues are ranked from strong to weak, so that the user knows that a candidate is strongly in favor of X, but only mild cares about Z. Additionally, voice, text, photo and/or any other recognition is able to be used to detect and post information. Candidate quotes are able to be used to ensure the media does not take quotes out of context. For example, if a quote is detected out of context, the candidate fact checker presents the full quote and/or a clip of the quote. The candidate fact checker information is able to be presented when an advertisement is displayed for or against a candidate, when a candidate is making a speech on television, when a candidate is appearing in an interview, when a spokesperson or other associate is speaking or being interviewed, and/or any other event related to the candidate. The candidate information is able to be stored in any type of data structure. In some embodiments, the candidate fact checker information is displayed on a second device (e.g., mobile device) when the candidate or related event is detected. For example, a candidate appears on a talk show and provides his views. After the candidate is detected (e.g. by face recognition), statistics regarding the candidate are displayed in text at the bottom of a user's television or on the user's mobile device. In some embodiments, the statistics displayed are based on the detected candidate as well as the detection of keywords in the discussion. For example, Candidate A is detected, and it is detected (e.g., by monitoring, converting, parsing, and/or comparing the words spoken with a database of keywords) that the interview is about the environment; the Candidate's Congressional voting record related to environmental topics, and/or campaign contributions by energy companies is displayed.

Figure 27:
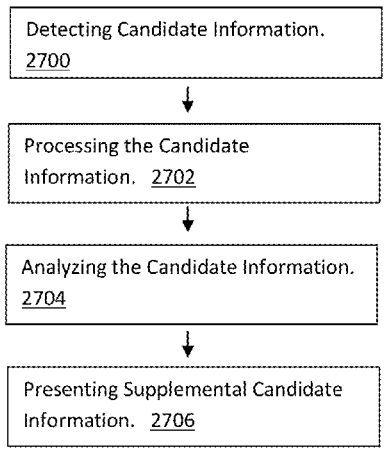
FIG. 27 illustrates a flowchart of a method of implementing a candidate fact checker according to some embodiments.

FIG. 27 illustrates a flowchart of a method of implementing a candidate fact checker according to some embodiments. In some embodiments, the candidate is a political candidate. In the step 2700, candidate information is detected (e.g., while monitoring broadcast information). Detecting the candidate information includes detecting a candidate by facial recognition, voice recognition, image recognition, name recognition, and/or any other recognition. In some embodiments, detecting the candidate includes detecting people associated with the candidate (e.g., a spokesperson or campaign manager). For example, a database stores the candidate and the people associated with a candidate, so that when the associated person is detected, he/she is recognized as being linked to the candidate. In some embodiments, detecting the candidate information includes detecting a comment by and/or about the candidate (e.g., candidate's name), an advertisement by and/or about the candidate and/or against the candidate's opponent, and/or any other information from or related to the candidate. The candidate information is able to be comments made by the candidate or associates of the candidate, advertisements, and/or any other information from or related to the candidate. In the step 2702, candidate information is processed. Processing is able to include converting, parsing, storing, classifying and/or any other processing described herein. For example, a candidate's comment is classified as a flip-flop and stored in a database under "flip-flops." In another example, advertisements are classified as attack advertisements, positive advertisements, and/or another classification. In some embodiments, advertisements are rated on a scale of very positive to very negative (e.g. 10 is very positive and 1 is very negative). In some embodiments, advertisements are fact checked (either automatically or manually) and stored with an accuracy rating which is then able to be displayed automatically with the advertisement when the advertisement is displayed. In the step 2704, the processed candidate information is analyzed. Analyzing is able to be any analysis including, but not limited to, fact checking or searching for supplemental information as described herein. In the step 2706, supplemental candidate information is presented based on the candidate and/or the candidate information. In some embodiments, the supplemental candidate information includes a campaign contribution implementation. For example, in conjunction with an advertisement for a candidate, a campaign contribution implementation is displayed on a user's mobile device enabling the user to easily make a campaign contribution. In some embodiments, the campaign contribution implementation is a single click campaign contribution implementation similar to the single click purchase implementation described herein. The campaign contribution implementation is able to be implemented on the same device presenting the candidate information or on another device. For example, a user is watching a political advertisement on his television, and a single click campaign contribution implementation is displayed on his smart phone. In some embodiments, the single click campaign contribution implementation utilizes additional information about the user including, but not limited to, previously submitted information, personal information (e.g., credit card information), a user's political classification, device information, social networking information, previous donation/contribution information, information related to the advertisement, information against the advertisement (e.g., the user is disgusted by a political attack advertisement and chooses to contribute to the candidate being attacked in the advertisement), and/or any other information. In some embodiments, the candidate fact checker is implemented for state propositions, political action committees, and/or other political entities. In some embodiments, a user's information (e.g., political classification) is used to determine the supplemental information displayed. For example, it is known that the user is concerned with the environment, but not taxes. Thus, the supplemental information displayed for the user is directed towards environmental issues (e.g., the candidate voted several times on environmentally-friendly bills). In some embodiments, one or more steps are skipped. For example, the steps 2702 and 2704 are able to be skipped in an implementation that detects a candidate and then automatically displays supplemental information about the candidate (e.g., the candidate's 3 biggest flip-flops). In some embodiments, more or fewer steps are implemented. In some embodiments, the order of the steps is modified. The steps of the candidate fact checker are able to be performed automatically, manually and/or semi-automatically.

In some embodiments, a controversy tracker is implemented. The controversy tracker is able to automatically, manually, or in a combination of automatically/manually determine a controversy. Automatically determining a controversy is able to be implemented by monitoring for a words such as "controversial" or "controversy" and any associated story, comment, or other information, or another implementation. Manually determining a controversy is able to be by a human indicating a story is a controversy. A combination of automatically and manually determining a controversy includes automatically monitoring stories and indicating possible controversies and having a human filter the possible controversies and indicating the determined controversies. Once the controversy is determined, the controversy is associated with a person, company, organization, or any other entity. For example, a database (or other data structure) stores entity information in one column or row and controversy information in another column or row. The controversy information is then indicated or displayed when that entity is viewed, heard or otherwise recognized (e.g., by face, voice or name recognition). In some embodiments, the controversy information is stored with the entity information described herein.

For example, Commentator Z makes a controversial statement on his radio show. The statement is detected as controversial and stored accordingly. When Commentator Z appears on a television show 5 months later, the controversial statement and/or a summary of the controversy is displayed with the Commentator Z using any method described herein. In another example, when a food processing plant has violated regulations, the controversy is indicated to users so that they are able to avoid the company's products. Other violations of the law are tracked, recorded and indicated, such as oil spills, other environmental misdeeds (e.g. pollution), avoidance of taxes (e.g. Company Y paid $0 in taxes last year), and/or any other controversies. In some embodiments, a user is able to use his device to determine if an entity has a controversy attached to it. For example, a user points his smart phone camera at Brand X, and the phone recognizes the brand, compares the brand with source information (e.g., a controversy database), and indicates Brand X has had an *e. coli* outbreak at one plant. In some embodiments, when a controversy is determined for a brand, a competitor is recommended. In some embodiments, only competitors without a controversy are displayed, or a competitor with the fewest controversies is displayed.

Figure 28:
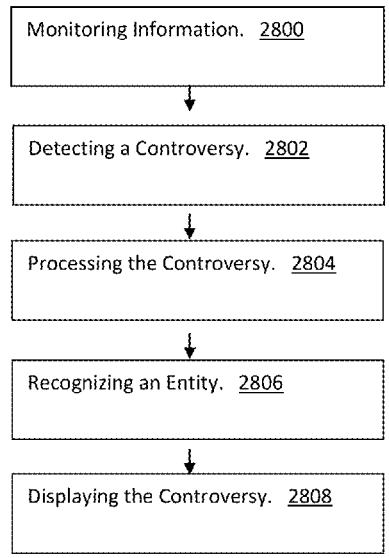
FIG. 28 illustrates a flowchart of a method of implementing a controversy tracker according to some embodiments.

FIG. 28 illustrates a flowchart of a method of implementing a controversy tracker according to some embodiments. In the step 2800, information is monitored. In the step 2802, a controversy is detected. In the step 2804, the controversy is processed (e.g. a controversy is stored in a database where the database associates the controversy with an entity). For example, a person makes a controversial statement, then the statement and the person's name are stored in related columns or rows of database. In the step 2806, the entity is recognized at a later date (e.g., facial or voice recognition, by name and/or any other recognition). In the step 2808, the previously stored controversy is displayed in any manner described herein. In some embodiments, one or more steps are skipped. In some embodiments, more or fewer steps are implemented. In some embodiments, the order of the steps is modified.

In some embodiments, the fact checker and/or other implementations described herein are able to be used with Google glasses or a similar technology (e.g., helmets, headphones, baseball caps, glasses, sunglasses, contact lenses, goggles with a heads up display). In some embodiments, the fact checker is incorporated in car, motorcycle, airplane systems, boat/cruise ship and/or other transportation systems. In some embodiments, the fact checker fact checks a user's life and what the user senses (e.g., sees, hears). The implementation is similar to what has been described herein (information is monitored, processed, fact checked and then a result is indicated). For example, a user's glasses are able to receive audio and video signals and process those signals including converting the signals to text and comparing portions of the text with source information (e.g. online sources). Then, a result is displayed on the glasses to indicate whether the detected information was true, false or any other characterization. In some embodiments, the glasses provide supplemental information, provide entity validity ratings, and/or any other implementation described herein.

In some embodiments, fact checking and/or supplemental information is presented in conjunction with a movie at a movie theater. For example, the movie is monitored, processed, fact checked and/or searched, and fact checking results and/or supplemental information is presented on a user's mobile device and/or sent to another device (e.g., a home computer). For example, when an advertisement is placed (possibly subtly) in the movie or when specific content is detected, a related advertisement is also displayed on the user's mobile device. In some embodiments, the advertisement includes a single click purchase implementation. In some embodiments, the advertisement is a recommendation to purchase a ticket for one or more movies based on the movie currently being watched, previously watched movies, personal or social networking information, and/or any other information. For example, the user is watching a comic book movie, and a purchase ticket advertisement for an upcoming comic book movie is presented to the user on his mobile device (possibly single click). In another example, music from the movie is presented on the user's mobile device for purchase and/or download. In some embodiments, the fact checking and/or the supplemental information is displayed discretely during the movie. For example, an advertisement is displayed at a lower lighting setting to avoid disturbing other moviegoers. In some embodiments, the fact checking and/or supplemental information is stored (e.g., queued) until it is displayed at an appropriate time (e.g., when the movie is over). For example, an advertisement is stored in the device until the credits are detected, and then the advertisement is displayed. In another example, when the device detects light above a threshold, the device knows that the movie is over or the user is outside of the theater, so the advertisement is able to be displayed. In another example, the device uses GPS to determine the user's location, and when the user is outside of the theater, the supplemental information is displayed. In some embodiments, the supplemental information is able to provide a countdown of when the next interesting, exciting, memorable, and/or another highlight of a movie will occur or when a specified character will appear next. For example, based on user reviews, social networking information, and/or any other information, the device gathers specific points of a movie that are or might be of interest to a user, and provides a countdown or a "heads up" alert based on the current time of the movie. In some embodiments, supplemental information asks for a user to input a review of the movie. In some embodiments, the review is a single click implementation (e.g., the user is presented 1-10 as selectable options, and the user selects one option). In some embodiments, similar implementations are provided for televisions or other devices (e.g., at home, at a sports bar).

In some embodiments, a device (e.g., television, mobile device, camera, video camera, webcam, game console) monitors users. For example, the device detects by listening to (e.g., by microphone) and/or seeing a reaction (e.g., by camera) by the user to a commercial, advertisement, movie, show and/or any other programming or event. Possible responses that are monitored and detected include, but are not limited to, a laugh, crying, an expletive, a positive comment, a negative comment, a smile, a frown, a surprised face, a furrowed brow, a hand gesture, clapping, walking away, walking toward, a channel change, a text message, a tweet, or a Facebook® post about the programming, and/or any other response. The reaction is then able to be used to perform data analysis and/or present future programming. For example, if a user reacts negatively to a certain type of commercial (e.g., comedy) or a specific commercial, that type of commercial is not presented to the user again or that specific commercial is not presented again. The monitored and collected data is stored in a data structure (e.g., database). For example, a commercial is displayed, and a user laughs. The laugh or a computer code representative of a laugh is stored in a database to correspond with the commercial and that user or device. Then, the same commercial is displayed, and the user laughs again. Again, the response is stored. The same commercial is displayed again, but this time the user does not laugh. The new response is stored in addition to or instead of the previous responses. Based on the new response, the commercial is not displayed to the user again. The responses are able to be retained for a user and/or device and based on the gathered data further analysis and actions are able to be taken. For example, if a user does not laugh at three comedic advertisements, then comedy advertisements are no longer presented for that user. In another example, if a user laughs the first four times but changes the channel or station when hearing several different comedic advertisements each a fifth time, the system is able to determine that the user's threshold for a comedic advertisement is four and does not attempt to present the same comedic advertisement a fifth time for future advertisements. In another example, responses are monitored for political advertisements, and if is detected that the user is frustrated with mudslinging advertisements, future advertisements presented are positive advertisements.

Figure 29:
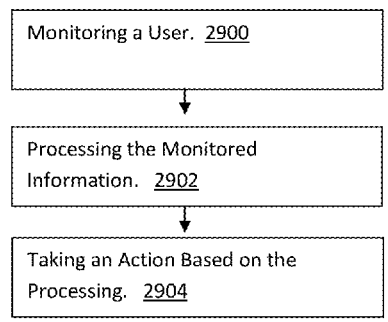
FIG. 29 illustrates a flowchart of a method of performing analysis of a user according to some embodiments.

FIG. 29 illustrates a flowchart of a method of performing analysis of a user according to some embodiments. In the step 2900, a device monitors a user. In the step 2902, the device processes the monitored information. For example, a smile is detected and a representation of a smile is stored in a database with the corresponding monitored information and the user or the device. For example, a smile is a 0, a frown is a 1, crying is a 2, and so on. In the step 2904, an action is taken based on the processing. For example, the advertisement is made available for display to the user again, or the advertisement is removed from the playing queue. In some embodiments, one or more steps are skipped. In some embodiments, more or fewer steps are implemented. In some embodiments, the order of the steps is modified.

In some embodiments, fact check information is utilized in determining search engine results. For example, in addition to standard search engine processing, the results of the search engine are fact checked as described herein, and results that contain many factually incorrect items are placed lower on the search result list. For example, a standard search returns Items 1-10, and then the items are fact checked, and Item 1 is highly inaccurate in terms of factual accuracy. Item 1 is placed lower on the list based on the inaccuracies. In another example, 10 items are found and are deemed highly relevant to the search; however, Item 1 has no factual inaccuracies, and is placed at the top of the list. The affect of the fact check on the displayed results depends on the implementation. For example, in some embodiments, the fact check only changes a position of a search result if the search result has a significant number (e.g. 10 or above a threshold) of factual inaccuracies. In some embodiments, the fact check has an equal weight to the search, so if a search result is highly relevant but has several factual inaccuracies, the search result is positioned below a less relevant result with fewer factual inaccuracies. In some embodiments, search results are grouped by relevance (e.g., search results that have 100% relevance, search results that have 95-99% relevance, 90-94% relevance, and so on), and the fact check affects the search results within the group but does not cause the search results to fall to a lower relevancy group. The weighting of the search relevance and fact check is able to be any implementation (e.g., 99%/1%, 90%/10%, 80%/20%, 50%/50%, 20%/80% or any other scheme). In some embodiments, bias of a search result is determined and affects the position of the search result in the list (e.g., a highly biased page is lower in the list than a neutral page).

Figure 30:
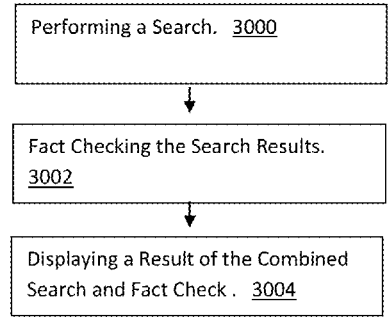
FIG. 30 illustrates a flowchart of a method of utilizing fact checking to determine search engine results according to some embodiments.

FIG. 30 illustrates a flowchart of a method of utilizing fact checking to determine search engine results according to some embodiments. In the step 3000, a search is performed. The search is performed in any manner (e.g., a user inputs a search string, the search string is located in sources such as web pages and/or documents using any search technology, and search results are returned). In the step 3002, a fact check of the search results is performed. In the step 3004, a result of the combined search and fact check is displayed. For example, a list of web pages is displayed with the top web page being the most closely related to the search string and also a factually accurate page. Therefore, when a user searches for a political topic and several web pages discuss the topic but completely distort the truth, those web pages are displayed lower in the list even though they are relevant to the search string. In some embodiments, the steps of fact checking and searching are pipelined or occur in parallel. In some embodiments, one or more steps are skipped. In some embodiments, more or fewer steps are implemented. In some embodiments, the order of the steps is modified.

In some embodiments, subjective fact checking is implemented using social networking information. For example, a user asks if the new "XYZ Movie" is worth seeing. The subjective fact checker monitors, searches, detects, compares, calculates and/or indicates a result based social network information (e.g. Twitter posts, friends' Facebook® page comments). Furthering the example, the subjective fact checker searches for the movie title and accompanying text in a person's friends' Facebook® page comments and determines three friends said the movie was "awesome." The word "awesome" with a "3" next to it is returned, or the word "awesome" is assigned a number in a data structure and retrieved and indicated, or another implementation is used. In some embodiments, the social networking information is used in conjunction with other subjective sources (e.g., critics reviews) and/or objective sources. In another example, friends' usernames are located on review websites and corresponding reviews are obtained and utilized. In some embodiments, social networking information includes social media information.

In some embodiments, historically parallel supplemental information is provided with broadcast information and/or other information. For example, if a commentator argues that the EPA is unnecessary, an explanation of why the EPA was started is indicated. In some embodiments, examples are provided (e.g. acid rain was a problem and now through the efforts of the EPA, acid rain is less of a problem). In some embodiments, citations are included. The historically parallel supplemental information is able to be searched for and/or located in a data structure (e.g. a database). For example, a database includes current topics and corresponding historical supplemental information. Examples of parallels include: getting rid of unions: terrible working conditions; shutting down the EPA: excessive pollution; and the burst of the housing bubble: the Great Depression.

In some embodiments, an automatic comment or rebuttal by a celebrity/commentator/organization, or any other entity is presented. For example, any time News Org X is mentioned by a competitor, statistics that show News Org X dominates the ratings compared to the competitor are presented. More specifically, when a user watches News Org A on channel 213, and a commentator on News Org A states that News Org X is misleading the public, a popup, caption, and/or any other indicator described herein displays a chart of News Org X's and News Org A's ratings.

In some embodiments, sources for each comment on a television broadcast are provided. The sourcing is able to be implemented by monitoring broadcast information, processing the broadcast information, searching for a source of the broadcast information and indicating a result. When statements are unsourced, unverified, or uncorroborated, the comment is indicated as unsourced, unverified or uncorroborated. For example, a news agency reports that: "Person X was unarmed." However, no source is mentioned by the news agency. To inform the user that the information is unsourced, the text is indicated as unsourced, for example, by color-coding or labeling the text as "unsourced" or similar language, or another indicator.

In some embodiments, when a commentator appears (e.g., on a television show), the commentator's web site (or Facebook® page) or a link to the commentator's web site or page is presented. In some embodiments, the link is presented on a second device (e.g., mobile device). The link is able to be a link to specific content on the site. For example, the commentator is talking about a specific article, which he also has written about online. By following the link, a viewer is able to receive more information than available on the television program. In another example, the link is to a website for purchasing the commentator's book. In some embodiments, the link is to rebuttal content provided by the commentator.

In some embodiments, an automatic, manual, or semi-automatic presentation of content is implemented to prove or disprove a point/argument. For example, video clips showing the previous comments by the commentator are shown to provide a full context of the current comment.

In some embodiments, the importance rating includes classifying information such as an article or story as: critical, important, helpful, nonsense, waste of time, trivial, distraction, irrelevant, and/or any other classification. For example, during a political campaign, many stories are presented regarding the candidates. A story about a candidate's cat 20 years ago could be classified as "distraction" or "irrelevant," whereas a story about a candidate's economic policy is classified as "important." The classification is able to use text descriptions, numerical classifications (e.g., 10 is critical and 1 is irrelevant), color coding (e.g., edge of the screen is highlighted a certain color indicating importance), and/or any other classification. In some embodiments, information is not shown if it is classified in a certain manner and/or is below a threshold. The classification is able to be performed automatically, manually, or semi-automatically. The classification is able to be stored in a data structure. Age of a story is able to be a factor in classifying information. For example, a story that is 30 years old is likely to be deemed less relevant than something that happened less than a year ago. Classifying factors include, but are not limited to, age of the information, content of the information (e.g., relevance to the country, relevance to individuals, and other relevance), quality of the content, and/or any other factors. Once a story is classified, that story and/or any repeat stories involving the content have the importance rating indicated.

In some embodiments, similar to counter-arguments described herein, supplemental arguments are indicated. For example, when an argument is detected, instead of providing a counter-argument to the argument, a supplemental argument is provided. For example, a commentator states that President Z should be re-elected because of A, B and C. When the fact checker detects that a topic of President Z and re-election is discussed in a positive manner, supplemental arguments in support of that argument are presented on a user's device or secondary device. The determination of whether the argument is for or against a topic is able to be determined from the comment itself, based on the person or entity making the comment, based on the source of the forum (e.g., which broadcast network, website) and/or a combination thereof. In some embodiments, both counter-arguments and supplemental arguments are indicated.

In some embodiments, the fact checking system has its own Twitter account (or other microblogging social networking service) or has access to a twitter account so that the results of the fact checking are automatically posted on the twitter account. For example, the fact checking system monitors communications (e.g., broadcast, web, Twitter, mobile, and/or any others), processes the communications, fact checks the communications, and when misinformation or another characterization is detected/determined, a tweet is sent. The tweet is able to include any identifying information (e.g., Senator A said, "the President wasted $100M on this trip," but the truth is the cost is under $1M). In some embodiments, the fact checking system has separate accounts for different items (e.g., 1 for broadcast information, 1 for web information, and so on). In some embodiments, the fact checking system has separate accounts where each account uses different sources for fact checking. In some embodiments, the fact checking system provides supplemental information, and/or any other information on the twitter account.

In some embodiments, the fact checking system has its own Facebook® account (or other social networking account or blog) so that the results of the fact checking are automatically posted. The fact checking system with Facebook® account functions in a similar manner to the Twitter account by monitoring, processing, fact checking, and posting to the account.

In some embodiments, fact checking is performed in the cloud, and results are indicated on a user device. For example, monitored information is sent from a device (e.g., television or smart phone) to cloud computing device(s) which then perform fact checking (or supplemental information searching, and/or other analysis described herein) by comparing the information with source information. Then, the cloud computing device(s) send result(s) of the fact checking to a user device (e.g., the same device that monitored the information and/or another device). For example, a user's smart phone monitors broadcast information, sends the information to the cloud which fact checks the information and sends a result of true or false to the user's television which displays the result. In some embodiments, processing of the information occurs on the monitoring device (e.g., information is parsed, and the parsed segments are sent separately to the cloud), and in some embodiments, the entire information is sent to the cloud which processes the information. In some embodiments, the processing on the user's device includes converting the monitored information into text or a similar data type to minimize the amount of data sent to the cloud.

In some embodiments, identification information of the monitored information is sent to and from the cloud instead of the monitored information to minimize the amount of data sent to and from the cloud. The identification information is able to include any type of identification information including, but not limited to, content identification (e.g., name, filename, channel/station), numerical representation of content segment identification, a timestamp, an identifier for matching with the corresponding monitored information, user information, device information, and/or any other identifier. For example, the code identifies which broadcast network and the start and end times of the segment to be fact checked. In another example, the cloud monitors communications/information (e.g., broadcast, web, mobile, others), and each communication or communication segment has an identification code. The communication monitored and/or displayed by a user device has a matching code. The user device is able to send the code to the cloud which matches the code with the appropriate communication, and then performs a task (e.g., processes and fact checks the communication and/or searches for supplemental information). The cloud is then able to send the identification information and a result to the user device which is then able to display the result with the corresponding communication. The identification information is implemented such that the cloud computing fact checking still provides real-time fact checking results displayed on a user's device in real-time. The cloud is able to be implemented to fact check all information or a subset less than all information. Examples of subsets less than all information include, but are not limited to, all broadcast information is fact checked, only the top 10 most popular Internet websites are fact checked, and/or broadcast information from one network is fact checked. In some embodiments, the cloud fact checks only information specified by a user to monitor. In some embodiments, the cloud is synchronized with the user's device (e.g., television and/or smart phone), and the cloud monitors, processes and/or fact checks what is being viewed/listened to by the user. In some embodiments, the cloud utilizes multiple fact checking implementations to fact check many communications simultaneously. In some embodiments, the cloud avoids redundancy by determining that a fact check of Program Z is already being performed for User A, and User B is watching the same program, the fact check is not performed a second time, rather the results from the first fact check are provided to User B.

As an example of a cloud computing fact checking system, a user device (e.g., a smart phone) displays a news program. An identification code is sent to the cloud. The identification code includes a device ID and a content ID identifying the news program. The cloud computing fact checking system monitors, processes, and fact checks the news program. The results information is sent from the cloud to the user device, and the results information is displayed on the user device in real-time.

As another example of a cloud computing fact checking system, a user device (e.g., a television) displays a news program. The user device monitors and processes (e.g., converts and parses) the news program into fact checkable portions. An identification code of each fact checkable portion is sent to the cloud. The identification code includes a device ID and a fact checkable portion ID identifying the portion of the news program content to fact check. The cloud computing fact checking system fact checks each fact checkable portion. The results information is sent from the cloud to the user device for each searchable portion, and the results information is displayed on the user device in real-time. If additional users are watching the same news program and receive fact checking information, the same results are able to be sent to those devices without performing the fact check again by sending the same result information with a different device ID for each user device.

FIG. 31 illustrates a flowchart of a method of utilizing cloud computing for fact checking and providing supplemental information according to some embodiments. In the step 3100, information is monitored (by a user device, the cloud, and/or another device). In the step 3102, the monitored information or identification information is sent to cloud computing devices. In some embodiments, the information is processed in the cloud, or the information is processed and then sent to the cloud. In the step 3104, fact checking and/or supplemental information searching as described herein is performed in the cloud. In the step 3106, a result of the fact checking and/or supplemental information searching is sent from the cloud to a device or a group of devices where the result is indicated (e.g. a user's mobile device or television, millions of televisions) In some embodiments, more or fewer steps are implemented, and/or the steps are modified. In some embodiments, the step of monitoring is not included, and/or other information is sent to the cloud. In some embodiments, the result is retrieved (e.g., pulled) from the cloud by a device, and in some embodiments, the result is pushed from the cloud to a device.

In some embodiments, the fact checking glasses, goggles, hat, clothing, and/or other items described herein are able to be used while reading newspapers and/or other printed material, and the device provides the user with fact checking and/or supplemental information on the lenses or a display in/near the lenses. In some embodiments, the glasses or other devices are able to be used to fact check or supplement a billboard, business names, food labels, allergen information, and/or digital information (e.g., information on a computer monitor or display). In some embodiments, the glasses or other devices are able to be used for price comparison. In some embodiments, the device projects the fact check and/or supplemental information onto the printed material (e.g., using a projection device embedded in the device). In some embodiments, a user's mobile device (e.g., smart phone or tablet) is able to be placed on a print material, scans the print material with a camera on one side and displays the print material on the mobile device screen on the opposite side along with any fact checking and/or supplemental information generated by analysis of the print material.

FIG. 32 illustrates a diagram of fact checking glasses according to some embodiments. The glasses 3200 include a frame 3202, lenses 3204, and a camera 3206. In some embodiments, the lenses 3204 include a display 3208 or the display 3208 is able to be flipped down or configured in any manner to be coupled to the frame 3202. The camera 3206 is able to acquire visual data by scanning and/or taking a picture of objects such as a newspaper. In some embodiments, the camera 3206 is capable of processing the data including converting the data to text, parsing the data, fact checking the data and/or providing supplemental information, and indicating a result of the fact checking/supplemental data search on the display 3208 or another location. In some embodiments, the camera 3206 acquires the data, and some or all of the processing, fact checking, searching and/or indicating occurs on another device (e.g., in the cloud). For example, the camera 3206 acquires newspaper data, sends the data or identifying information to the cloud for converting, parsing, fact checking, and then the could sends the results to the camera 3208 (or directly to the display 3208) for display on the display 3208 or elsewhere. In another example, a processor is also included with the glasses and is coupled to the camera 3206 and display 3208, and the processor processes and fact checks the information and sends the result to the display 3208.

In some embodiments, a fact checking GUI utilizes overlays, underlays, pop-ups, pop-unders, menus, frames, and/or any other component. For example, fact checking information (e.g., a result) is overlaid on a screen. Pop-ups are able to provide cites, opposing arguments, rebuttal information, advertisements, and/or any other information. A background of the GUI is able to be changed as fact checking occurs (e.g., background changes from green to red as more inaccuracies are determined). The background is able to be an overall background, or a specific background (e.g., a commentator's background, a host's background). In some embodiments, distortions are used to indicate fact checking results. For example, an image or icon of an entity is distorted as the fact checking system determines the truth is being distorted. For example, a commentator's image is a natural image initially, but as the host provides misinformation, the image becomes more and more distorted. In some embodiments, if the host corrects the misinformation, the host's image is restored incrementally. Any distortion is able to be implemented (e.g., blur, warping, darkening). In some embodiments, 3D is implemented such that fact checking results and/or supplemental information is generated to appear to come at the user. For example, only fact checking results and/or supplemental information is presented to appear to come at the user while the broadcast information is a standard display. In some embodiments, inaccurate, misleading, biased and/or other characterized information is displayed to appear to come at the user. In some embodiments, corrective information is displayed to appear to come at the user. In some embodiments, accurate information is displayed to appear to come at the user, while the inaccurate information does not, or vice versa. In some embodiments, a result of a fact check appears to come at the user, while the fact checked information is highlighted on the screen. For example, a commentator makes a misleading comment, which is displayed at the bottom of the screen, and the result "misleading" is displayed to appear to come at the user. In some embodiments, the fact checking information and/or supplemental information is presented using different icons (e.g. on a user's fact checking glasses). In some embodiments, lights and/or sounds on a television, in a house, and/or on a phone, change based on the truth/misinformation, bias, and/or other characterizations. For example, lights on the side or back of a television or in the house change to blue when a liberal bias is detected, red when a conservative bias is detected, and green when an environmental message is detected. In another example, the lights flash red when misinformation is detected, and the brightness of the red depends on how significant the misinformation is. The color and other effects of the lights are able to be controlled using any processor or controller configured accordingly. For example, a computing device sends a signal to a light controller to affect the changes in the lights. In some embodiments, a popup or a web page accompanying a website is used to display the fact checking and/or supplemental information for a website. For example, a user goes to Website X, and a pop-up from a browser plug-in shows the factually inaccurate and/or supplemental information of Website X. In another example, a browser page, frame, and/or background has a color or changes color based on the factual accuracy and/or bias of a page. In another example, each factually inaccurate, biased and/or other characterized information is highlighted on the web page. In some embodiments, the highlighting is performed by overlaying highlighting on the web page without actually changing the web page. For example, a hidden frame or another implementation is used to display the highlighting and/or additional information (e.g., supplemental information). In some embodiments, the information is selectable (e.g., a web page link) to see the evidence of the bias and/or misinformation. In some embodiments, fact checking information and/or supplemental information is an overlay projected by a mobile device or other device on a television or another screen. In some embodiments, the fact checking information and/or supplemental information is projected by a television or other device onto a television frame, wall and/or another object. In some embodiments, a user's seating area is affected in conjunction with the fact checking. For example, a user's chair vibrates when misinformation is presented, a user's chair tilts one way or the other when bias is detected (e.g., left for liberal and right for conservative), a sofa rocks when a lie is detected, and/or any other effect. The effects are able to be implemented in any manner. For example, a signal is sent from a television to a device configured to receive and respond to the signal (e.g., a motorized chair).

In some embodiments, users are able to input keywords, topics, and/or other information, to track for bias. The bias detector tracks how often a keyword is detected, determines if the keyword is used positively or negatively, and/or any other analysis to determine bias. For example, a device is configured for receiving a user-specified input for bias detection, automatically monitoring for the user-specified input, and automatically indicating bias based on detection of the user-specified input. User-input information is able to be stored in a data structure for continued use. The implementation is able to be performed in real-time. In some embodiments, the implementation is performed automatically, manually, and/or the results are displayed automatically.

In some embodiments, determining bias is performed by classifying stories as liberal, moderate or conservative. In some embodiments, sections of stories are classified. In some embodiments, stories are classified as ignored or underreported, or overreported. Then, based on the classifications, the reporting amount and/or any other information, bias is determined. For example, stories are monitored, classified, and bias is computed and indicated.

In some embodiments, the fact checking system validates itself or is able to be validated by others. For example, if enough (e.g., above a threshold) users flag a fact checked result, then the fact checking system indicates that the fact checked result is under review. In some embodiments, users are able to flag a real-time fact checked result using voice commands. For example, a user is watching television, and a fact check result displays "X's comment is false," within a designated time frame (e.g., 2 seconds), the user says a command such as "re-fact check" or "disagree." The fact checking system is able to perform an automatic review with different sources than used for the original fact check and/or a manual review occurs. Then, the result of the re-fact check is displayed (e.g., the fact check result has been confirmed or disproved and a correction is provided). In some embodiments, the re-fact check occurs automatically, and the result is displayed in real-time. In some embodiments, the result is displayed before the end of a show/event. In some embodiments, the re-fact check is sent to a user's mobile device via text message or email at a later time. The manual review is able to include sending a fact check result to an entity for manual review and receiving a result from the entity. Statistics are able to be gathered, maintained, and displayed of how often fact checked comments are challenged, proven wrong, proven correct, and/or any other statistics. The statistics are able to be gathered in any manner (e.g., manually, automatically, or a combination thereof). In some embodiments, the statistics are indicated when a user requests the information. In some embodiments, the statistics are indicated when the fact checking system is referenced (e.g., commentator mentions the fact checking system). The statistics are able to be indicated in any manner described herein (e.g., at the bottom of a television screen or on a smart phone in real-time). In some embodiments, the statistics of the fact checking system are displayed in a comparison format with a network and/or other entity. In some embodiments, justifications as to why the fact checking system was wrong are provided (e.g., system glitch that has been fixed), sources that prove the fact checking system wrong are provided, and/or any other information to inform the user that the fact checking system is not biased. A searchable data structure is implemented to store some or all of the fact checked data and statistics, including re-fact checked information, so that users are able to search and verify the fact checked information. The fact checked information is stored in any manner, such as searchable by topic, by entity, by date, and/or any other way. In some embodiments, the fact checking system indicates a label of the specific implementation of the fact checking system such as "unbiased fact checking system" or "Bob's personalized fact checking system" depending on the implementation. In some embodiments, the fact checking system invites users to disprove the fact checking system by providing sources. In some embodiments, the fact checking system re-fact checks using the provided sources. In some embodiments, users are able to rate the fact checked content, and in some embodiments, users are able to challenge or overrule the fact checking system. In some embodiments, challenging or overruling the fact checking system includes verifying a user's credentials and enabling a user to overrule or challenge a fact checking result by selecting a result and providing evidence (e.g., a disagreeing source) of the inaccuracy of the result. Safeguards are able to be implemented to prevent manipulation of the system. For example, before being able to overrule the fact checking system, each user is verified as unbiased by answering questions to prove a lack of bias, by receiving credentials, and/or any other method. In some embodiments, in addition to or instead of the user answering questions, information about the user is also ascertained manually or automatically by reviewing/analyzing the user's blog, social networking information and/or any other information. In another example, a committee is formed with members from each political party who fact check the fact checking system. In some embodiments, the fact checking system compares and displays the accuracy of the fact checking system with other outlets, networks, and/or any other entity. The comparison and/or display of the accuracy information is able to be performed automatically and/or manually and is able to occur in real-time or non-real-time. FIG. 33 illustrates an exemplary chart comparing the accuracy of several entities according to some embodiments. In some embodiments, users are able to review the sources used in determining a fact check result including sources that agree and sources that disagree. In some embodiments, when a user selects to review the sources, the user is taken to the exact page, cell in database, and/or other specific section of the source for efficiency. In some embodiments, only the specific section is available, and in some embodiments, the entire source is available. In some embodiments, sources are classified so that a user is able to select a specific classification of sources. The classifications are able to be political (e.g., Conservative, Moderate, Liberal, Green, and others), agree/disagree, and/or any other classifications. For example, the fact checking system indicates, "President Z's statement about gas prices being higher 4 years ago is misleading." In some embodiments, a user is able to select to review only disagreeing sources to see why the statement may not be misleading.

Figure 34:
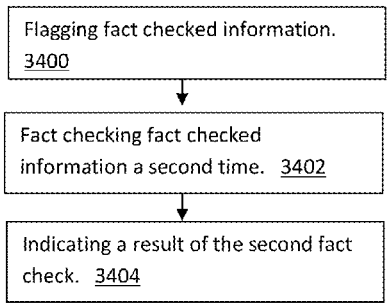
FIG. 34 illustrates a flowchart of a method of fact checking the fact checking system according to some embodiments.

FIG. 34 illustrates a flowchart of a method of fact checking the fact checking system according to some embodiments. In the step 3400, fact checked information is flagged. The flagging is able to be performed by users and/or automatically. In the step 3402, the fact checked information is fact checked a second time (e.g., a subsequent fact check occurs after the first fact check). The second fact check is able to be performed manually, automatically, or a combination thereof, as described herein. In some embodiments, the second fact check uses different sources than the first fact check. In the step 3404, the result of the second fact check or verification fact check is indicated in any manner as described herein. For example, a comment by Z states, "the economy is struggling because of the President's policies." The fact checking system determines that the economy is struggling because of cyclically weak demand. However, because a number of people above a threshold have flagged the comment, the fact checking system performs another fact check using different sources. The second fact check again determines that there is no evidence that the President's policies are causing the economy to struggle. The fact checking system then indicates that the fact check result has been confirmed. In some embodiments, the second fact check result is only indicated if the second fact check result is different than the first fact check result. In some embodiments, more or fewer steps are implemented, and/or the steps are modified. For example, in some embodiments, the step of flagging is not included.

In some embodiments, the reliability of each source is determined by classifying each source (e.g., a table or other data structure stores a source type and a corresponding rating: an encyclopedia is given a rating of 10, a national newspaper is given a rating of 7, an informational blog is given a 5, and an opinion blog is given a rating of 1), comparing each source (other than sources rated as a 10) or parts of each source with higher rated sources, sources rated 10 are able to be compared with other sources rated 10, comparing with other sources (e.g. equivalent or lower rated), determining how many sources agree with the source, and/or determining how many sources disagree with the source, and computing each source's reliability. For example, determining a source agrees with information is by comparing the information with the source and finding a matching result, and determining a source disagrees with information is when the comparison of the information and the source does not find a match. A match is able to be determined in any manner such as an exact text match, using context, using natural language processing, and/or any manner. An example of a source agreeing with information is someone saying energy independence is not a priority of the President, and a source includes text that says the based on past public statements, the President has no desire for energy independence. An example of a source disagreeing with information is someone saying the President caused gas prices to rise, and a source specifies that the main reason for the gas price increase is greater global demand for oil. In some embodiments, a source is parsed and each parsed segment is compared with other sources. Then, depending on how many sources agree with each segment determines how a source is rated. In some embodiments, the source is parsed for fact checking. In some embodiments, the sources are classified automatically, manually or verified manually after automatically classified. In some embodiments, the reliability of sources is determined automatically, manually or verified manually after being determined automatically. In some embodiments, the sources are stored in a data structure with the highest rated accessible first in the structure. In some embodiments, some of the sources are classified manually, and then used for comparison purposes to classify additional sources. For example, three different encyclopedias are given a 10 rating, 5 different dictionaries are given a 10 rating, 7 mostly accurate news articles are given a 9 rating, and 5 political opinion articles are given a 2 rating for being mostly inaccurate. Then, additional sources are compared with the previously classified sources, and a rating is determined. In some embodiments, sources are searched for and given an initial classification rating manually (e.g., by determining content is an encyclopedia, a personal blog), and then the fact checking system automatically generates the reliability rating using the initial classification rating and the accuracy of the content. In some embodiments, sources are rated by peer review. In some embodiments, sources are rated using trending information. In some embodiments, sources are rated using historical information (e.g., analyzing archives from a source). In some embodiments, the source ratings are updated periodically (e.g., daily, monthly, yearly) by checking newly presented material since the last check of the source information.

Figure 35:
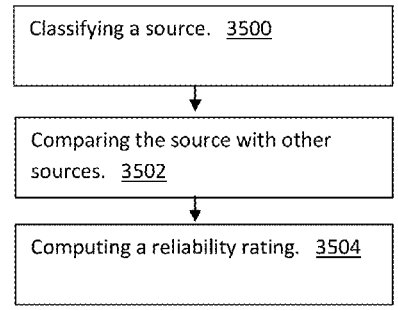
FIG. 35 illustrates a flowchart of a method of rating sources according to some embodiments.

FIG. 35 illustrates a flowchart of a method of rating sources according to some embodiments. In the step 3500, a source is classified. In the step 3502, the source or aspects of the source are compared with other sources. In the step 3504, a reliability rating is computed for the source based on the comparison of the source with the other sources. In some embodiments, more or fewer steps are implemented. For example, in some embodiments, before a source is classified, the source is prepared for fact checking (e.g., searched for, input in to a fact checking database, and/or linked to a fact checking database).

In one example, a computation is the classification rating+ (number of agreeing higher rated sources/number of disagreeing higher rated sources)*0.01 with a maximum of +1. Furthering the example, a national newspaper is classified with a rating of 7, and based on comparisons of many stories in the newspaper with many sources, it receives a maximum addition of 1 giving it a rating of 8.

In another example, a computation is the classification rating+(number of segments with a number of agreeing sources above a threshold/number of segments with a number of disagreeing sources above a threshold)*0.1 with a maximum of +1. Furthering the example, an informational blog is classified with a rating of 5, and the blog is parsed into 1000 fact checkable segments. Eight hundred of the segments are each verified as valid by at least 10 (e.g., threshold) other sources. One hundred and ninety of the segments are each verified as invalid by at least 10 other sources. Ten segments are not verified as either valid or invalid, also referred to as unknown. The computation is 5+(800/190=4.2)*0.1=5.42.

In another example, a computation begins with the initial classification rating which is then increased by 2 points with a cap at 10 if a very high percentage (e.g., 99%) of the segments are verified as accurate by a threshold of higher rated or equally rated thresholds. The rating is increased by 1 point if a high percentage (e.g., 90%) of the segments are verified as accurate by a threshold of higher rated or equally rated thresholds. The rating is decreased by half of the initial classification point if a moderate percentage (e.g., 30%) of the segments are verified as inaccurate by a threshold of higher rated or equally rated thresholds.

In some embodiments, monitoring includes monitoring closed caption information which is in text form. The closed caption information is then able to be fact checked as described herein.

In some embodiments, a data structure is populated for being searched for fact checking and/or supplemental information. A crawler is able to find and retrieve data to store. Information is able to be input by users, media and/or any others. Previously checked facts are stored in a database. The fact checking system is able to preemptively fact check websites, archived information, and/or any other information to populate the database. The fact checking system is able to check websites specifically set up for fact checking and/or supplemental information to retrieve data for fact checking and/or supplemental information. The data structure is able to be populated with advertisement data and corresponding advertisement data (e.g., competitor's advertisements). The advertisement data is able to be input by users and/or companies. Any other data described herein is able to be acquired in any manner to populate the data structure.

In some embodiments, a vehicle (e.g., car, truck, boat, motorcycle) includes a display on a windshield, window, dashboard, seat, ceiling, roof, and/or any other component of the vehicle. The display is able to be implemented in any manner including, but not limited to a projection display, an LCD display and/or any other display. In some embodiments, the display on the windshield utilizes tinting, ice, dust, dirt, or a spray of water on the outside of the windshield to enable a projection of a video and/or image to be displayed. In some embodiments, the vehicle is equipped with a camera or other scanning device to scan items such as billboards, store names, street signs, and/or any other displayed information. In an example, the camera scans a store name, and then displays on the windshield and/or dashboard, supplemental information regarding the store including, but not limited to, hours, prices of items, controversies involving the store, ratings of the store, fact check information, and/or any other information. In some embodiments, the vehicle operates in conjunction with a user's mobile device. For example, the vehicle's camera scans a store name, and supplemental information is displayed on a user's mobile device and/or added to a contacts list. In another example, a motor home camera scans an item (e.g., billboard), and then displays supplemental information on a television inside the motor home. In some embodiments, a user inputs an item to search for, and the vehicle camera searches for store names, determines items at the store (e.g., by searching a database and/or website for the store), and informs the user when the item is found. For example, a user is looking for a baseball bat, and when the vehicle camera detects Sporting Goods Store X, the vehicle camera indicates on the dashboard that the item has been found. In some embodiments, the vehicle system is able to be used to fact check and/or provide supplemental real estate information, including, but not limited to, a house address, size, number of rooms, age, price, how long for sale, current mortgage, current property tax bill, photos of inside/outside, listing agent, comparable sales/listings, trends, neighborhood information (e.g. crime, population), school information, and/or any other information. In some embodiments, the glasses and/or other clothing described herein are able to be implemented in conjunction with the vehicle system or in a similar manner as the vehicle system. For example, the vehicle camera detects a store name, and the supplemental information is displayed on the user's glasses.

Figure 36:
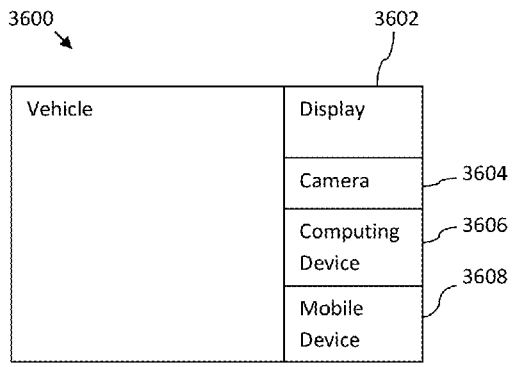
FIG. 36 illustrates a vehicle with fact checking capabilities according to some embodiments.

FIG. 36 illustrates a vehicle with fact checking capabilities according to some embodiments. The vehicle 3600 includes any standard vehicle components as well as a display 3602, a camera/scanning device 3604, and a computing device 3606. As described above, the display 3602 is able to be any display including a display on the windshield. The camera/scanning device 3604 is able to be located anywhere on the vehicle 3600 and is used for scanning objects such as store names, buildings and/or any other objects. The computing device 3606 is able to process the information acquired by the camera/scanning device 3604 including fact checking the information as described herein and send the results to the display 3602. In some embodiments, the camera/scanning device 3604 is wirelessly coupled to a user's mobile device 3608 which processes the acquired data and is able to transmit the result to the display 3602. Although various components are included in the example in FIG. 36, more or fewer components are able to be utilized.

In some embodiments, the vehicle fact checking system is utilized by police and other law enforcement. The camera is able to be used to scan a license plate and/or a type of car and by converting and/or comparing the acquired data with one or more databases, determine if the car is stolen, if the person has an outstanding warrant or a suspended license, and/or any other information useful to the police. In some embodiments, the information is useful for non-law enforcement people, for example, for recording information about an accident or a crime.

In some embodiments, the fact checking system is able to be used to fact check forms, contracts and other documents. For example, legal documents are fact checked to ensure the name, address, and/or any other information is accurate. The documents are able to be parsed into fact-based portions and law-based portions. The fact-based information is fact checked by comparing the information with information in a public database, private database, and/or any other documents or information. For example, if eight documents spell the person's name "Brian," and then his name is spelled "Brain" in the other two documents, by comparison, the user is alerted that his name different in two of the documents. In some embodiments, the law used in the documents is fact checked. The law is checked to make sure it is not stale. The law is able to be checked by comparing the language with current code sections publicly available and/or in any other way. In another example, privacy notices and other legal text (e.g., on a website) are analyzed, and transformed into lay terms, and/or specific elements are highlighted for a user. For example, when a user logs on to a website, the terms and privacy notice are summarized and/or specific sections are highlighted for a user in a pop-up window. The summary is able to be a summary prepared in advance manually or an automatically analyzed summary. The highlighted sections are able to be manually highlighted in advance or automatically highlighted by searching for specific phrases or keywords. The summary and/or highlighting is stored so that when a user logs onto the website, the summary and/or highlighting is retrieved and displayed for the user.

In some embodiments, the fact checking system is able to be used to fact check images, videos, sounds, and/or any other content. The content is able to be fact checked by analyzing a first content, searching for a second content, and fact checking the first content by comparing the first content with the second content. For example, the fact checking system is able to determine if the content has been doctored and/or determine the age, location, and/or other information of the content to determine the accuracy of the content. Whether the content has been doctored is able to be determined by searching for similar content and comparing the content to determine if there are any changes between the content. For example, a photo shows a person with an illegal item in his hand, but by using an image comparison implementation, five photos show the same photo without the item in his hand, it is able to be determined the photo has been doctored. In some embodiments, a verification process is implemented to ensure the additional photos are valid and not the doctored ones. In some embodiments, the quantity of photos is used as the verification process. For example, if there is only one photo with the item in the person's hand, and there are 1,000 photos found online with no item, then the 1,000 photos are deemed to be valid. In some embodiments, the verification process is manually performed. In another implementation to determine doctoring of content, the content is analyzed to determine if there are any edits. For example, an implementation is able to determine if any edges are improper which indicate doctoring. Any other doctoring detection implementations by analysis of the content are able to be used. In some embodiments, doctoring is determined by searching and comparing and by content analysis. In some embodiments, the content is fact checked by analyzing the embedded content information (e.g., exif information). For example, if the content is purported to be from 2012 (e.g., caption of photo says "Celebrity X at the beach, yesterday"), but the embedded information indicates the photo was taken in 2008, then the fact checking system is able to determine the misinformation and indicate a correction and/or any other notification to the user. In some embodiments, the content is fact checked by searching for a content match in a database. For example, a database stores photos, dates of the photo, and/or any other relevant information. The database is searched for the photo in question, and the date and/or other information is compared with the asserted information (e.g. date mentioned in caption), and if the dates do not match, a notification is indicated.

In some embodiments, dual mobile devices are utilized for fact checking. For example, two separate arm/wrist devices (e.g. watches) are used where one displays the content (e.g. broadcast information), and the second device displays fact checking and/or supplemental information. In another example, a device is worn on the arm, and a second device is worn in/near the ear. In another example, a device is worn on the arm, and a second device is worn on/near the eyes. In another example, a device is in/part of a vehicle, and a second device is a mobile device. In another example, a mobile device and an airplane display are used in conjunction. For example, the airplane display displays news, and the mobile device fact checks the news and displays the fact checking results, or vice versa. Any combination of the devices is able to be implemented. Any display and/or transfer of information is able to be implemented. Additionally, more than two devices are able to be used in combination.

In some embodiments, political advertisements are classified as positive or negative. The classification is able to be performed automatically or manually. The data such as the number of positive and negative advertisements is maintained (e.g., stored in a data structure), and then displayed or retrievable for users. For example, when a candidate is detected, supplemental information indicating percent positive advertisements and percent negative advertisements by/for the candidate is presented.

In some embodiments, autofill, such as automatically suggesting a search string in a search engine, utilizes fact checking for determining the autofill suggestion or suggestions. For example, when a user inputs part of a search string, "Texas is the largest," without using fact checking in conjunction with the current autofill implementation, the suggestions include "Texas is the largest state in the united states," "Texas is the largest state" and other suggestions. However, these suggestions are factually inaccurate. Therefore, using fact checking in conjunction with any autofill implementation, a suggestion would be more factually accurate such as "Texas is the largest state in the continental united states." In another example, the autofill would change the search string from "Texas is the largest" to "Alaska is the largest state." In some embodiments, the autofill with fact checking implementation is performed by first performing an autofill analysis and performing a fact check as described herein and based on the fact check, changing the autofill result. For example, a user inputs, "Texas is the largest." The autofill analysis determines that "Texas is the largest state in the united states" is the primary suggestion. The autofill suggestion is then fact checked, and the result of the fact check is returned which modifies the autofill suggestion to state, "Texas is the largest state in the continental united states." The process is able to occur automatically so that the user does not see the initial un-fact checked suggestion and only sees the fact checked suggestion. In some embodiments, multiple results are returned from the fact check and are each used to modify the initial autofill suggestion or suggestions. In some embodiments, each initial autofill suggestion is fact checked and modified. The autofill analysis and suggestions occur in real-time while the user is typing. In some embodiments, the autofill analysis and fact checking occurs simultaneously or in parallel. Fact checking is able to be used in a similar manner with predictive text.

Figure 37:
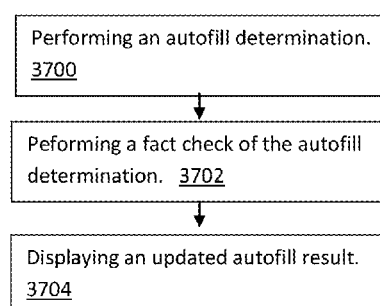
FIG. 37 illustrates a flowchart of a method of using fact checking with autofill information according to some embodiments.

FIG. 37 illustrates a flowchart of a method of using fact checking with autofill information according to some embodiments. In the step 3700, an autofill determination is performed. In the step 3702, a fact check of the autofill result is performed. In the step 3704, an updated autofill result is displayed. In some embodiments, more or fewer steps are implemented. In some embodiments, the order of the steps is modified.

In some embodiments, the fact checking system is used in conjunction with social advertising where an advertisement is based on what "contacts" are viewing/writing/doing.

In some embodiments, a fact checking and summarizing system is implemented for fact checking and/or summarizing what a user is watching/listening to or is not watching/listening to but is interested in. In some embodiments, the fact checking and summarizing system is implemented for other items (e.g., although user is not interested in politics, a summary of the presidential race is generated and displayed for the user). The fact checking and summarizing is able to occur in real-time while the event occurs. For example, a user inputs that he is interested in the upcoming State of the Union speech or the Presidential debate. The fact checking and summarizing system monitors the information independently from the user (e.g., a third party device monitors any or all broadcast information) and then provides updates on a user device (e.g., text on the bottom of a television screen, an SMS message or tweet on a user's mobile phone, a video/audio clip on the user's mobile phone or any other indication described herein). In some embodiments, the updates are periodic (e.g., every 5 minutes) and/or the updates are when a highlight occurs. Highlights are able to be detected in any manner such as when applause is detected, when an error is detected by fact checking, when a designated highlight is detected, when a user (e.g., operator, news producer) marks a section as a highlight, and/or any other detection. In some embodiments, the fact checking and summarizing occurs in real-time but is stored for later playback to the user. The updates are able to include summarized aspects of the content, misinformation with corrected information, biased information, and/or any other information. In some embodiments, the updates include information related to a manually input or automatically selected keyword, search phrase, or topic. For example, a user only wants updates about the economy in the State of the Union speech, the fact checking and summarizing system is able to detect keywords related to the economy such as taxes, debt and deficit and present a summary or video/audio clip of the specified topic. In some embodiments, the presented update includes a few seconds (e.g., 5, 10 or 30 seconds) of video (or equivalent text) before the detected keyword to ensure adequate context, and then a set period of time (e.g., 30 or 60 seconds), continuous play until the user stops the update, or another implementation to automatically detect a stop (e.g., detecting a change of topic to another topic by detecting a keyword for a different topic). In some embodiments, although the presented video or text in the update begins at a set point, the entire video or text is provided to enable a user to go back further if needed or desired. In some embodiments, the summary is able to be manually reviewed for accuracy. In an example, the summarizer summarizes specific points such as how the economy is doing by indicating the stock market is up over X years, unemployment is down to Y, GDP growth is at Z %. Current rates and/or current trends are able to be included in the summary. In some embodiments, the summarizing displays a summary of the fact checking results at the end of a show or event.

Figure 38:
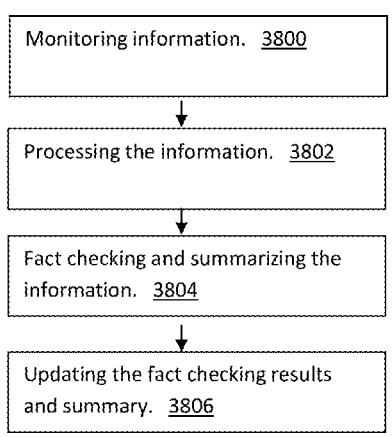
FIG. 38 illustrates a flowchart of a method of fact checking and summarizing according to some embodiments.

FIG. 38 illustrates a flowchart of a method of fact checking and summarizing according to some embodiments. In the step 3800, information is monitored as described herein. In the step 3802, the information is processed as described herein. In the step 3804, the information is fact checked as described herein, and the information is summarized. In the step 3806, the fact checking results and summary are updated on a user's device. In some embodiments, more or fewer steps are implemented. In some embodiments, the order of the steps is modified. In some embodiments, the some of the steps are performed separately.

In some embodiments, a fact checking system is able to detect manipulation of a source intended to generate a higher reliability rating. For example, if the reliability rating is determined based on the accuracy of a source or segments of a source, the source could include an encyclopedia worth of data at the bottom of the source, but include opinion information at the top of the source. Furthering the example, a blog could include factually accurate information in small/hidden text at the bottom of each web page, but at the top of each web page include inaccurate and/or biased information. The fact checking system is able to prevent such a manipulation in any manner. For example, the fact checking system is able to separate a source into portions, and if one portion is factually inaccurate (e.g., by determining many segments in the portion to be disagreed with by other sources), and another portion is factually accurate, the source is separated into two sources and each is classified separately. In another example, the source is compared with other sources to determine if copying has been performed (e.g., blog copied a thousand lines of text from encyclopedia), and any copied content within the source is excluded from the reliability determination of the source. In some embodiments, metadata of a source is analyzed. In some embodiments, sources are manually checked to determine if any manipulation has occurred. In some embodiments, a penalty is paid if manipulation is detected to deter any manipulation. For example, a reliability rating of a source is dropped to 0 or 1 out of 10, if manipulation is detected. In some embodiments, rewards are awarded for detecting manipulation of a source. In some embodiments, an alert is made to suggest a manual check if a source receives an unexpectedly high rating (e.g., above a threshold) automatically. For example, a source is classified as a personal opinion blog, and it receives a 100% accuracy rating from the automatic rating system. An alert is sent for a person to do a manual review of the blog and/or an additional automatic review is performed. In some embodiments, users are able to request a check for manipulation of a source by submitting source identification information to a manipulation detection system. In some embodiments, other forms of manipulation are able to be detected. For example, if a user generates a web page that contains factually inaccurate information, and then generates 50 duplicate web pages with different names, URLs, and/or other identifiers, the sources are able to be compared and determined to be a single source and not given weight of 50 different sources. In some embodiments, reliability determination utilizes other methods of determining reliability such as the number of other sources that link to a web page or web site.

Figure 39:
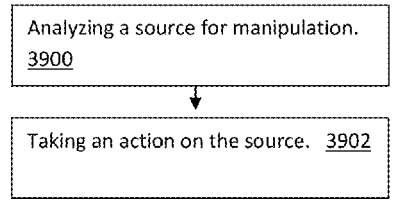
FIG. 39 illustrates a flowchart of a method of detecting manipulation of sources according to some embodiments.

FIG. 39 illustrates a flowchart of a method of detecting manipulation of sources according to some embodiments. In the step 3900, a source is analyzed for manipulation. For example, the source is parsed, each segment is compared with other sources to determine accuracy, each segment is compared with other sources to determine copying, the source rating is analyzed, and/or the size and/or color of the text is analyzed to determine if information is hidden. In the step 3902, an action is taken on the source based on the analysis. For example, the source rating is dropped to a lowest level if manipulation is detected or the source rating is maintained if no manipulation is detected. In some embodiments, more or fewer steps are implemented. In some embodiments, the order of the steps is modified.

In some embodiments, a checklist or timeline of campaign promises is generated. The checklist or timeline is able to be generated automatically and/or manually. For example, candidate statements are monitored, and when a campaign promise is made, the promise is added to the list. In another example, a user manually inputs items in a checklist. Then, after the candidate wins the position, the promises are tracked while he is in office. When an item on the checklist is completed, it is indicated as completed on the checklist. Determining the item is completed is able to be performed automatically and/or manually. For example, broadcast information is monitored for information (e.g., keywords: "Unemployment below 6%") indicating the item has been completed. Completed and uncompleted items are able to be displayed. In some embodiments, a justification is included as to why the item has not been completed (e.g., a Republican president with a Democratic Congress reluctant to compromise). The justifications are able to be determined automatically and/or manually. In some embodiments, a likelihood of success of completing the item is indicated during and/or after the campaign. The likelihood of success is able to be determined using any factor such as the current and/or projected members of the government, popularity of the item with the population, and/or any other factor. In some embodiments, fact checking is implemented with the campaign promise checklist or timeline. For example, if a comment from someone who is not the candidate is used to generate a campaign promise, the comment is fact checked to determine if it should be considered a campaign promise. Furthering the example, Commentator states that Candidate A promised to end the wars, and the comment is fact checked (e.g., by comparing the comment with an actual comment from the Candidate), and if the comment is taken out of context, then the comment is not added to the checklist. Other aspects of the campaign promise checklist are able to be fact checked as well.

Figure 40:
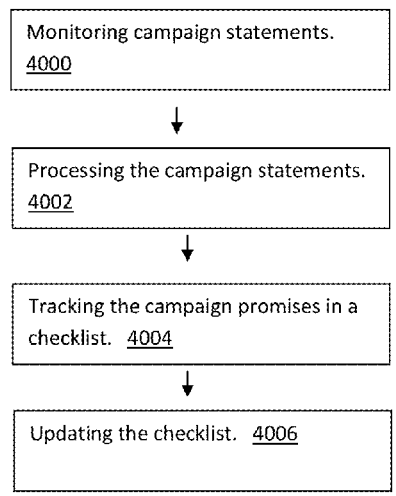
FIG. 40 illustrates a flowchart of a method of implementing a checklist of campaign promises according to some embodiments.

FIG. 40 illustrates a flowchart of a method of implementing a checklist of campaign promises according to some embodiments. In the step 4000, a candidate statement is monitored. In the step 4002, the candidate statement is processed (e.g., parsed for a campaign promise). In the step 4004, the campaign promises are tracked in a checklist. In the step 4006, when a campaign promise is detected as completed, the checklist is updated. In some embodiments, more or fewer steps are implemented. For example, fact checking is incorporated. In some embodiments, the order of the steps is modified.

In some embodiments, a salary or amount of money paid to a contributor is displayed when the contributor is recognized. For example, when commentator A appears, text is displayed that says, "Commentator A is a paid contributor by X and is paid $1M yearly by X." Contributor is able to be recognized in any manner described herein such as by face recognition and/or voice recognition. Indicating is able to be any manner described herein.

In some embodiments, a voting fact checking system is implemented to provide a user with voting information. For example, the system provides a user with the address of the voting location, directions to the location, a countdown of when to vote, an alert to vote on election day, how/where to register to vote and other information regarding registering to vote, a summary and/or analysis of the issues and/or candidates based on fact checking and/or other analysis during the campaign and/or before, suggestions on whom to vote for and/or what to vote for, and/or an explanation of how items (e.g., propositions), positions, and/or candidates would affect the user's life, related people's lives (e.g., contacts based social network information), other people's lives, the user's state, the user's country, and/or the planet. For example, the system indicates that Candidate A's plan to cut taxes will save the specific user $2000/year based on his current salary. In some embodiments, a user's input, acquired information (e.g., from social networking sites) and/or determined importance as described herein is able to be used to determine how the user would be affected. For example, it is determined that a user has a salary of $30,000 per year (which is determined to be the most important item to the user), but is socially conservative (although not vehemently), and Candidate A wants to cut taxes, but the cut will not affect someone with such a salary, the tax cut will likely add to the country's debt, but the candidate is against gay marriage which does not affect the person personally. Therefore, it is indicated to the user that Candidate A's goals are not in line with the user's most important items. FIG. 41 illustrates an exemplary voting fact checking app according to some embodiments. Voting information presented to the user is also able to include main points/positions of each candidate, projections of future laws and other effects based on the candidate's plans/positions, contribution information (e.g., how much, by whom), superPAC information (e.g., contributors and how much), and/or any other information. Fact checking information is also included, such as misinformation provided by the candidate, associates/supporters of the candidate, news members discussing the candidate, superPACs, other organizations supporting the candidate and/or advertisements for or by the candidate. In some embodiments, the summary of candidates and/or other political information is sent to only registered voters. In some embodiments, the summary of candidates and/or other political information is sent to only registered voters who did not vote in the last election. In some embodiments, the summary of candidates and/or other political information is sent to only unregistered voters. Determining who to send the summary information to is able to be based on public records, social networking information, and/or any other manner. In some embodiments, a summary includes how each choice could affect the user. For example, a summary states: Candidate A is a Republican focused on lowering taxes, increasing jobs, and reducing government regulations, and based on your information, Candidate A's policies may help you find a job, but not much more; Candidate B is a Democrat focused on increasing taxes on some, increasing jobs, maintaining government regulations including environmental protections, and based on your information, Candidate B's policies may help you find a job and protect the environment which is important to you.

In some embodiments, a table or other structure is presented comparing the main points of the candidates. In some embodiments, the table is based on and/or includes fact checking results. In some embodiments, the table includes additional information such as comparisons of political advertisements. FIG. 42 illustrates an exemplary table of a candidate comparison according to some embodiments.

In some embodiments, the voting fact checking system suggests an advertisement and/or other content for the user to watch, read and/or listen to. The suggestion is able to be based on the user's political affiliation (e.g., registered Democrat), importance selections/determination as described herein, personal information, social networking information, and/or other information. In some embodiments, the suggested content includes only fact checked content (e.g., an advertisement that has been validated as true by the fact checking system or an advertisement that includes real-time fact checking information to point out misinformation and/or bias). In some embodiments, a suggestion is made to avoid specific content (e.g. content determined to contain false information). For example, if a user is still undecided on whom to vote for, and the environment is most important to the user, the voting fact checking system is able to suggest a web page that shows Candidate B's voting record of being anti-environment, and Candidate A's pro-environment video clip. In some embodiments, a list of all advertisements, speeches, summaries of speeches, and/or any other content from one or multiple candidates is presented (e.g., a playlist). In some embodiments, advertisements by opposing candidates are presented in a side-by-side view or one after the other for comparison purposes. For example, Candidate A's advertisement about "jobs" is presented including fact checking information, and then Candidate B's advertisement about "jobs" is presented with fact checking information. In some embodiments, the effects on the user are displayed in an order with the most important aspect displayed first or at the top of the list and less important items displayed down the list.

In some embodiments, the voting fact checking system provides a user with statistics on whether his vote will affect the outcome. For example, if a user is a Republican in California, unless the Democrat candidate has major flaws, most likely the user's vote for President will not affect the outcome of the election due to the Electoral College system and the fact that California typically votes Democrat. Therefore, the statistics would indicate that the user's vote is not likely to affect the outcome of the Presidential election. On the other hand, if the user is a voter in Ohio, where outcomes have been decided by a small margin, the statistics indicate that the user's vote may affect the outcome of the election. Determining if a user's vote will affect election is able to be by analyzing historical information (e.g., past elections), current polling information, and/or projections (e.g., the projected electoral map). The indication of whether the user's vote will affect the outcome is able to be implemented in any manner described herein such as using different color coding based on the potential effect.

In some embodiments, the voting fact checking system matches and/or suggests a candidate, proposition selection, and/or any other voting item based on user selections, importance to the user, personal information, social network information (e.g., a user's Facebook® page, tweets, blogs, or contacts' pages, tweets, blogs), and/or any other information as described herein. In some embodiments, the matching or suggestion is impartial, and in some embodiments, the suggestion is biased. In some embodiments, the voting fact checking system provides a description and additional information of third party candidates.

In some embodiments, the voting fact checking system utilizes automatically and/or manually generated summaries as described herein and/or generated playlists (e.g., of political advertisements). In some embodiments, the advertisements, videos and/or other content are stored in a data structure (e.g., database). In some embodiments, the data structure is populated during and/or before the campaign on a continuous basis (e.g., updated periodically or when a new video, clip or advertisement is detected), and in some embodiments, the data structure is generated near election time by crawling for content. The data structure is able to be configured in any manner, for example, separating pros and cons for each candidate, separating the data structure into advertisements, videos, speeches, and other content, separating the data structure into factually accurate, factually inaccurate, and misleading, including differently levels of accuracy, inaccuracy, and misleading.

FIG. 43 illustrates a flowchart of a method of voting fact checking according to some embodiments. In the step 4300, a user is detected/determined/identified. In the step 4302, voting information is provided to the user. In the step 4304, an advertisement (or other content) is suggested based on the user. In some embodiments, a voting item is matched/suggested. In some embodiments, the content is provided to the user, or access to the content is provided. In some embodiments, more or fewer steps are implemented. In some embodiments, the order of the steps is modified.

In some embodiments, the voting fact checking system includes an interface to enable a user to ask a question and/or search for a topic (e.g., what is Candidate A's position on taxes?).

In some embodiments, the voting fact checking system enables the user to input a candidate (e.g., I want to vote for Candidate A), and the candidate is fact checked and compared with user information (including importance information) to determine if the candidate's views match with the user's views.

In some embodiments, the user is able to manually input information for the voting fact checking system to determine which candidate the user is most aligned with. For example, the user is able to answer a set of questions, and the voting fact checking system determines a possible candidate for the user.

In some embodiments, a simplified voting fact checking system operates automatically by determining the user based on mobile device data (e.g., cellular phone number), determining additional information about the user (e.g., searching social network information, blogs, personal information such as salary, job type, and taxes paid in previous years), comparing the information about the user with the candidate positions, likely positions, values, and/or goals, status of the country and/or any other information, and generating a result suggesting a candidate to vote for or indicating a candidate with views aligned with the user. For example, after the user initiates a mobile device app, the simplified voting fact checking system performs its tasks automatically and displays, "Based on the information I have about you, Candidate C's views are most aligned with yours." In some embodiments, a selectable option is included to allow the user to view more information (e.g. positions of the candidate, personal information used for selecting the candidate and/or any other information). In some embodiments, pros and cons of each candidate are presented based on the user (e.g., user interests, importance, and/or other personal characteristics). In some embodiments, fact checking information is taken into account. For example, if Candidate C has been found to have lied or misrepresented information, this information is used when making a suggestion. In another example, if a candidate flip-flops often, he may not be trustworthy, which affects whether he should be recommended. In some embodiments, a user is automatically determined based on phone number, location, ip address, email address, and/or any other information that identifies the user for purposes of providing voting fact checking information.

FIG. 44 illustrates a flowchart of a method of voting fact checking according to some embodiments. In the step 4400, a user is detected/determined/identified. In the step 4402, additional information is determined about the user. In the step 4404, the user information is compared with candidate information. In the step 4406, a result of the comparison is generated and indicated. In some embodiments, more or fewer steps are implemented. In some embodiments, the order of the steps is modified.

FIG. 45 illustrates an exemplary table of news coverage analysis according to some embodiments. The fact checking system as described herein is able to determine the number of inaccuracies, number of advertisements shown for each candidate, number of stories for/against each candidate, number of misleading stories and/or any other information for each network/entity.

In some embodiments, contradictory arguments/positions are indicated. For example, under President A, Commentator X says, "let's give the President a little more time to fix the economy," but for President B, Commentator X says, "the President's plans are not working" A clip of the comments about President A by the commentator are displayed in conjunction with or after the comments about President B. In some embodiments, an indication of "contradiction" is displayed as well. The contradiction is able to be determined automatically or manually. For example, a data structure is able to be populated with comments (or links to content) made by Commentator X about President A, and in a corresponding column, contradictory comments are included. In another example, the fact checking system searches for and compares source data to determine if a contradictory statement is being made. For example, the fact checking system searches a database of all comments made by Commentator X regarding a specific topic, finds a relevant comment, retrieves the comment and sends a text message to the user's device indicating what Commentator X said in the past about the topic.

In some embodiments, issues discussed by a channel/station/commentator/show/any other entity are tracked and stored. For example, political show X discussed the economy and debt most often in 2009, but rarely mentioned the economy and debt in 2008. Included with the tracked issues are dates, possible reasons why there was a change in topics (e.g., war ended), number of times discussed, positive, neutral or negative discussion of the topics, and/or any other information. The tracking and storing is able to occur manually and/or automatically. The tracked information is then able to be used for analysis and/or presented to indicate bias or other analysis.

In some embodiments, a personal fact checking system tracks contacts' (e.g., friends') factual accuracy, bias, and/or other characterizations. The personal fact checking system monitors communications of the contacts (e.g., phone calls, blogs, message boards, emails, text messages, social networking sites), analyzes the communications (e.g., determines/detects the user, processes, fact checks, determines bias and/or any other analysis described herein), and displays an icon (or other graphical representation) representing the contact's characteristics including factual accuracy, bias, and/or other characterizations in real-time or in non-real-time. In an example, a mobile device displays a contact list where each contact has a background based on their factual accuracy, bias and/or other characterization. For example, Contact A has a green background because he generally tells the truth, and Contact B has a red background because many of his comments have been determined to be false. In some embodiments, if the ratio of lies (or misinformation) to non-lies is above a threshold, the background or icon changes. In another example, Contact C forwards factually inaccurate emails to friends, so Contact C's background changes to red. In some embodiments, if the number of lies or misinformation goes above a daily, monthly, or another time frame threshold, then the background or icon changes color. In some embodiments, the monitoring, processing, fact checking, and indicating occurs on one or more devices. For example, a first device monitors, processes, and fact checks communications from users, and then results are sent to the user's device for indicating the background or icon changes. In some embodiments, the results indicate the contact and an effect of the contact (e.g., +/−accuracy). In some embodiments, when a user receives a phone call, SMS message, or other communication, the caller's validity rating is displayed on the receiver's mobile phone. The validity rating is retrieved using the caller's mobile phone number or other identifying information. For example, a database stores mobile phone numbers and corresponding user validity ratings. The phone of the recipient displays the validity rating in any manner (e.g., along with other identifying information).

Figure 46:
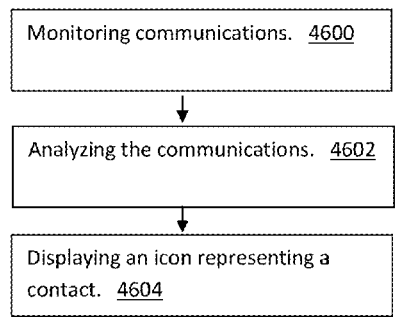
FIG. 46 illustrates a flowchart of a method of fact checking contacts according to some embodiments.

FIG. 46 illustrates a flowchart of a method of fact checking contacts according to some embodiments. In the step 4600, communications of the contacts are monitored. In the step 4602, the communications are analyzed. In the step 4604, an icon representing the contact is displayed. In some embodiments, more or fewer steps are implemented. In some embodiments, the order of the steps is modified.

Figure 47:
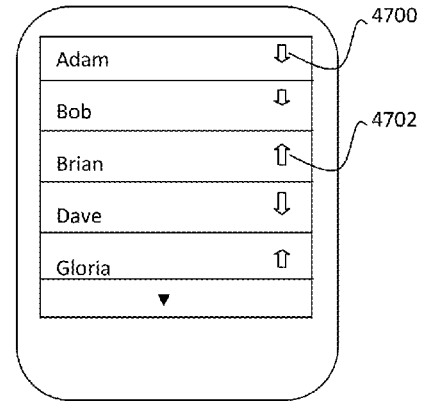
FIG. 47 illustrates a diagram of a graphical user interface of fact checked contacts according to some embodiments.

FIG. 47 illustrates a diagram of a graphical user interface of fact checked contacts according to some embodiments. A list of contacts is displayed and next to each contact is an icon representing the factual accuracy of the contact. In the example, a down arrow 4700 is used to indicate the contact has a negative factual accuracy (e.g., the contact tells more lies than a threshold), and an up arrow 4702 is used to indicate the contact has a positive factual accuracy. In some embodiments, an additional icon is displayed indicating the contact's bias and/or any other characterization.

Figure 48:
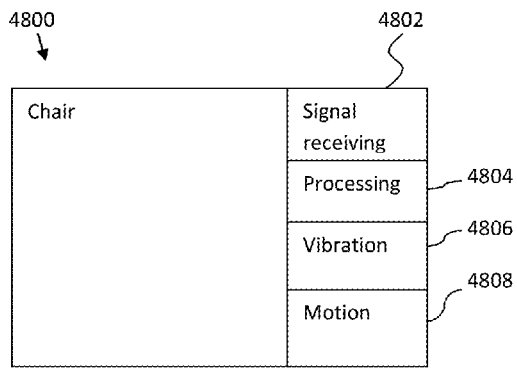
FIG. 48 illustrates a block diagram of furniture used in conjunction with fact checking.

FIG. 48 illustrates a block diagram of furniture used in conjunction with fact checking. The furniture is able to be any type of furniture, for example, a chair. The chair 4800, includes a signal receiving component 4802 for receiving a signal from another device, a processing component 4804 for processing the signal received, a vibration mechanism 4806 for providing vibrations to the furniture, and a motion mechanism 4808 for moving the furniture. As described above, the chair 4800 receives a signal from a smart phone or television based on a result of a fact check which causes the chair 4800 to vibrate when misinformation is presented, to tilt one way or the other when bias is detected (e.g., left for liberal and right for conservative), to rock when a lie is detected, and/or any other effect. The furniture is able to include fewer or more components than shown in the figure. The effects are able to occur in real-time in conjunction with broadcast information and/or other information.

In some embodiments, the fact checking system is implemented to repeatedly fact check a specified item. For example, a comment that states, "the polls show the President is trailing" may be true, false, or unknown depending on when the fact check is performed. In another example, a commentator states, "it is rumored, Candidate X is dropping out of the race." Initially, a fact check may return unknown, but by repeatedly fact checking, a result may be determined. In some embodiments, when a result of true or false (or confirmed) is returned, an alert is indicated that the rumor has been confirmed or not. In some embodiments, even when a result is determined the fact checking system continues to fact check for a period of time in case the result changes. In some embodiments, tracking the information is able to be automatic, and in some embodiments, parameters are able to be set to check. In some embodiments, a notification is indicated with a result that a future check will be performed.

In some embodiments, a GUI for rating articles so others are able to filter the articles is implemented. For example, users are able to rate articles as informative, funny, biased, accurate, inaccurate, a classification (e.g., sports, economy, environmental), and/or any other rating. In some embodiments, fact checking results of the articles are used to generate a rating or for searching. For example, a user searches for articles with a high funny rating and also a high accuracy rating based on the fact checking.

In some embodiments, a second device for receiving fact checking results and/or supplemental information is implemented. For example, the device is a display capable of receiving information transmitted from another device (e.g., a smart phone or tablet). The information is able to be transmitted in any way (e.g., Bluetooth®, wifi).

In some embodiments, user verification is performed by fact checking. For example, an entry page asks a user factually-based questions, and the answers input by the user are compared with source information where the source is personal to the user (e.g., a social network page such as a Facebook® page, personal blog, private webpage).

Figure 49:
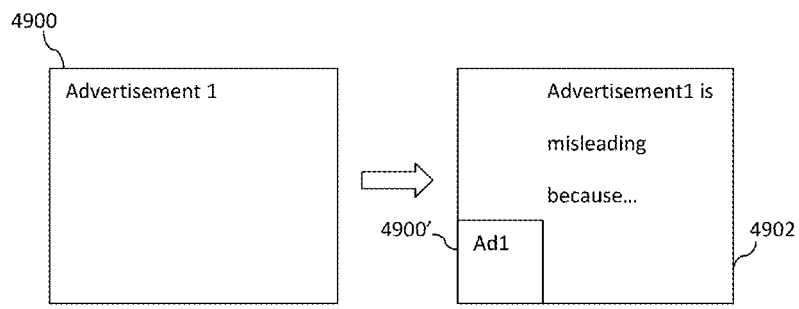
FIG. 49 illustrates an exemplary changing of a window size according to some embodiments.

In some embodiments, a window is automatically shrunk to a smaller window when inaccurate or misleading information is detected, and then the remainder of the screen is used to display the fact checking information. FIG. 49 illustrates an exemplary changing of a window size according to some embodiments. Initially, the screen includes only advertisement) 4900, but after a real-time fact check is performed, and the advertisement is determined to be misleading, the advertisement) 4900 is shrunk to a smaller window 4900', and the remaining screen space 4902 is used to display the fact checking information (e.g., a result that indicates the advertisement is misleading). In some embodiments, when an advertisement makes untrue or misleading comment, the advertisement is shrunk, and a second or rebuttal advertisement is displayed. In some embodiments, the second advertisement is a competitor's advertisement. In some embodiments, supplemental information as described herein is displayed in the remaining space after the original content is shrunk to a smaller window. Shrinking the window size and displaying additional information is able to be applied to any information, not only advertisements. For example, a news program window is temporarily shrunk while fact checking results and/or supplemental information is displayed in real-time, and then after a period of time (e.g., 5 seconds), the news program is restored, and the fact checking information is shrunk, is moved (e.g., to within the news program window), or disappears.

Figure 50:
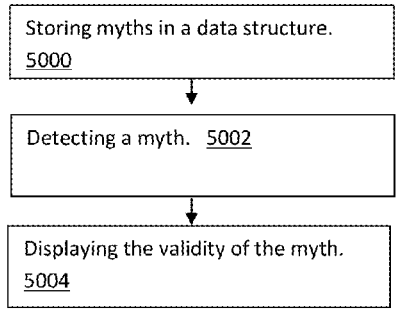
FIG. 50 illustrates a flowchart of a method of myth clarification according to some embodiments.

In some embodiments, a myth clarification implementation is utilized. FIG. 50 illustrates a flowchart of a method of myth clarification according to some embodiments. In the step 5000, myths are stored in a data structure (e.g., database) including whether the myth is confirmed, possible, disproved, unsure or similar terms. For example, a database includes the myth that "sitting too close to the television will hurt your eyes," with the result "disproved" and sources or cites to sources that support the result. In the step 5002, a myth is detected (e.g., by comparing monitored data with the stored myths). In the step 5004, the validity of the myth is displayed. The myth clarification implementation is able to be used by monitoring any communication described herein (e.g., monitoring a television broadcast or monitoring a user's conversation). In some embodiments, the order of the steps is modified. In some embodiments, more or fewer steps are implemented.

In some embodiments, an interactive fact checking system is implemented. For example, a user is watching television, the fact checking system indicates a comment was false, the user is then able to respond with a command or question such as "why?" or "prove it" or "more information." Depending on the command or question, the fact checking system responds with citations proving why the comment was false or additional context. Any command or question is able to be utilized. For example, the user is able to ask for "only supporting sources," "show me only disagreeing sources," "show me only conservative sources," "show me the full video." A user is able to request and receive supplemental information from the interactive fact checking system. For example, the user sees a commercial which is fact checked, and the user says, "show me a coupon," and a digital coupon is presented on a user's smart phone. In another example, a user sees a commercial which is fact checked, and the fact checking system indicates the commercial is misleading. The user then says, "show me a competitor's advertisement," and a competitor's advertisement (e.g., fact checked as valid) is displayed on the user's television or mobile device. In another example, a user is watching a news program which presents one side of an argument, and the user asks, "give me the opposing side's argument." Then, an opposing argument is presented to the user. In some embodiments, the opposing argument is based on the most recent parsed segment in the news program. In some embodiments, a popup screen is presented with choices for a user to select from to determine which argument he is looking for an opposing argument. In some embodiments, a user specifies the argument he is looking for an opposing argument about. For example, the user says, "give me an opposing argument to the global warming comment." In some embodiments, after a fact check result is displayed, the user is able to challenge the fact checking result by saying, "challenge." In some embodiments, the interactive fact checking system allows a user to specify individuals or groups to fact check (e.g., "fact check Commentator X" or "show me a history of fact checks of Commentator X"). In some embodiments, a user is able to request a new fact check with different sources, and the sources are able to be selected automatically, manually or a combination thereof as described herein. In some embodiments, the user is able to request a supporting argument or an opposing argument for specified content. For example, while a user is watching a political advertisement by Candidate A, the user says, "show me an opposing advertisement by Candidate B," and then the opposing advertisement is presented. In some embodiments, a user is able to take a snapshot (e.g., pause) of a screen, then select/highlight what to fact check or receive supplemental information about. Although the examples herein focus on voice commands, the interactive fact checking system is able to use any input mechanism such as movement detection and/or any other input implementation. In some embodiments, the interactive fact checking system operates in real-time. In some embodiments, the interactive fact checking system recognizes (e.g., face recognition, voice recognition) a user as described herein. Information about the recognized user is able to be used in presenting supplemental information or fact checking such as selecting sources to use.

Figure 51:
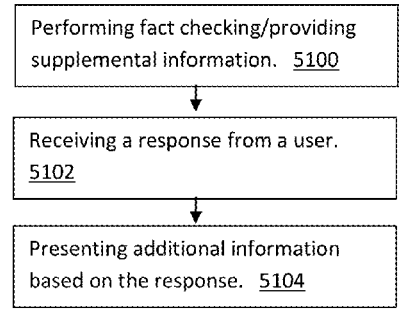
FIG. 51 illustrates a flowchart of a method of implementing an interactive fact checking system according to some embodiments.

FIG. 51 illustrates a flowchart of a method of implementing an interactive fact checking system according to some embodiments. In the step 5100, fact checking and/or searching for supplemental information is performed as described herein. In the step 5102, a response is received from a user. In the step 5104, additional information is presented based on the response. In some embodiments, the order of the steps is modified. In some embodiments, more or fewer steps are implemented.

In some embodiments, a fact check filter is implemented. The fact check filter is able to exclude advertisements, articles, stations, channels, programs, events, and/or any other content that has too many inaccuracies and/or bias (e.g., above a threshold or thresholds). The content is first processed and fact checked as described herein, then the filter is implemented to hide or not show content that falls below a filter threshold. In some embodiments, on a channel guide with a table of show descriptions, shows are highlighted with a designated border and/or background that have too many inaccuracies and/or bias.

In some embodiments, content (e.g., video) is displayed on a mobile device, and fact check results are projected by the device in real-time (e.g., on a wall, table, or any other object) while the content is displayed.

Figure 52:
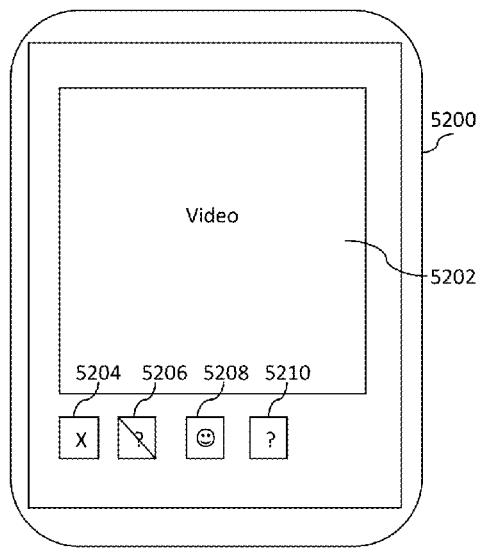
FIG. 52 illustrates a diagram of a smart phone display with a list of icons representing detected characterizations.

In some embodiments, when a factually inaccurate or misleading comment, or other characterization is detected, an icon or tile is displayed on the screen (e.g., bottom of a mobile device screen or television). In some embodiments, a list of icons is generated. Users are able to then select icons to see additional information. In some embodiments, hovering over or clicking an icon displays the fact checking information. FIG. 52 illustrates a diagram of a smart phone display with a list of icons representing detected characterizations. The smart phone 5200 displays a video 5202 or other content which is fact checked using a fact checking system. When a characterization is detected (e.g., misleading information, factually inaccurate information, sarcasm, or questionable information), an icon is displayed corresponding to the comment. The icons are then able to be presented in a list or other form. In some embodiments, the icons are presented in the list in chronological order. In some embodiments, the icons are displayed in a timeline, and in some embodiments, a timeline is displayed without icons to indicate when a fact check result occurred in the content (e.g., a fact check occurred at 5:05 in a video with a result of inaccurate, and a fact check occurred at 6:22 with a result of misleading). In some embodiments, the icons are associated with the entity (e.g., commentator) making a comment. For example, an icon indicates that a misleading comment was made by Commentator A. Indicating the who made the comment is able to be by any implementation such as using a picture, a graphical representation, a symbol, and/or text representing the entity. In some embodiments, the icons are grouped based on the entity (e.g., all comments by Commentator A are grouped in one group and all comments by Guest Z are grouped in another group). In some embodiments, the icons are grouped and displayed in a competitive and/or comparative manner. For example, a head-to-head display of inaccurate/misleading/questionable/unverified comments of commentator/guest is shown, so the viewer is able to see who is making more inaccurate comments. In some embodiments, the icons are grouped based on the characterization (e.g., misleading, inaccurate). In some embodiments, when comments are grouped based on the characterization, a number appears on or near the icon indicating the number of comments with that characterization. In some embodiments, when a group contains more than 1 item, the icon appears to be 3D or multiple icons appear in a layered formation. In some embodiments, when a user selects a characterization group, the comments are displayed in a list form for the user to view and/or select for more information. In some embodiments, different sounds, tones, music, vibration schemes, and/or any other output are utilized based on each characterization and/or entity. For example, when misinformation by Commentator A is detected, a "honk" sound is played, and when misinformation by Guest Z is detected, a "beep" sound is played. The exemplary icons shown in FIG. 52 include a factually inaccurate comment icon 5204, a misleading comment icon 5206, a sarcastic comment icon 5208, and a questionable comment icon 5210. Although a smart phone is shown in FIG. 52, the icons are able to be displayed on any device (e.g., a television). In some embodiments, the icons are displayed on a smart phone, while the video is displayed on another device (e.g., television).

In some embodiments, a preemptive fact checking system is implemented. The preemptive fact checking system attempts to anticipate misleading or inaccurate comments and provides factually accurate information before the misinformation is presented. The preemptive fact checking system is able to be manually and/or automatically implemented. The information to be presented preemptively is able to be associated with a person, network, organization and/or any other entity in a data structure. In some embodiments, a notification is displayed at the beginning of a show, program and/or any other event, to alert people to keep an item in mind while watching the program. The beginning of the show is detected in any manner (e.g., by time, audio recognition, video recognition), and bullet points of facts generated automatically and/or manually based on recent/current news/stories are displayed on a television, a mobile device and/or another device. For example, a report showing unemployment went down is released, and included in the report is the number that indicates it went down because many people stopped looking for work. To prevent the misrepresentation of the seemingly positive unemployment number, an alert is presented that informs the user at the beginning of a news program that unemployment went down because of X number of people stopped looking for work.

In some embodiments, the fact checking system determines whether a respondent answers a question. The fact checking system analyzes the question asked, and then based on the response, determines whether the question was answered. Determining if the question is answered is able to be performed in any manner, for example, locating and/or storing a set of appropriate responses, comparing the response with the appropriate responses, and if the response is similar, then the question has been answered properly. Another example of determining if the question is answered is by comparing the number of relevant words to the question and determining if the number of relevant words is above a threshold. For example, if the question is about the economy, and the answer only mentions one word related to the economy, then the response is deemed to be unresponsive. The related words are able to be stored in a data structure used for comparison purposes. The fact checking system indicates in real-time a responsiveness response such as "evading" or "didn't answer the question" or "didn't answer the question fully," or similar language, and/or provides a number rating of responsiveness 0 (did not answer at all) to 10 (fully answered). Other indications are able to be used to describe the responsiveness of an answer. In some embodiments, users are able to flag a response as unresponsive (e.g., voice command "unresponsive"). In some embodiments, a flagged response (by enough users) is checked for responsiveness. In some embodiments, if enough users flag a response as unresponsive, the response and responsiveness are documented in a data structure for the entity (e.g., a guest on a show).

Figure 53:
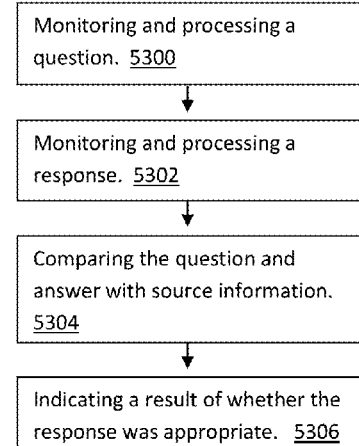
FIG. 53 illustrates a flowchart of a method of determining if a respondent answers a question according to some embodiments.

FIG. 53 illustrates a flowchart of a method of determining if a respondent answers a question according to some embodiments. In the step 5300, the question is monitored and processed (e.g., parsed). In the step 5302, the answer is monitored and processed (e.g., parsed). In the step 5304, the processed question and answer are compared with source information (e.g., database information) to determine if the question was answered appropriately. In the step 5306, a result of whether the answer was appropriate is indicated. In some embodiments, the order of the steps is modified. In some embodiments, more or fewer steps are implemented.

In some embodiments, a commentator refers to a source, and the fact checking system determines the reliability and/or bias of the source and indicates the reliability/bias of the source.

In some embodiments, fact checking results are able to be swiped, bumped, uploaded, or moved from one device or window to another device or window. In some embodiments, the move causes an auto-correction of the information on the second device. For example, a user's name is fact checked, and the correct spelling is located on a first device. Then, the information is swiped using a user's finger and directed at a second device with the incorrect information. The information is then corrected after the swipe by locating the misinformation and replacing it with the correct information. In some embodiments, a user is able to swipe, bump, upload or move documents, videos, and/or other content to a television or other fact checking device to be fact checked. For example, a user is watching a video on his mobile device, and he swipes the video to a stand-alone fact checking device, which fact checks the video, and returns a result to the mobile device for presentation. In some embodiments, a device detects nearby devices and automatically determines which device is best to display certain content. For example, a user is watching a program on a television. The program is fact checked, and the television determines that the fact check results should be sent to and displayed on the user's smart phone. The automatic determination is able to occur based on the size of the content (e.g., display large graphics on television instead of smart phone screen), based on the type of the content, and/or based on any other aspect of the content or the devices. In some embodiments, the user is able to specify which type of content is displayed on which device. For example, a user decides he does not want fact check information displayed on the television, and the user specifies through the television, the mobile device, or in the cloud, that he wants the fact checking results to be displayed on his mobile device.

In some embodiments, supplemental information is specifically provided for turning content generally directed at adults into content appropriate for children. For example, if a mother is watching a Presidential debate on a television, and her child is watching along, supplemental information explaining the content and/or other aspects of the debate or government are presented on the television or a second device (e.g., smart phone or tablet). Furthering the example, the supplemental information could include how long a president is in office, requirements to become president, how the electoral college works, and/or specific explanations of the debate. For example, if a candidate discusses economic policies, cartoons and/or simplified information is able to be presented related to the economic policies. The child-specific information is able to be stored in a data structure and retrieved and displayed when a keyword is detected or based on timing of the event. For example, if the word "economy" is detected, graphics about money are displayed. In another example, at the 5 minute mark of the debate, additional information about the presidency is displayed such as historical data. In some embodiments, the supplemental information includes games and/or quizzes related to the subject matter. The child-specific information is able to include fact checking results as well and provide lessons to learn based on the fact checking. In some embodiments, the mature content is converted into a cartoon or animated program.

Figure 54:
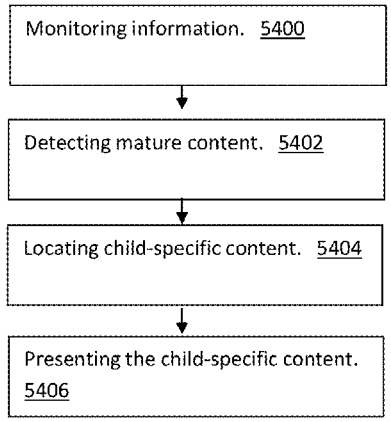
FIG. 54 illustrates a flowchart of a method of providing content appropriate for children based on content directed at adults according to some embodiments.

FIG. 54 illustrates a flowchart of a method of providing content appropriate for children based on content directed at adults according to some embodiments. In the step 5400, information is monitored (e.g., broadcast information). In the step 5402, the content is detected as directed to mature material. The content is able to be detected as mature by comparing keywords in the content with a database, based on a title of the content, based on a subject of the content, based on a lookup table of what content is on and when, where the content is already classified, based on a user selection indicating mature material, and/or in any other manner. In the step 5404, child-specific content is located (e.g., searching a database for presidential debate and locating a supplemental video which explains three branches of government or a quiz about the Presidents). In the step 5406, the child-specific content is presented. For example, the child-specific content is presented on a mobile device (e.g., tablet computer) while the television shows the mature content. In some embodiments, the order of the steps is modified. In some embodiments, more or fewer steps are implemented.

In some embodiments, comments (or segments of comments), and/or other information is classified by political party or another political/social classification. For example, a commentator says, "the government should stay out of the free market, but the people own the land so the government should control the price of oil and gasoline." The first part of the comment (before the "but") could be classified as libertarian, conservative, republican, and/or a similar classification. The second part of the comment (after the "but") could be classified as socialist or another similar classification. In some embodiments, the classifications are presented (e.g., indicated in real-time on a user's screen). In some embodiments, the classifications are stored along with a tally of the number of comments in each classification, and the tally (e.g., in a chart, statistics) is presented during the event/show, at the end of a segment of an event/show, at the end of an event/show or presented at another time (e.g., when a commentator or other entity is detected). For example, at the end of a show, a tally indicates that the host of the show made 35 conservative comments and 5 liberal comments. In some embodiments, a comparative chart is presented comparing the comments of the host, guests, and/or other entities. The comments are classified in any manner, for example, comparing the comments with a database of classified comments, and a comment is classified based on its closest classified comment. In some embodiments, the comments are classified automatically, classified automatically and verified manually, or classified manually by a human.

Figure 55:
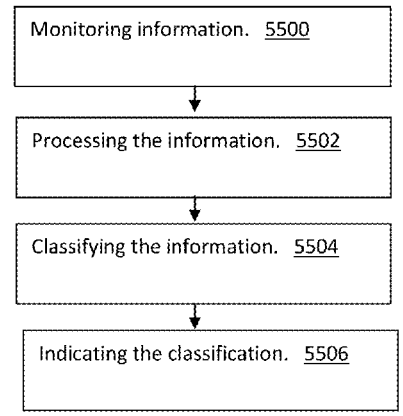
FIG. 55 illustrates a flowchart of a method of classifying information by political party according to some embodiments.

FIG. 55 illustrates a flowchart of a method of classifying information by political party/view according to some embodiments. In the step 5500, information is monitored (e.g., broadcast information) as described herein. In the step 5502, the information is processed as described herein. In the step 5504, the information is classified by comparing keywords or key phrases with a data source (e.g., online sites and/or a database) to determine which political classification the comments is nearest to. In an example, if the comment is similar to or the same as a comment by an Internet blogger that is conservative, the comment is able to be classified as conservative. The source of the source is able to be one factor in determining the classification. For example, although the comment is similar to a conservative blogger, if the comment is similar to a previously classified comment that is classified as socialist, then, in some embodiments, the previous classification is given more weight, and the comment is classified as socialist. In the step 5506, the classification is indicated as described herein. In some embodiments, the order of the steps is modified. In some embodiments, more or fewer steps are implemented.

In some embodiments, "loaded" words/questions/information (e.g., terms/phrases meant to cause strong positive or negative responses, have negative or positive connotations, or are emotive) are monitored for, detected, and highlighted. For example, if a commentator says, "electing candidate Z is dangerous," then "dangerous" is highlighted for the user. In some embodiments, a positive/negative connotation is also indicated by the loaded word. In some embodiments, the way of highlighting is based on the strength of the word (e.g., a word that is highly emotive is significantly highlighted, where a word that is only slightly emotive is lightly highlighted). In some embodiments, additional information is provided to indicate that the language being used is biased (in one way or another). Furthering the example, referring to a candidate as "dangerous" indicates bias against that candidate by the commentator. Loaded words and tallying the number of times loaded words are used are able to be used in determining bias. For example, if a commentator refers to a candidate with 5 words that have a negative connotation and 0 words that have a positive connotation, it is able to be deduced that the commentator has a bias against the candidate. In some embodiments, the relationship of the loaded words to the subject (e.g., candidate) is analyzed and used in determining bias. For example, words that are directed towards the subject are given more weight than words that are merely mentioned while talking about the subject. For example, "candidate Z is dangerous" is given more weight than "candidate Z traveled to Afghanistan which is dangerous." Other contextual features are able to be analyzed and utilized in determining whether loaded words indicate bias. In some embodiments, only loaded information/comments are fact checked as described herein. For example, when a commentator in a monologue discussing candidate Z states that "candidate Z is dangerous," the sentence segment involving the loaded word "dangerous" is fact checked and/or supplemental information is searched for. For example, supplemental information indicating why candidate Z might be dangerous or fact checking information that disagrees with the comment is indicated based on a source information search. In some embodiments, weight of the loaded words depends on where or when the words are used. For example, if the loaded words are used in a title of an article or at the beginning of a monologue, they are given more weight than if they are in the middle of an article. The weight could be used as another factor in determining bias. For example, if the weighted number of loaded words with a negative connotation is above a threshold, it is determined that a bias exists between the commentator and the subject. In some embodiments, loaded words, who said/wrote them, who they are about, and/or other information are stored and used for comparison purposes.

Figure 56:
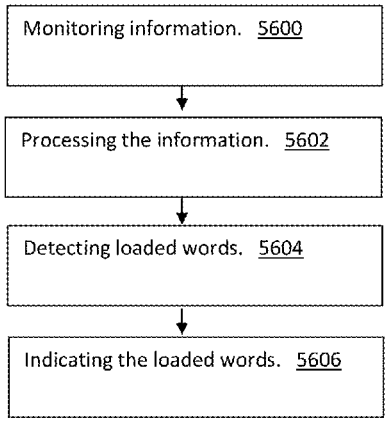
FIG. 56 illustrates a flowchart of a method of detecting and highlighting loaded words according to some embodiments.

FIG. 56 illustrates a flowchart of a method of detecting and highlighting loaded words according to some embodiments. In the step 5600, information is monitored (e.g., broadcast information) as described herein. In the step 5602, the information is processed as described herein. In the step 5604, loaded words are detected within the processed information. The loaded words are able to be detected by comparing the processed information with a data source (e.g., online sites or a database). For example, a database stores all loaded words and phrases, including negative/positive connotation, and when a loaded word/phrase is found in the database, the loaded word is indicated (e.g., highlighted) in real-time on the screen in the step 5606, as described herein. In some embodiments, the order of the steps is modified. In some embodiments, more or fewer steps are implemented.

In some embodiments, specific keywords and/or characters are detected for determining whether to fact check a search engine input. For example, when a user includes a question mark at the end of the search string input in a search engine, the search engine fact checks the search string instead of simply searching for pages related to the search string. Any keywords or characters are able to be used, and any location of the keywords is able to be used. For example, when a user types "fc"+search string+"?" then the search fact checks the search string. The detectable fact check keywords/characters are able to be stored in a database, and each search engine input is parsed and compared with the stored keywords/characters. Any other implementation is able to be used to determine if the search string is to be fact checked. After the fact check keywords/characters are detected, the search string is compared with source information as described herein. A result of the fact check is then indicated as described herein.

In some embodiments, accusations of bias by a first entity against a second entity are detected. For example, if Network A accuses Network B of being biased for not discussing Story X, then references of Story X in Network B are searched for and/or monitored for and indicated. Furthering the example, Network A says Network B is not covering Story X, and a search of Network B data (e.g., archives) is performed, and if there are no matches or "hits," then either no additional information is presented or a message such as "this accusation is correct" is presented in real-time. However, if there are matches, then an indication is presented in real-time such as, "this accusation is incorrect." Additional information is able to be provided such as the number of times Story X was discussed, the ratings during Story X showing that it is unpopular and thus why not discussed more, fact checking information indicates the story is not accurate (e.g., story is fact checked, and result is that the story is not accurate or not verified), links to videos, articles and/or other information discussing Story X by Network B, and/or any other supplemental described herein. Detecting bias accusations is able to include monitoring information as described herein, detecting an accusation of bias by an entity (e.g., not reporting, underreporting, overreporting a story, event or any information), searching for and/or monitoring for the accused information on the accused entity or entities, and indicating the result of the searching/monitoring in real-time. In some embodiments, the bias accusation information is not presented on an initial detection of the accusation, but subsequent presentations of the accusation are accompanied by the results of the bias accusation search. For example, a commentator on Network A claims Network B is not covering Story X. It is determined in real-time or non-real-time if Network B is covering Story X. If Network B is covering Story X, the next time the commentator or another commentator on Network A or another entity (e.g., blogger) is detected and/or claims Network B is not covering Story X, the supplemental information showing that Network B is covering Story X is presented with the comment proving the comment to be false. The next time is able to include during a rebroadcast/rerun, during a presentation of the information on the Internet, radio and/or other system, when another entity makes the same or similar claim, and/or any other time.

Figure 57:
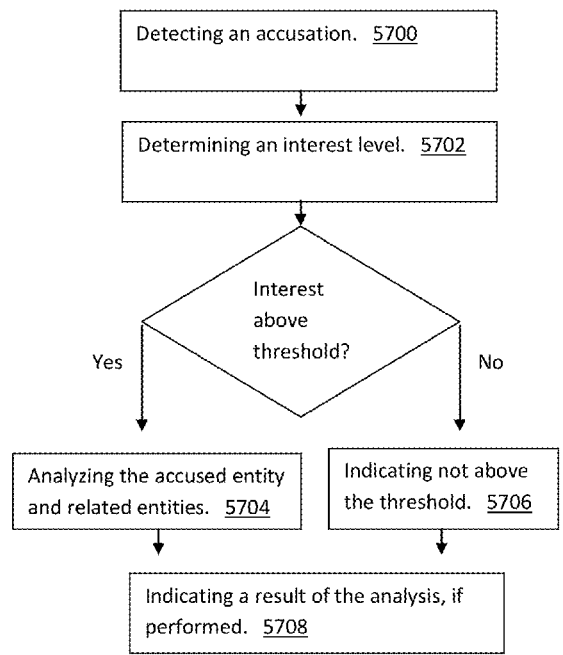
FIG. 57 illustrates a flowchart of a method of detecting accusations of bias by one entity against another according to some embodiments.

FIG. 57 illustrates a flowchart of a method of detecting accusations of bias by one entity against another according to some embodiments. In the step 5700, an accusation is detected. Detecting the accusation is able to performed in any manner. For example, information is monitored for a keyword or phrase indicating an accusation (e.g., words/phrases that indicate an accusation are stored in a database for comparison—"Network B ignores"). In the step 5702, an interest level is determined. For example, ratings statistics are analyzed about the popularity of a topic/story/any other information. In the step 5704, if the interest level is above a threshold, then the accused entity and/or related entities are analyzed (e.g., archives of past reporting are searched for the accusation). In the step 5706, if the interest level is not above the threshold, then it is indicated that the information is below an interest level. In the step 5708, a result of the analysis of the accused entity is presented. For example, the result is displayed on a user's television and/or mobile device at the bottom of the screen. In some embodiments, the order of the steps is modified. In some embodiments, more or fewer steps are implemented. For example, the steps involving the interest level are skipped, and factual accuracy of the accusation is checked regardless of the interest level.

In some embodiments, a search engine utilizes social network information and fact checking information to perform a search. In some embodiments, a search engine manages a search results database and another database is a user database that keeps track of all search queries specified by each user and for each search query, a record of all links the user clicked when search results based on the search query were presented to the user. In some embodiments, the links are or have been fact checked which affects their ranking/ordering as described herein.

In some embodiments, the search engine utilizing social networking information and fact checking information to perform a search, performs a search, the search results are fact checked, the fact checked search results are compared with social network information, and search results are displayed based on the search, fact check and the social network comparison.

FIG. 58 illustrates a flowchart of a method of using a search engine in cooperation with social network information and fact checking information according to some embodiments. In the step 5800, a search engine retrieves search results responsive to the search query from a search results database. In some embodiments, the search results include fact checked information (e.g., web pages). In the step 5802, fact checking is applied to the search results. In some embodiments, the search results are retrieved and then fact checked as described herein. In the step 5804, the search engine searches a database (e.g., a third party database) for search queries that match the one received from the user. If there are no matches, the search results retrieved in the step 5800 are presented to the user in the step 5806. If there are one or more matches, the search results are ranked based on a scheme such as the frequency of "relevant" clicks on the links associated with the search results and then presented to the user in the step 5808. Frequency of clicks is equal to the number of prior clicks on a link divided by the number of times that link was displayed, and links with higher frequencies are ranked higher than links with lower frequencies. In some embodiments, a combination of frequency and factual accuracy is computed, and links with a higher combined score are ranked higher than links with a lower combined score. Relevant clicks are clicks made by users who are within a specified degree of separation from the user who requested the search. The degree of separation information (e.g., social network or relationship information) is able to be maintained by the search engine or obtained from an online social network. The specified degree of separation is able to be any number or set as ALL, in which case all clicks become relevant, and it is able to be set by the operator of the search engine, or it is able to be set by a user in his profile. For example, if the user sets the specified degree of separation as 1, only clicks made by those who are friends of the user become relevant clicks. When the system receives an Internet search query from an Internet user who is not a member of the online social network, it retrieves the search results responsive to the search query from the Internet search results database, and searches the Internet search query database for search queries that match the one received from the user. If there are no matches, the search results retrieved from the Internet search results database are served to the user. If there are one or more matches, the search results retrieved from the Internet search results database are ranked based on the frequency of clicks on the links associated with the search results and then served to the user. In some embodiments, the order of the steps is modified. In some embodiments, more or fewer steps are implemented.

In some embodiments, social networking information is used for context determination. For example, social networking information is able to provide political context (e.g., person is a conservative based on "liked" blogs or contacts), economic context (e.g., person's income/wealth is in the top 5% based on the trips taken described on a social network site), time/date context, location context, social context, legal context, and/or any other context. Determining the context is able to be performed in any manner (manually, automatically or semi-automatically) such as by searching for keywords or phrases and/or classifying information contained within the social network sites.

In some embodiments, a message board fact checking system for automatically fact checking message board postings is implemented. A validity rating as described herein is used for usernames (e.g., posted next to or near usernames). A validity rating for a username is modified (e.g., increased or decreased) based on the factual accuracy of the postings using the username. For example, Username A has a −5 validity rating for 5 factually inaccurate postings. In some embodiments, each factually inaccurate comment affects the rating (potentially many in a single posting), and in some embodiments, a posting is considered in total (e.g., 5 inaccuracies in 1 posting only counts once against the user). In some embodiments, factually inaccurate content is highlighted (e.g., in red) for the user so that he is able to correct his post and/or for everyone to be alerted to the misinformation. Postings and/or content within each posting are able to be classified and/or characterized using any of the classifications/characterizations described herein such as political classifications, hyperbole, sarcasm, inaccurate, bias, and/or comedy. In some embodiments, users are able to increase their validity rating by posting factually accurate information, flagging other postings (including providing sources), and/or correcting other postings. In some embodiments, flagged postings are able to be fact checked by the user, others, and/or automatically by the fact checking system. Users are able to submit a source supporting the flag (e.g., comment X is inaccurate based on cite Z). In some embodiments, the validity rating for a message board includes factually inaccurate comments and the number of corrections displayed separately. In some embodiments, a user is not permitted to post if his validity rating falls or is below a threshold. When a user is not permitted to post due to a low validity rating, the user is able to raise his validity rating by flagging factually inaccurate postings, fact checking postings, characterizing postings (e.g., identifying correctly a posting to be hyperbole), and/or in other ways, so that eventually the user's validity rating is above the threshold. To prevent users from avoiding the validity rating system, validity ratings are able to continue with a user even if a user changes his username. Username changes are able to be determined by comparing IP address, language of posts and/or other information to prevent users from changing names after posting factually inaccurate information. Items/statistics (e.g., inaccuracies, posting inaccurate sources, bad language) about a user are able to be stored, sorted, searched and/or posted. In some embodiments, when a user posts a comment on a message board, the comment is fact checked before being posted for public view, and if the comment is not verified as factually accurate, the user is prompted to provide a reason, justification, and/or citation supporting the comment. For example, a user attempts to post, "the president is a Communist." The message is fact checked in real-time and determined to be factually inaccurate. The user is then requested to provide a reason or citation justifying the message. In some embodiments, if the reason or citation supports the message (e.g., the reason or citation is fact checked by the fact checking system and found to support the message), the message is posted for public viewing, and if the reason or citation does not support the message, the message is rejected and not posted. In some embodiments, the citation is verified by the fact checking system (e.g., the fact checking system determines the reliability of the source). In some embodiments, a reliability rating of the source is provided when the message is posted. In some embodiments, the message is not further verified, but the reason and/or citation is posted with the message. In some embodiments, the user is prompted to select a classification (e.g., fact, opinion, hyperbole, sarcasm). In some embodiments, message board posts are able to be sorted based on factual accuracy and/or other criteria such as most liked/popular, newest/oldest, most controversial, and/or others. In some embodiments, the validity rating is able to be used at multiple message boards. For example, if a user has the same username, the same validity rating is displayed at different message boards. In some embodiments, even with a different username, the system is able to determine the same user (e.g., based on IP address) and maintain the same validity rating. In some embodiments, if a posting is factually inaccurate (e.g., more factual inaccuracies than a threshold or a higher percentage of factually inaccurate comments than factually accurate comments), then the posting is hidden or not shown.

FIG. 59 illustrates a flowchart of a method of fact checking a message board according to some embodiments. In the step 5900, message board postings are fact checked automatically. Fact checking the message board postings includes processing the postings, fact checking the postings, and indicating fact checking results (e.g., highlighting parts of a posting or a whole posting based on the fact checking). In the step 5902, users are provided with a validity rating based on the fact checking. In some embodiments, the order of the steps is modified. In some embodiments, more or fewer steps are implemented.

FIG. 60 illustrates a block diagram of fact checking interactions with a message board according to some embodiments. The interactions with the message board fact checking system include, but are not limited to, flagging 6000 content and/or postings on the message board, correcting 6002 content/postings, fact checking 6006 a comment before publishing the comment, and/or classifying 6004 of content/postings.

FIG. 61 illustrates a screen shot of an exemplary message board implementing fact checking according to some embodiments. The message board includes validity ratings 6100 for each user. For example, Bob has a +5 validity rating for flagging inaccurate postings and not posting inaccurate comments; Jay123 has a −3 validity rating for posting inaccurate comments; and Con has a −1 validity rating for posting at least one inaccurate comment. The validity rating is also able to indicate bias based on determining bias as described herein and indicating ("liberal," "conservative," "moderate," and/or any other bias characterization). The message board includes highlighting 6102 of comments that have been fact checked and determined to be factually inaccurate.

FIG. 62 illustrates a screen shot of an exemplary message board implementing fact checking before allowing a user to post according to some embodiments. In the screen shot 6200, a user attempts to submit a post. In the screen shot 6202, the user is informed that a fact check has been performed, and the user is asked to provide support for the comment. In the screen shot 6204, the user provides a link supporting the comment. In the screen shot 6206, after the comment and the link have been analyzed (e.g., fact checked/checked the reliability), a message to the user indicating that the message is posted with an addition of a reliability rating for the source. Although in this example, a reliability rating of the source is posted, in some embodiments, the reliability rating is not posted, or if the reliability rating of the source is below a threshold, the user's post is rejected, or another action is taken.

In some embodiments, advertising posting sites, auction sites, and/or sales sites (e.g., Craigslist, eBay®) are fact checked automatically. Specific advertisements are able to be fact checked, and advertisements are able to be associated with a user. The user is able to have a validity rating as described herein. If a user's validity rating falls or is below a threshold, the user is not permitted to post an advertisement, or the advertisement is highlighted in some manner as being posted by an untrustworthy user. The validity rating based on fact checking is able to be combined with seller/buyer ratings (e.g., ratings by purchasers or sellers about sellers or purchasers) to provide a combined rating of a user. The user's validity rating is able to be specific to a site or based on multiple sites.

In some embodiments, polls are tracked for future comparison. For example, in an election year, many different entities perform polling to project how an election will turn out. The polling from the different entities is able to be tracked and stored by the fact checking system and compared with the actual results of the election. Then, the results of the comparison are able to be stored and presented in future elections. For example, in 2012, the final poll of Poll X indicates that Candidate A is winning in Ohio by 5%. In the actual voting, Candidate B wins Ohio by 3%. The information is stored in a data structure. Then, in 2016, when Poll X or a reference to Poll X is detected (e.g., by monitoring), information about how Poll X was wrong in 2012 is automatically indicated as described herein. Additional information is able to be stored, such as a count of correct and incorrect polling. For example, Poll X performs polls in all 50 states and is correct in 48 states which is stored. Later, supplemental information such as Poll X had 96% accuracy in 2012 is able to be displayed. Additional supplemental information is able to be presented as well such as why results were incorrect (e.g., oversampling of a demographic) and/or comparison data with other polls (e.g., Poll X was correct 96% of the time, Poll Y 90%, and Poll Z 80%).

In some embodiments, a debate fact checking system is implemented. The debate fact checking system is implemented similarly to the fact checking system by monitoring information, processing the information, fact checking the information, and indicating results. Indicating results is able to include keeping a tally of misleading comments, inaccurate comments, and/or any other characterizations. In some embodiments, a winner of the debate is determined by the tally of characterizations. For example, Candidate A is determined to have made 5 inaccurate comments, and Candidate B is determined to have made 15 inaccurate comments, so Candidate A is declared the winner. In another example, a participant is awarded a point for correcting an opponent's inaccurate or misleading comment, and a point is taken away when a participant makes an inaccurate or misleading comment. In some embodiments, a participant is awarded a point for making an accurate comment.

In some embodiments, in a tablet that doubles as a laptop (e.g., a tablet with two screens or displays), the fact check results and/or supplemental information is displayed on the second screen while the monitored content is displayed on a first screen.

In some embodiments, the fact checking system automatically sends/receives contradictory information from an opposing point of view. For example, a user is a Republican, and a conservative commentator points to negative information about a Democrat. Video clips contradictory to the commentator's points are presented to the user based on the user's party affiliation (Republican, in the example).

In some embodiments, controversial topics and arguments for either side of the topic are tracked. For example, climate change is a controversial topic to many people. Although a large amount of science supports the theory of climate change, many people continue to be skeptical, partly because bogus arguments are used to attack the theory of climate change. A database including the accuracy of each argument is able to be generated and maintained. Additionally, in some embodiments, experts from each side of an argument are able to contribute to the database including providing support for each argument. In some embodiments, the topics and the arguments are automatically monitored, the factual accuracy of the argument is automatically determined by comparing the arguments with source information, and a result is returned. In some embodiments, after the arguments are analyzed automatically, the result is manually verified by a user and/or an expert.

In some embodiments, fact checking information (e.g., results and supplemental information) is displayed in a similar manner to pop-up advertisements embedded in video (e.g., YouTube® invideo ads). For example, every time a fact check result is to be displayed, a bar or other marker is indicated on a time scroll bar. And every time the video passes the fact check bar, an invideo fact check result and/or supplemental information (e.g., pointing out bias, an opposing argument) is displayed. In some embodiments, the invideo fact check result or supplemental information is able to be based on a previous fact check. The previous fact check is able to be performed automatically, manually, or automatically with a manual verification. In some embodiments, the fact checking system generates embedded fact checking pop-ups while fact checking. For example, while a video is monitored and fact checked, if a characterization (e.g., factually inaccurate, misleading) is detected, an invideo fact check result is embedded in the video. Each fact check result occurrence is embedded in the video, so that any subsequent views of the video, the embedded fact check result is available. When a user views the video, at each designated time, the embedded fact check result will pop up or otherwise be displayed.

In some embodiments, a fact check result is displayed in a preview, thumbnail, television guide display, and/or any other preliminary content. For example, a thumbnail of a video for a political debate includes text of an incorrect statement and an indication such as "false" and/or a correction. In some embodiments, the text is embedded within or overlaid on the thumbnail. In some embodiments, only the most significant fact check result or most important to the user or in general is displayed. In some embodiments, a list of fact check results are displayed. In some embodiments, fact check statistics are displayed in the thumbnail. In some embodiments, statistics are displayed in a comparative format (e.g., in a table or chart).

In some embodiments, common factually inaccurate arguments are stored including responses to the inaccurate arguments. When a factually inaccurate argument is detected and/or searched for, a response or a list for responses is presented to a user. For example, a smart phone monitors a user's conversation, processes the conversation as described herein, and detects a factually inaccurate argument (e.g., by another person). Upon detection, a single response or list of responses to the inaccurate argument are automatically presented on the smart phone. The responses are able to be generated in any manner such as automatically, automatically and verified manually, or manually. In some embodiments, only the most common and/or recent factually inaccurate arguments are stored. In some embodiments, the factually inaccurate arguments are stored, sorted and/or searched through based on commonness (or popularity), timeliness (e.g., recent versus many years ago), and/or relevance to a user and/or topic. For example, a common misrepresentation of information is stored at the front of a list, so that it is analyzed first when searching for a factually inaccurate argument.

In some embodiments, product reviews are fact checked. For example, users are able to review products they purchase on web sites such as Amazon.com. In the reviews, users are able to input any review of the product without much if any oversight by the selling web site. The product review fact checking system is able to be implemented to automatically monitor product reviews (e.g., using a crawler/bot), or including a button or link on a page for a user to click to initiate a fact check of a review or reviews. For example, each review is able to have a mechanism for a user to trigger a fact check of the review. The fact check of the review is able to be implemented in any manner. For example, the review analyzes other reviews to determine if there is a common issue with a product. Furthering the example, a fact check of "battery life is too short" determines that 10 other reviews include the same or a similar complaint. The fact check result is able to present a result such as "10 reviews support this point." If reviews are found that disagree with a point; for example, 10 reviews say, "great battery life," then the result is able to indicate, "10 reviews disagree with this point." In some embodiments, the supporting and/or disagreeing reviews or links thereto are presented. In some embodiments, fact checking a product review includes confirming the user actually purchased the item. For example, the username for review is cross-checked with a database of purchases by that user. Other sources are able to be used to verify a user actually purchased an item such as social network information. In some embodiments, when a user posts an issue in a product review, the issue is verified as being possible with the item. For example, a user complains that the lights do not work on a toy, yet the toy does not include any functioning lights, the issue is flagged such as "not possible" or "errant." In some embodiments, the product review fact checking system reports and/or confirms issues with the manufacturer, seller, and/or other entity. For example, the manufacturer is able to confirm or deny that a certain part is susceptible to breakage. In some embodiments, the fact checking results are sent to the manufacturer.

FIG. 63 illustrates a flowchart of a method of fact checking product reviews according to some embodiments. In the step 6300, product reviews are monitored. In the step 6302, the product reviews are processed (e.g., parsed). In the step 6304, the product reviews are fact checked. In the step 6306, the fact check result of the product review is indicated. In some embodiments, the order of the steps is modified. In some embodiments, more or fewer steps are implemented.

In some embodiments, the fact checking system monitors for criticism of bias or inaccuracy of the fact checking system by others, and when found, the source (e.g., a network, a commentator, a website, and/or any other entity) of the criticism is monitored to correct in real-time any misrepresentations of the fact checking system. In some embodiments, when the source of the criticism is detected making a comment about the fact checking system, fact checking system statistics and/or comparative data is presented automatically as described herein. In some embodiments, after a source is determined, any future detection of that source automatically triggers a display of fact checking system statistics and/or comparative data. For example, the fact checking system monitors broadcast information and determines that Commentator X said, "this new fact checking system distorts the truth." The fact checking system stores Commentator X's information (e.g., name, show, network), and then specifically monitors Commentator X in general and for specific comments about the fact checking system. When Commentator X is detected again or when a comment by Commentator X about the fact checking system is detected again, information rebutting Commentator X is indicated (e.g., Here are all of the fact checking results and sources or Here is a table comparing the factual inaccuracies spread by the fact checking system versus Commentator X). In some embodiments, an automatic rebuttal to the initial criticism is automatically presented including, but not limited to, accuracy statistics of the fact checking system and/or the critic/critic's organization, a link to the fact checking system home page, specific information/sources disproving the criticism, and/or additional information. In another example, when criticism is detected, rebuttal information of the criticism is displayed for a designated time period (e.g., the next five days) when the commentator, show, network, affiliates, and/or another entity are detected. In some embodiments, a response to criticism includes a reference to a source that is from the same classification (e.g., political classification) as the commentator. For example, a conservative commentator criticizes the fact checking system as being biased for indicating a Republican candidate's speech as factually inaccurate. The fact checking system displays evidence including a citation from a Republican source that the fact checking system was accurate in its characterization of the speech. In some embodiments, a network and/or associated entities are monitored, and statistics and/or comparative data is displayed. For example, a host on Network Z unfairly criticizes the fact checking system. When an associated website of Network Z (e.g., determined in a relational database) is detected, the statistics/comparative data is displayed. In some embodiments, when criticism of the fact checking system is detected, the criticism is analyzed for taking the fact check information out of context, and in response, context is provided by the fact checking system. In some embodiments, if the criticizing commentator points to a result by the fact checking system as wrong, but the result has been corrected by the fact checking system, the fact checking system is able to indicate that the commentator is using old data, and the fact checking system has updated its result, and the updated result is presented. In some embodiments, if a critic presents statistics about the fact checking system that are not correct, the fact checking system provides correct statistics including a source or sources of the correct statistics. In some embodiments, a user is able to flag comments, commentators, networks and/or other information or entities that criticize the fact checking system. The fact checking system is then able to perform as described herein to rebut the criticism and/or monitor for additional criticism. In some embodiments, the response to the criticism is displayed on a second device (e.g., criticism is displayed on a television, and response is displayed on a smart phone).

FIG. 64 illustrates a flowchart of a method of monitoring for criticism of the fact checking system according to some embodiments. In the step 6400, information (e.g., broadcast) is monitored for criticism of the fact checking system. In the step 6402, criticism is detected. In the step 6404, information in response to the criticism is presented. In some embodiments, the order of the steps is modified. In some embodiments, more or fewer steps are implemented.

In some embodiments, the fact checking system alerts users who are interested in fact checking but are not aware that the fact checking system exists. For example, a device detects that a user is interested in news programming, and it is also determined that the user does not have a fact checking app or fact checking television, so a notification is presented to the user of the fact checking system, and a way (e.g., a link) for obtaining the fact checking system is provided.

In some embodiments, a device (e.g., a smart phone) detects that a user watches or listens to factually inaccurate content, and presents (e.g., pops up) advertisements to download/obtain the fact checking system.

In some embodiments, basic/simple videos and/or other information is provided to help people understand a complex point such as the national debt/deficit.

In some embodiments, a runny tally or clock of the amount of time (or number of times) discussing/showing each candidate, topic, entity, and/or other information on a show, a website, a channel, a set of channels, or a group of information distributors (e.g., conservative news channels, radio and web sites or liberal media channels, groups, web sites) is determined, collected and displayed. In some embodiments, the analysis includes determining if the candidate/topic is discussed positively, negatively, or neutrally. For example, in a simple version, it is determined that Channel X discusses Candidate A for 500 minutes and Candidate B for 550 minutes in October. In a more complex version, it is determined that 450 minutes of the discussion about Candidate A is negative and 50 minutes is neutral, and 520 minutes of the discussion about Candidate B is positive and 30 minutes is neutral. Determining the amount of time or the number of times a candidate, entity, topic and/or other information is discussed, and whether the discussion is positive, negative, or neutral is able to be performed in any manner including, but not limited to, detecting keywords in a title of a segment of a show, detecting keywords throughout the segment of a show, detecting by facial or voice recognition as described herein, detecting loaded words as described herein, detecting bias as described herein, based on user flagging (e.g. users flag start/end times of a story as being about and/or involving Candidate A and whether the story is positive, negative, or neutral), based on fact checking, and/or any other manner. In some embodiments, the amount of time and/or number of times an entity/topic is discussed is able to be used in determining bias. For example, if a network discusses a first candidate positively significantly more often than an opposing candidate, biased for the first candidate is able to be determined. In some embodiments, the analysis is performed automatically, automatically and verified manually, or manually.

FIG. 65 illustrates a flowchart of a method of calculating the amount of time or number of times an entity or topic is discussed according to some embodiments. In the step 6500, an entity/information is detected. In the step 6502, an amount of time the entity/information is detected is computed. In the step 6504, the amount of time is presented (e.g., displayed on a television automatically when a user watches a specified channel). In some embodiments, the order of the steps is modified. In some embodiments, more or fewer steps are implemented.

In some embodiments, fact checking is implemented selectively. For example, information (e.g., broadcast information) is monitored and processed, but fact checking only occurs when specific words or phrases (also referred to as triggers) are detected or when a specific entity (e.g., commentator) is detected. In some embodiments, triggers for the selective fact checking include, but are not limited to, a specific event (e.g., "Iraq War"), a specific network/channel/show/commentator/guest (e.g., network XYZ), a specific topic (e.g., "taxes"), a specific characterization (e.g., "liberal"), a recent news story (e.g., "fiscal cliff"), an item related to a user's importance as described herein (e.g., "jobs" or related words), an entity with a validity rating below a threshold (e.g., Guest X has a validity rating of −10), popular items (based on trending information), time relevance (e.g., story is about recent events), recent purchases by the user (e.g., user just purchased a Make/Model X car), recent searches by the user (e.g., search inputs to search engines), social network information, personal information of the user, political affiliation of the user, a controversy, a controversial comment, a hashtag, and/or any other trigger. For example, the system monitors for comments about a specific event such as "Iraq War," and when the phrase is detected, fact checking occurs. The words/phrases/entities to be detected are able to be stored in a data structure or searched for in another manner, and when a match is detected, the entity, phrase, word, or phrase the word is in is detected. In some embodiments, users are able to specify the words/phrases/entities to be detected. In some embodiments, users specify words/phrases/entities to be detected by flagging (e.g., voice command to a television to flag a word). The selectivity is able to be implemented in any manner, for example, separating content into opinion and facts, and only fact checking facts. In another example, the content is separated into opinion and facts, and the opinion is analyzed for bias, and the facts are fact checked. In another example, fact checking only occurs when a political word or phrase is detected, and surrounding information is fact checked (e.g., the phrase the word is in or several seconds before and/or after the word is detected). In some embodiments, detecting a word triggers fact checking a segment of a show (e.g., until a commercial break), a web page, or another subset of information. For example, a web page is analyzed, and if the web page does not contain any trigger words, the web page is not fact checked. In some embodiments, a web page, show, and/or other content is fact checked only if the number of trigger words exceeds a threshold.

Figure 66:
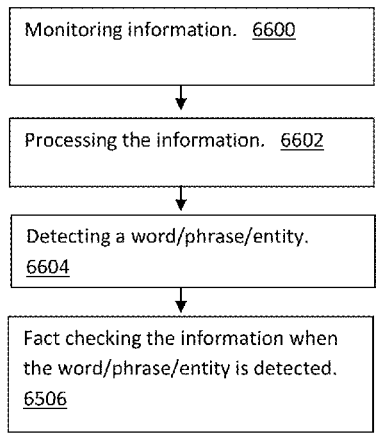
FIG. 66 illustrates a flowchart of a method of implementing selective fact checking according to some embodiments.

FIG. 66 illustrates a flowchart of a method of implementing selective fact checking according to some embodiments. In the step 6600, information is monitored. In the step 6602, the information is processed. In the step 6604, a word/phrase/entity is detected. In the step 6606, information related only to (e.g., by spacial/temporal proximity) the detected word/phrase/entity is fact checked. In some embodiments, the order of the steps is modified. In some embodiments, more or fewer steps are implemented.

In some embodiments, initially a single fact check monitors an entity (e.g., a commentator, a show, a network), but if the number of misleading comments, incorrect comments, and/or other characterizations exceeds a threshold, additional fact checking systems monitor the entity using different criteria for fact checking (e.g., different sources). In some embodiments, exceeding the threshold results in the fact checking system sending a notification to a group, agency, or another organization. With additional monitoring and fact checking, it is more likely that if one fact checking system does not catch a misleading comment, other fact checking systems will. The additional fact checking systems are able to parse the monitored information differently, compare the information with different sources and/or indicate the results of the comparisons differently. In some embodiments, the multiple fact checking systems provide a single result, and in some embodiments, multiple results are presented. In an example, if a network continues to perpetuate falsehoods, and exceeds a first threshold, and then a second threshold, and then a third threshold, a fourth fact checking system/implementation is used which provides a user supplemental information such as comparable networks that have a better accuracy rating. In some embodiments, one additional fact checking system/implementation is utilized after each threshold is exceeded. In some embodiments, the number of additional fact checking systems/implementations increases exponentially (e.g., 2, 4, 16, 32) after each threshold is exceeded.

In some embodiments, similar to described above, multiple thresholds are implemented for each entity where the thresholds change the effect of the fact check result. For example, for the first five misleading comments (or biased comments, and/or any other characterization) a commentator provides, the fact checking system indicates "misleading" (or other characterization) for each comment. After the fifth misleading comment (fifth being the first threshold), a message that the commentator appears to be biased is displayed. After the tenth misleading comment (tenth being the second threshold), a suggestion to change the channel is displayed with a suggestion of other channels that are more factually accurate. The thresholds are able to be based on a per show basis, per day/week/month/year basis, starting from 0 and not resetting, or any other basis. In some embodiments, the message does not change after each threshold, but the presentation of the message changes. For example, the message gets bigger after each threshold, or sound effects are applied and the sound gets louder, or the message is presented in 3-D after a threshold is exceeded. Any other effect described herein is able to be applied after any threshold is exceeded. In some embodiments, both the message changes and the presentation of the message changes.

Figure 67:
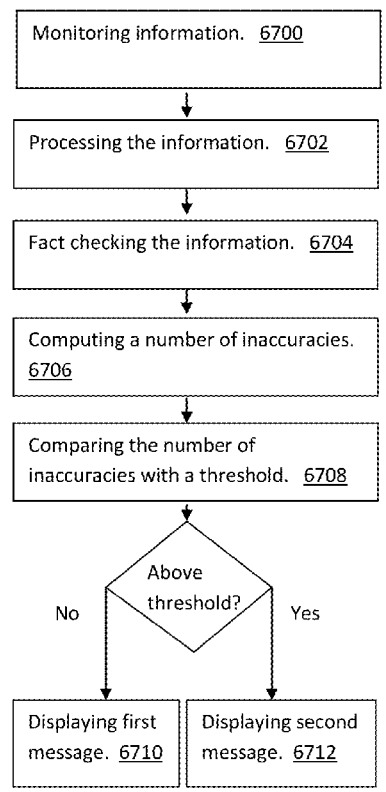
FIG. 67 illustrates a flowchart of a method of implementing fact checking using multiple thresholds according to some embodiments.

FIG. 67 illustrates a flowchart of a method of implementing fact checking using multiple thresholds according to some embodiments. In the step 6700, information is monitored. In the step 6702, the information is processed. In the step 6704, the information is fact checked. In the step 6706, a number of inaccuracies (or other characterization such as bias) of the information is computed (e.g., each time an inaccuracy is detected, a counter increases). In the step 6708, the number of inaccuracies is compared with a threshold. If the number is not above the threshold, then a first message (e.g., "misleading") is presented or displayed, in the step 6710. If the number is above the threshold, then a second message (e.g., "commentator is biased") is presented or displayed, in the step 6712. In some embodiments, additional thresholds are implemented, and if the number is above the additional thresholds, additional messages and/or actions are implemented (e.g., suggesting a channel change). In some embodiments, the order of the steps is modified. In some embodiments, more or fewer steps are implemented.

In some embodiments, information displayed as a result of a fact check includes a step-by-step process of why the fact checked information is correct, incorrect, misleading, and/or any other characterization.

As described herein, in some embodiments, email is fact checked. In some embodiments, an input implementation (e.g., command button) is included with/on a web page, web browser, or any application, such that when a user affects the input implementation, the email is fact checked. For example, a web page for sending/receiving email includes a button to fact check selected email or all email. The button is able to be used before the email is sent, before a received email is opened, after an email is opened, or any other time. In some embodiments, the content of the email is able to be selected by a user, and only the selected content is fact checked after the user presses the fact check button. In some embodiments, all or some email is fact checked in the cloud before being received at a user's inbox. In some embodiments, a user is able to specify types of email (e.g., only political emails) and/or email by specified senders to be fact checked in the cloud. In some embodiments, a column or other area of an email inbox display indicates a fact check result for each email. For example, next to each email subject, an icon, text, number rating, and/or any other indication is displayed. Furthering the example, an email that is extremely factually inaccurate based on a fact check receives a "1" next to the subject, and a factually accurate email receives a "10" next to the subject. In another implementation, the number indicates the number of factually accurate and/or misleading content in the email. In some embodiments, a folder is implemented with the email system similar to a spam email but for fact checked emails that have a factual accuracy below a threshold. In some embodiments, the content within the email is modified based on fact checking results. For example, factually inaccurate and/or misleading information is highlighted, faded, strikenthrough, and/or any other effect is applied. In some embodiments, emails are color-coded in a user's inbox, outbox, and/or any other folder based on the factual accuracy of the email content. For example, email subjects, email tabs, or any other email descriptors/labels are color-coded. Furthering the example, an email that is found to be factually accurate is color-coded green, an email that is found to be somewhat factually accurate (below a first threshold) is color-coded yellow, and an email that is found to be factually inaccurate (below a second threshold) is color-coded red. As described herein, the fact checking and color coding is able to occur before the user opens the email, thus assisting the user in determining which email to read and which to ignore. In some embodiments, statistics are collected based on the fact checking of the emails, and the statistics are able to be associated with a sender's email address and/or other identifying information. For example, if the majority of the emails from sender-x are factually inaccurate, this information is able to be used in filtering emails as spam or factually inaccurate, for labeling emails, and/or for providing users with additional information about the emails/senders. In some embodiments, selective fact checking is implemented as described herein. Similarly, the selective fact checking is able to be implemented based on the type of email, the content of the email, the subject of the email, the sender of the email, and/or whether there is an attachment with the email. For example, after a sender's emails have exceeded a threshold for the number of factually inaccurate emails, every additional email from that sender is fact checked. In another example, when political terms or phrases are detected in an email (e.g., as determined using a database), the email is fact checked. In another example, if the subject of the email is factually inaccurate, the content of the email is fact checked, but if the subject of the email is factually accurate, the content of the email is not fact checked. Any selectivity of fact checking emails is able to be implemented. In some embodiments, when an email, tweet, and/or any other communication is determined to have factually inaccurate information and/or misleading information (or factually inaccurate/misleading information exceeding a threshold), an email or other communication is automatically generated and/or automatically sent to the sender of the communication. The communication sent in response is able to include corrections to the factually inaccurate or misleading information, highlighting of questionable and/or biased information, a notification to the sender that he sent spam, and/or any other information. In some embodiments, the communication sent in response goes to the sender as well as any other recipients of the communication, and/or any other senders of the communication. In some embodiments, the communication sent in response indicates a countdown/warning. For example, after the first email is determined to be spam based on the amount of factually inaccurate content in the email, a warning email is sent to the sender that "this is your first strike, and if you receive two more, your email address will be added to the spam filter for filtering." Then, if three (or any specified number) emails that are determined to be spam based on factual inaccuracies are received from the sender, that email address is added to the spam filter. In some embodiments, when an email determined to be spam based on factual inaccuracies is received, a link and/or advertisement is sent to the sender to acquire a fact checking system. In some embodiments, if a sender has a number of strikes against him for spam above a threshold, the sender is required to fact check (e.g., send an email to a fact checking system or utilize an automatic fact check system) before the user is able to send the email. In some embodiments, the email sent by the sender and the fact check of the email are sent to other contacts of the sender and/or originator of the email. For example, using social network information such as Facebook® contacts and/or a user's address book, the email and fact check result are sent to others to convince the user to stop sending misinformation. The implementations described herein related to email are able to be applied to any communication including, but not limited to social media, text messages, and/or instant messages.

Figure 68:
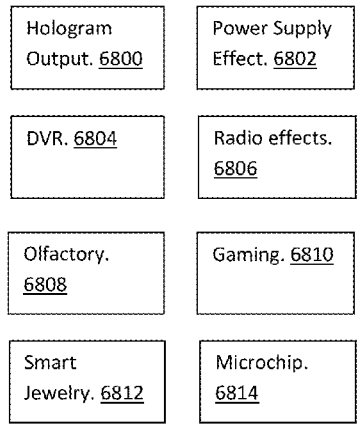
FIG. 68 illustrates a block diagram of various implementations of fact checking according to some embodiments.

FIG. 68 illustrates a block diagram of various implementations of fact checking according to some embodiments.

In some embodiments, a hologram output 6800 is utilized to present the fact checking results. The hologram output displays the causal relationships found within a comment including highlighting the strength of a causal relationship. For example, strong causal relationships are shown brightly, while weak causal relationships are shown lightly and no causal relationships are shown disconnected. In an opposite manner, weak or missing causal relationships are highlighted. For example, a commentator states, "gas prices are going through the roof because of this President." Based on fact checking results, a hologram output shows one connection of gas prices to investor speculation, another connection shows gas prices tied to global demand, and a highlighted connection shows there is no or little evidence of the President's policies causing an increase in gas prices. The hologram output is able to be any representation, for example, pillars, where each pillar represents a component of an argument, and highlighted pillars represent incorrect causal relationships. Furthering the pillars example, the pillars hold up a structure representing an argument, and if the causal relationships are weak or non-existent, then the pillars and structure are presented as falling down. In some embodiments, the hologram output is interactive such that users are able to move/interact with the hologram using gestures, voice and/or any other way. The interaction is able to be detected using a motion sensing/detection mechanism or any other mechanism.

In some embodiments, a device's power supply 6802 is operatively coupled to a fact checking system. In some embodiments, when inaccurate information is determined, the power supply is wasted/drained or not charged (e.g., decoupled), and when accurate information or a correction is determined, a power source, generator or charger is activated to provide new power to the power supply. The generator is able to be any type of generator such as a solar power generator. For example, a mobile device includes a solar cell which is operatively decoupled when inaccurate information is determined until accurate information is determined as described herein. And when operatively coupled, the solar cell recharges a battery of the device. In some embodiments, a device screen becomes brighter (up to a desired level) incrementally as accurate information or a correction to misinformation is determined, and the screen becomes darker (until black or other desired level) incrementally as inaccurate or misleading information is determined.

In some embodiments, a fact checking device is coupled (e.g., wirelessly) to a storage device 6804 (e.g., DVR, hard drive, cloud storage), and when a fact check result is determined in information (e.g., factually inaccurate), the information segment associated with the fact check result is automatically stored in the storage device along with the fact check result. In some embodiments, additional information is stored such as a quantity of each type of fact check result or total fact check results within a program or segment. In some embodiments, the storage device performs the fact checking and storing of the information. For example, a parsed television program segment is detected to have a factually inaccuracy, and the segment is automatically stored on the storage device. In some embodiments, users are able to select which type of fact check result (e.g., only inaccurate information) is used in automatically storing information. In some embodiments, a menu is provided for searching for and playing the recorded information. The menu is able to be sorted based on fact checking characteristics. In some embodiments, the recorded information is searchable based on fact checking characteristics. For example, a user searches for all misinformation. In another example, a user searches for all of the misinformation with an importance of the information above a threshold. In another example, a user searches for inaccurate information with a significance/relevance above a threshold. In some embodiments, the recorded content is able to be shared via social media/networking. For example, only friends of a user with an importance rating for the environment of 8 or higher receive a fact checking result involving a video clip about global warming. In some embodiments, shows/programs/segments/other information are stored only if a quantity of fact check results with a negative characteristic (e.g., factually inaccurate and misleading) is not above a threshold. For example, a user selects to record a news analysis program, but only if the program's quantity of negative fact check results are not above a threshold. In some embodiments, the program is recorded and fact checked while ongoing, and if the fact check results exceed the threshold, then the recording stops and the program is automatically deleted. In some embodiments, a combination of selective recording (e.g., keyword detection) and the fact checking threshold are utilized in recording shows. For example, the user inputs a key phrase "gun control," and only tv shows or segments with that phrase detected and with negative fact checking results below a threshold are recorded.

In some embodiments, for radio content 6806 or other information, using a slight delay of a broadcast, the information is automatically fact checked as described herein, and then when the broadcast occurs to an audience, the voice is modified (or other effect is applied such as playing background music) when incorrect, misleading, and/or another characterization is determined. For example, a radio broadcast occurs, but the broadcast to the audience is delayed by 30 seconds (or another time amount), so that the delayed broadcast is able to be fact checked (to prevent cutting off a sentence), and when the radio broadcast is presented to the audience, any determined characterization is altered to indicate the fact check result in real-time. Furthering the example, a speaker's voice is altered to a higher pitch when an inaccurate comment is made by the speaker, and a echoing effect is applied when a misleading comment is made by the speaker. The modification of the voice is able to occur in any manner, for example, a signal or code is embedded (e.g., in a stream) which is detected and triggers the start of the sound effect and ends when an ending signal/code is detected. In another example, the tempo of the speaker's voice is increased or slowed based on the fact checking result.

In some embodiments, a sound effect is automatically applied immediately after a characterization is determined in real-time. In some embodiments, a light flashes on the dashboard, or a screen on the dashboard is used to indicate a fact check result.

In some embodiments, olfactory radio fact checking 6808 is implemented where the fact checking system communicates with or using a vehicle ventilation/heat/air conditioning (A/C) system in conjunction with a multi-scent device (e.g., similar to an air freshener) on a vent or multiple air fresheners on separate vents, or positioned elsewhere in the vehicle. When a fact checking result is determined, the vehicle A/C system is triggered to blow air to cause a specified scent to disperse. For example, when a misleading comment is detected, a rotten smell is emitted, but when valid comments are made, a flower smell or fresh air is emitted. In another example, a mobile device performs the fact checking and sends the result to a vehicle computer which is configured to turn on/off the A/C system based on the fact checking result. In some embodiments, a similar implementation is performed without a vehicle (e.g., at home, a scented device with one or more scents is used in conjunction with a fact checking system). In some embodiments, the scented device is merely pluggable into outlets controlled by the fact checking system which turn on/off a desired outlet, or a smart scented device is used to achieve the desired scent. Similarly, heat and cold are able to be used to indicate accuracy versus inaccuracy or other characterizations. For example, an electric heat/cold pad is triggered based on the fact checking result. In some embodiments, the pad is able to be pressed for more information. In another example, a steam or smoke machine or similar device is utilized with the fact checking system, and a puff of steam is emitted to indicate a fact check result.

In some embodiments, game content 6810 is utilized with and/or affected based on fact checking results. In some embodiments, game content is overlaid on a device such that a character of the game affects the content being fact checked. For example, Pac-man eats the factually inaccurate closed-captioned information displayed on a television. The incorporation of the gaming content is able to be performed in any manner such as incorporated within the signal or projected on the content to only appear to eat the information. Any other game content is able to be applied to any characterization of the information. For example, fighting game characters beat up misleading content, or a princess hugs a correction of incorrect content.

In some embodiments, a fact check result is used as input to a separate game. The game receives the input and is configured to perform a standard game function based on the input. For example, when a factually inaccurate comment is determined, space invaders get one step closer to the bottom of a screen, and if there are too many inaccurate comments determined, the game ends. In another example, each time a misleading comment is determined, a bird is slingshot at a structure hurting a pig in the structure. In another example, a game of pong with the opponents being truth and fiction is presented, and if an inaccurate statement is detected, the blip is shown as passing by truth's paddle giving fiction a point.

In some embodiments, a user plays a game which is affected by fact checking results. In some embodiments, the game is able to be played without the fact checking results, but the fact checking results add extra features. For example, each time an inaccurate comment is determined (e.g., by monitoring and fact checking broadcast information separate from the game), the player within the game loses a life, each time a misleading comment is determined the player loses power or another effect, each time a correction is determined, the player gains a life, and when hyperbole is determined, the player gains energy. In some embodiments, a user loses points in a game when misinformation is determined. In another example, a user plays a handheld fighting game which includes power lost as usual from being hit by the opponent, but the handheld game also monitors and fact checks or receives fact checking information from a television, and when misinformation in the television broadcast is detected, the user loses power as if being hit.

In some embodiments, smart jewelry 6812 (e.g., bracelet, necklace, ring, pin) is implemented capable of receiving an input such as a fact check result from another device (e.g., smart phone implementing fact checking system) and producing an output based on the input. For example, a bracelet is configured to wirelessly receive a fact check result (e.g., 000 indicates misleading, 001 indicates inaccurate, 010 indicates bias) which then causes a lighting component (e.g., LED) in the bracelet to turn on for a period of time or as directed to turn off by the fact checking system. Similarly, clothing (e.g., armband/shirt) is able to include light effects.

In some embodiments, a microchip 6814 or other device configured to be inserted within a user is used for fact checking and/or receiving fact checking results. The microchip is configured to be able to trigger a physiological effect on the user such as a tingling sensation upon determination of misinformation. The microchip is able to be used separately or in conjunction with another device. For example, a user's smart phone or television monitors, processes and fact checks information, and then sends fact check results to the microchip (with a receiver) which provides an effect to the user. The effect provided by microchip is able to be implemented in any manner, for example, configured with an electrical output to generate a tingling or warming sensation in a user. In some embodiments, the microchip is configured to send signals to a user's brain to indicate to the user information is incorrect or another characterization. In some embodiments, the microchip is positioned in or near a user's nose (or other location) to generate a sensation (e.g., specific odor) that is not actually there.

In some embodiments, fact checking results are indicated based on information about the user (e.g., age, sex, occupation, political affiliation, and/or any other information about the user). For example, if a user is a farmer, when a fact check result of the comment, "global warming is a hoax" indicates false, additional content such as droughts which have or will affect the farmer's crops are indicated. In another example, when a fact check result of the comment, "the President is going to take away all of our guns," indicates false, a picture of the guns being targeted by new legislation is indicated, or a specific note to the user states, "you own guns X and Z which are unaffected by the proposed legislation." In another example, each user's device is configured for that user to provide an output to specific to the user. For instance, a same fact checking result is communicated from another device to user's televisions, and each user's television indicates the results in a manner specific to the user. Furthering the example, all user's watching Show Z receive a signal on their television that Commentator A's comment was misleading, but teenager User J's television shows the misinformation exploding, and elderly User K's television presents a clear explanation in large print of why the comment was misleading. The user's information is able to be acquired, known, and used in any manner such as based on social network information, provided information, stored information, recent purchases, visited web sites, and/or channels watched.

As described herein, a fact check source collection system is able to be implemented. The collection system searches for, processes, organizes, and stores sources to be used for fact checking. In some embodiments, sources not to be used are discarded or listed to be ignored.

In some embodiments, a database or other structure is maintained and utilized to automatically indicate a commonly spun word or phrase and also to indicate bias or a political position based on the word or phrase used. For example, the database contains the phrase "estate tax" which is the legal term, and an associated column includes the phrase "death tax" which is a conservative term. The associated words/phrases are able to be stored as well as political classifications associated with each, and any other information (e.g., who coined the phrase or the factual accuracy of the phrase). Detecting the word/phrase is also able to be used in determining bias of the speaker. For example, a person who uses the phrase "death tax" is likely a libertarian or conservative and not a liberal.

In some embodiments, a size or length of a fact check result is user selectable. For example, a user is able to select that he wants the fact check result to only be or mainly be emoticons, acronyms, shorthand, words, phrases, sentences, or paragraphs to indicate a result.

As described herein, the fact checking system is able to be used in many applications such as real estate, plumbing, roofing, painting, electrical, landscaping, mechanics, pest control, tech support, cable, phone, daycare, tutoring, contractors, event planning, dry cleaning, caterers, accountants, veterinarian, healthcare, tailors, hair/nail salons, fitness, security, masseuse, house cleaners, banking, restaurants, job placement, legal, engineering, art, media, entertainment, customer service, education/schools, government, marketing, nonprofit, retail/sales, writing, and/or any other services. For example, for real estate, fact checking is able to be used to fact check prices and property information. For services, pricing, reviews, documentation, and/or any other information is able to be fact checked. Supplemental information is able to be provided for these applications as well.

Utilizing the fact checking system, method and device depends on the implementation to some extent. In some implementations, a word processor uses fact checking to assist a user in preparing a document, a television broadcast uses fact checking to fact check what is said or shown to the viewers, and a mobile application, in some embodiments, uses fact checking to ensure a user provides factually correct information. The fact checking is able to be implemented without user intervention. For example, if a user is watching a news program, the fact checking is able to automatically occur and present the appropriate information. In some embodiments, users are able to disable the fact checking if desired. Similarly, if a user implements fact checking on his word processor or mobile application, the fact checking occurs automatically. For a news company, the fact checking is also able to be implemented automatically, so that once installed and/or configured, the news company does not need take any additional steps to utilize the fact checking. In some embodiments, the news company is able to take additional steps such as adding sources. In some embodiments, news companies are able to disable the fact checking, and in some embodiments, news companies are not able to disable the fact checking to avoid tampering and manipulation of data. In some embodiments, one or more aspects of the fact checking are performed manually.

In operation, the fact checking system, method and device enable information to be fact checked in real-time and automatically (e.g. without user intervention). The monitoring, processing, fact checking and indicating of status are each able to occur automatically, without user intervention. Results of the fact checking are able to be presented nearly instantaneously, so that viewers of the information are able to be sure they are receiving accurate and truthful information. Additionally, the fact checking is able to clarify meaning, tone, context and/or other elements of a comment to assist a user or viewer. By utilizing the speed and breadth of knowledge that comes with automatic, computational fact checking, the shortcomings of human fact checking are greatly overcome. With instantaneous or nearly instantaneous fact checking, viewers will not be confused as to what information is being fact checked since the results are posted instantaneously or nearly instantaneously versus when a fact check is performed by humans and the results are posted minutes later. The rapid fact checking provides a significant advantage over past data analysis implementations. Any of the steps described herein are able to be implemented automatically.

Examples of Implementation Configurations:

Although the monitoring, processing, fact checking and indicating are able to occur on any device and in any configuration, these are some specific examples of implementation configurations. Monitoring, processing, fact checking and indicating all occur on a broadcaster's devices (or other emitters of information including, but not limited to, news stations, radio stations and newspapers). Monitoring, processing and fact checking occur on a broadcaster's devices, and indicating occurs on an end-user's device. Monitoring and processing occur on a broadcaster's devices, fact checking occurs on a broadcaster's devices in conjunction with third-party devices, and indicating occurs on an end-user's device. Monitoring occurs on a broadcaster's devices, processing and indicating occur on an end-user's device, and fact checking occurs on third-party devices. Monitoring, processing, fact checking, and indicating all occur on third-party devices. Monitoring, processing, fact checking, and indicating all occur on an end-user's device. These are only some examples; other implementations are possible. Additionally, supplemental information is able to be monitored for, searched for, processed and/or indicated using any of the implementations described herein.

Fact checking includes checking the factual accuracy and/or correctness of information. The type of fact checking is able to be any form of fact checking such as checking historical correctness/accuracy, grammatical correctness/accuracy, geographical correctness/accuracy, mathematical correctness/accuracy, scientific correctness/accuracy, literary correctness/accuracy, objective correctness/accuracy, subjective correctness/accuracy, and/or any other correctness/accuracy. Another way of viewing fact checking includes determining the correctness of a statement of objective reality or an assertion of objective reality. Yet another way of viewing fact checking includes determining whether a statement, segment or phrase is true or false.

Although some implementations and/or embodiments have been described related to specific implementations and/or embodiments, and some aspects/elements/steps of some implementations and/or embodiments have been described related to specific implementations and/or embodiments, any of the aspects/elements/steps, implementations and/or embodiments are applicable to other aspects/elements/steps, implementations and/or embodiments described herein.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
    fact checking a fact check result of information by comparing, by the device, the fact check result with information from a source to determine factual accuracy of the fact check result;
    automatically indicating a status of the fact check result based on a re-fact check result from comparison of the fact check result with the information from the source;
    wherein the status of the fact check result is indicated in real-time.

2. The method of claim 1 further comprising providing a reason why the fact check result was incorrect if the fact check result is disproved.

3. The method of claim 1 further comprising receiving flagging information flagging the fact check result.

4. The method of claim 3 wherein the fact check result is only fact checked if a number of users flagging the fact check result exceeds a threshold.

5. The method of claim 3 wherein the flagging information comprises a voice command made within a designated time frame.

6. The method of claim 1 wherein fact checking the fact check result utilizes information from a different source than used to generate the fact check result.

7. The method of claim 1 wherein the status of the fact check result indicates whether the fact check result is confirmed or disproved.

8. The method of claim 1 further comprising receiving additional source information to compare with the fact check result to determine the factual accuracy of the fact check result.

9. The method of claim 1 wherein the status of the fact check result is only indicated if the fact check result is disproved.

10. The method of claim 1 further comprising gathering statistics regarding fact check results and re-fact check results of a fact checking system.

11. The method of claim 10 wherein the statistics are gathered automatically.

12. The method of claim 10 further comprising indicating the statistics when the fact checking system is referenced.

13. The method of claim 10 further comprising indicating the statistics of the fact checking system and an entity's statistics in a comparison format.

14. The method of claim 1 further comprising storing the fact check result and the re-fact check result in a user-searchable data structure.

15. The method of claim 1 further comprising displaying the status of the fact check result on a second device.

16. The method of claim 1 further comprising providing a correction if the fact check result is disproved.

17. The method of claim 1 further comprising displaying data including how often a fact checking system is challenged, proven incorrect, or proven correct.

18. A method programmed in a non-transitory memory of a device comprising:
   fact checking a fact check result of information by comparing, by the device, the fact check result with information from a source to determine factual accuracy of the fact check result;
   automatically indicating a status of the fact check result based on a re-fact check result from comparison of the fact check result with information from the source;
   providing a reason why the fact check result was incorrect if the fact check result is disproved.

19. A method programmed in a non-transitory memory of a device comprising:
   receiving flagging information flagging a fact check result, wherein the fact check result includes target information and a factual accuracy of the target information;
   fact checking the fact check result of the target information by comparing, with the device, the fact check result with information from a source to determine the factual accuracy of the fact check result, wherein the fact check result is only fact checked if a number of users flagging the fact check result exceeds a threshold, further wherein the information from the source is from a different source than information from a previous source used to determine the fact check result;
   automatically indicating a status of the fact check result based on a re-fact check result from comparison of the fact check result with the information from the source.

20. A device comprising:
   a memory for storing an application for automatically performing:
      receiving voice command flagging information flagging a fact check result of a previous fact check;
      fact checking the fact check result of information by comparing the fact check result with information from a source to determine factual accuracy of the fact check result, wherein the fact check result is only fact checked if a number of users flagging the fact check result exceeds a threshold, further wherein the information from the source is from a different source than information from a previous source used to determine the fact check result, further wherein the information from the source includes a source received by a user;
      indicating a status of the fact check result based on a re-fact check result from comparison of the fact check result with the information from the source;
   a processor for processing the application.

21. A method programmed in a non-transitory memory of a device comprising:
   fact checking a fact check result of information by comparing, by the device, the fact check result with information from a source to determine factual accuracy of the fact check result;
   automatically indicating a status of the fact check result based on a re-fact check result from comparison of the fact check result with information from the source;
   receiving flagging information flagging the fact check result;
   wherein the fact check result is only fact checked if a number of users flagging the fact check result exceeds a threshold.

22. A method programmed in a non-transitory memory of a device comprising:
   fact checking a fact check result of information by comparing, by the device, the fact check result with information from a source to determine factual accuracy of the fact check result;
   automatically indicating a status of the fact check result based on a re-fact check result from comparison of the fact check result with information from the source;
   receiving flagging information flagging the fact check result;
   wherein the flagging information comprises a voice command made within a designated time frame.

23. A method programmed in a non-transitory memory of a device comprising:
   fact checking a fact check result of information by comparing, by the device, the fact check result with information from a source to determine factual accuracy of the fact check result;
   automatically indicating a status of the fact check result based on a re-fact check result from comparison of the fact check result with information from the source;
   gathering statistics regarding fact check results and re-fact check results of a fact checking system.

24. A method programmed in a non-transitory memory of a device comprising:
   fact checking a fact check result of information by comparing, by the device, the fact check result with information from a source to determine factual accuracy of the fact check result;
   automatically indicating a status of the fact check result based on a re-fact check result from comparison of the fact check result with information from the source;
   displaying data including how often a fact checking system is challenged, proven incorrect, or proven correct.

* * * * *